United States Patent [19]
Stewart

[11] Patent Number: 5,410,711
[45] Date of Patent: Apr. 25, 1995

[54] PORTABLE COMPUTER WITH BIOS-INDEPENDENT POWER MANAGEMENT

[75] Inventor: Gregory N. Stewart, Austin, Tex.

[73] Assignee: Dell USA, L.P., Austin, Tex.

[21] Appl. No.: 655,889

[22] Filed: Feb. 14, 1991

[51] Int. Cl.$^6$ ............................................. G06F 1/32
[52] U.S. Cl. .................... 395/750; 364/707; 364/273.1; 364/DIG. 1; 364/948.8; 364/DIG. 2
[58] Field of Search ............... 395/750, 575; 364/707, 364/273.1, DIG. 1, 948.8, DIG. 2; 371/66, 14, 12

[56] References Cited

U.S. PATENT DOCUMENTS

| | | | |
|---|---|---|---|
| 4,203,153 | 5/1980 | Boyd | 395/750 |
| 4,611,289 | 9/1986 | Coppola | 395/750 |
| 4,758,945 | 7/1988 | Remedi | 395/750 |
| 4,851,987 | 7/1989 | Day | 395/550 |
| 4,907,183 | 3/1990 | Tanaka | 395/750 |
| 4,922,450 | 5/1990 | Rose et al. | 395/750 |
| 4,980,836 | 12/1990 | Carter et al. | 364/483 |
| 5,021,950 | 6/1991 | Nishikawa | 395/325 |
| 5,129,091 | 7/1992 | Yorimoto et al. | 395/750 |
| 5,142,684 | 8/1992 | Perry et al. | 395/750 |
| 5,167,024 | 11/1992 | Smith et al. | 395/375 |
| 5,230,075 | 7/1993 | Canova, Jr. et al. | 395/750 |
| 5,241,680 | 8/1993 | Cole et al. | 395/750 |

Primary Examiner—Jack B. Harvey
Assistant Examiner—Glenn A. Auve
Attorney, Agent, or Firm—Robert Groover; James Huffman; Jeff Hood

[57] ABSTRACT

A personal computer which a microcontroller, separate from the main processor, is used for power-management functions. Under certain conditions, this power-management microcontroller can take control of the system bus. This provide BIOS-independent power management, and permits sophisticated power management to be performed without placing any burden or constraints on the user's choice of operating system or application software.

17 Claims, 37 Drawing Sheets

MILES Slave Cycle State Machine, (AT is Master)

MILES MICRO_CONTROLLER SERIAL INTERFACE.

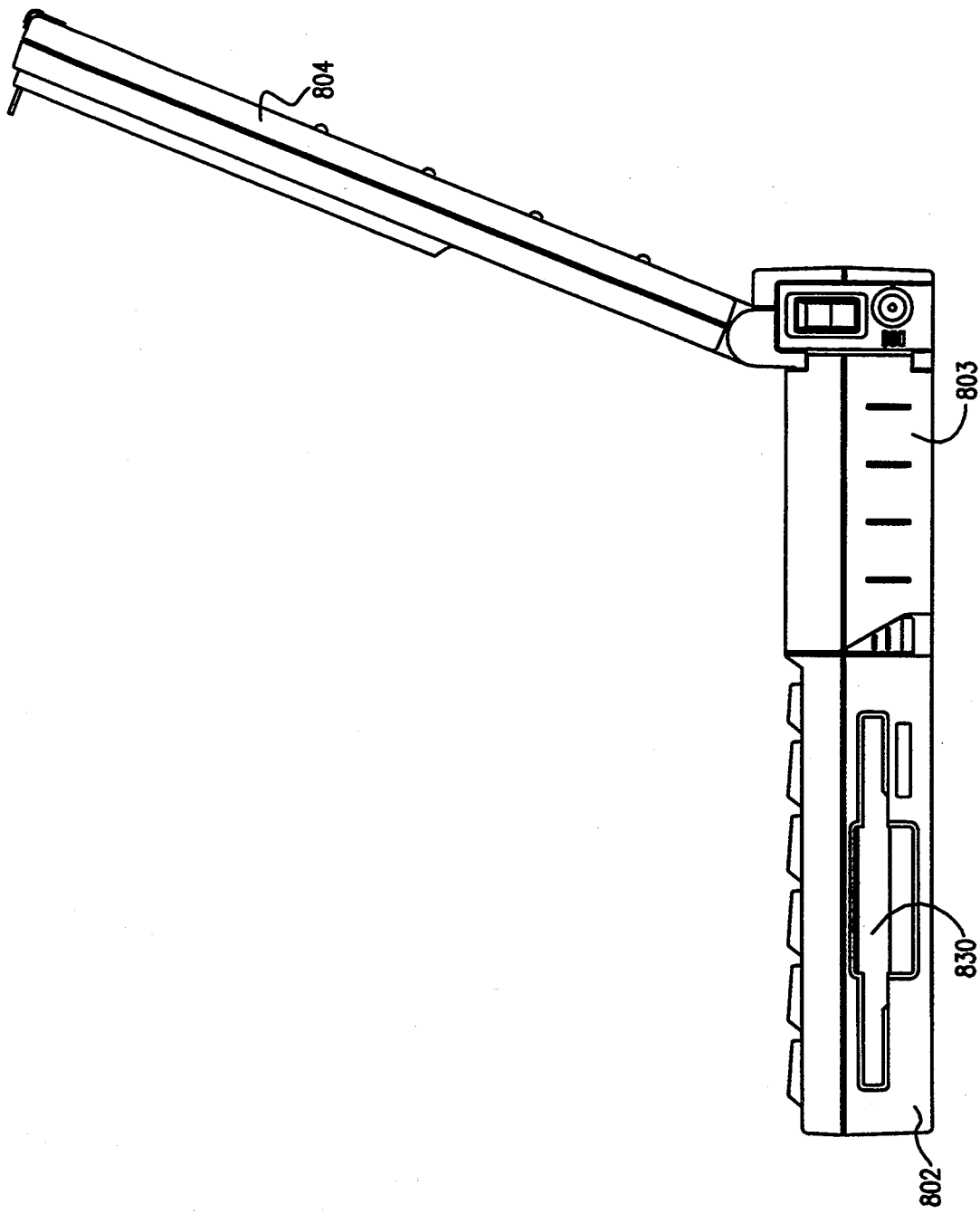

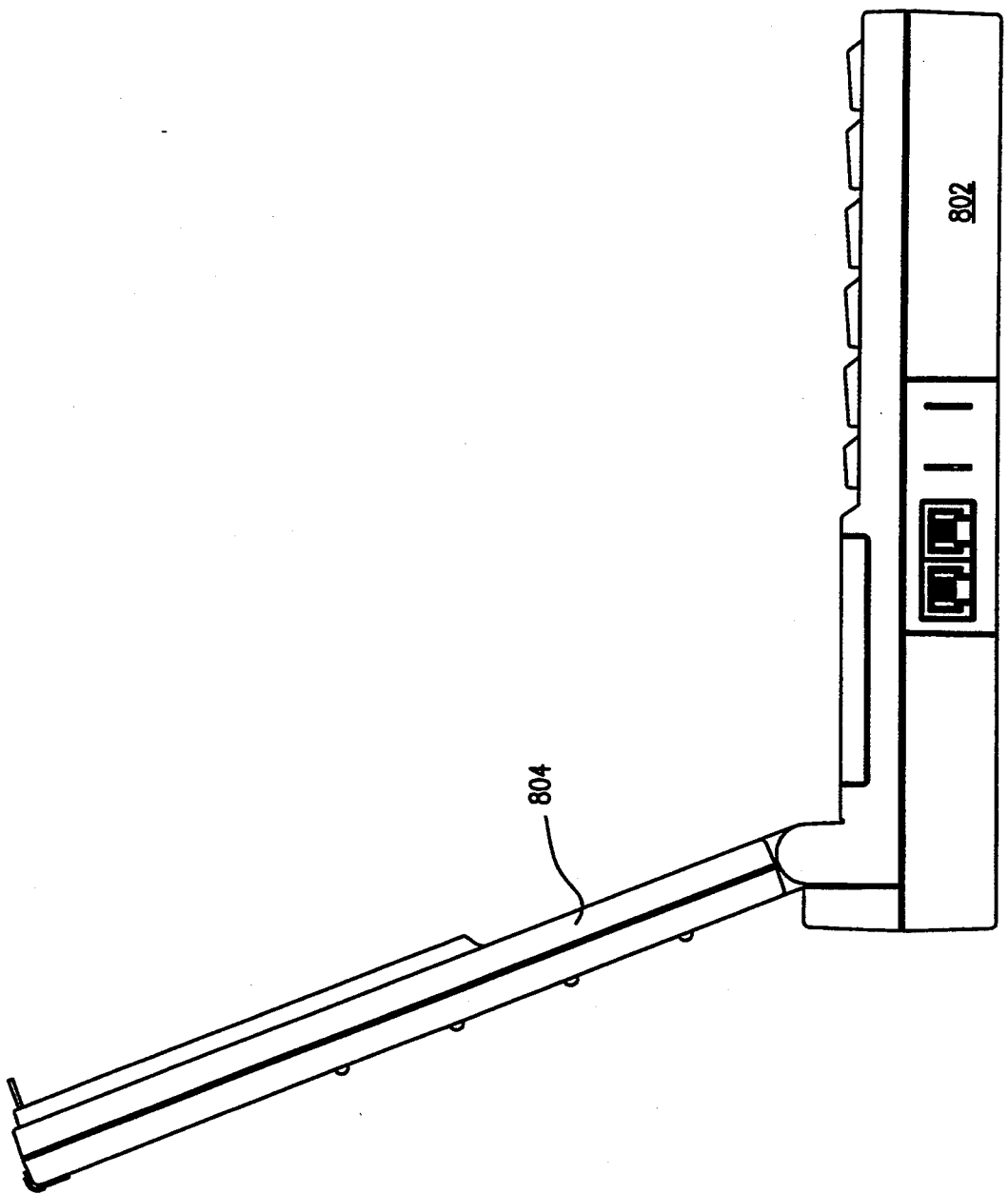

PORTABLE COMPUTER WITH BIOS-INDEPENDENT POWER MANAGEMENT

PARTIAL WAIVER OF COPYRIGHT

All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

CROSS-REFERENCE TO OTHER APPLICATIONS

The following applications of common assignee contain at least some drawings in common with the present application, and are believed to have effective filing dates identical with that of the present application, and are all hereby incorporated by reference:

Ser. No. 656,265, filed Feb. 14, 1991, entitled "Rechargeable System with Separate Battery Circuits in a Common Module";

Ser. No. 656,647, filed Feb. 14, 1991, entitled "Portable Computer system with Adaptive Power-Control Parameters";

Ser. No. 655,619, filed Feb. 14, 1991, entitled "Portable Computer with Dual-Purpose Standby Switch";

Ser. No. 656,262, filed Feb. 14, 1991, entitled "Method for Detecting Low Battery State Without Precise Calibration"; all of which are hereby incorporated by reference.

BACKGROUND AND SUMMARY OF THE INVENTION

The present invention relates to potable battery-powered computers.

The Ongoing Downsizing of Portable Personal Computers

Potable personal computers were introduced in the early 1980s, and proved to be very useful and popular. As this market has developed, it has become increasingly clear that users strongly desire systems to have small volume, small weight, and long battery-powered lifetime. Thus, small potable computers Claptop computers) have proven extremely popular during the late 1980s. Users continue to demand more features, longer time between recharges, and lower weight and volume. This combination of demands is difficult to meet. Moreover, as of 1990, another smaller generation of potable computers has begun to appear, referred to as "notebook" computers. This smaller form factor will only exacerbate the difficulty of the above tradeoffs.

Approaches to Power Conservation

There are three basic approaches to extending the operating lifetime of a portable computer. The simplest way is to specify components at the lowest economical power consumption. Thus, for instance, CMOS integrated circuits and liquid crystal displays (LCDs) will normally be used. An equally simple way is to increase battery capacity. However, both of these routes rapidly encounter limits, which are set simply by the tradeoff of the cost of lower-power components, or of the elimination of functionality, the user expectations.

The third way is to use power-management algorithms so that, at almost every instant, all components are being operated in the lowest-power mode for their current demands. Thus, for example, a processor which is not currently executing a program may be placed into "sleep" mode, to reduce its overall power consumption. For another example, substantial power savings can be achieved simply by stopping the system clock (or by slowing down the system clock to a very low rate). For another example, it is common practice, in portable computers with an LCD display, to provide back lighting for use of the display under low-fight conditions; but, since this back lighting consumes relatively large amounts of power, it will normally be turned off after a short period of inactivity (or even, alternatively, after a short duration regardless of activity), until the user again demands back lighting.

All of these lines of approach have some inherent limits. For example, it is hard to foresee any integrated circuit technology which would be economical in the 1990s and more power-efficient than low-power low-voltage CMOS. Some further improvement in this area is foreseeable, but no revolutionary improvements appear likely. Moreover, in practice, such improvements are largely outside the control of system designers: when lower-power chips are sampled, system design houses will buy them; but system design houses cannot greatly accelerate the pace of introduction of such chips.

It is also true that the smartest power-management programs cannot reduce the time fraction during which the user wishes to look at the display, or enter data through the keyboard. However, in this area there does appear to be room for improvement, and system design improvements can help achieve power efficiency.

Many power management schemes have been proposed, where parts of the system are shut down during periods of inactivity. (One example of a portable computer system with power-monitoring functions is described in U.S. Pat. No. 4,980,836 to Carter et al., which is hereby incorporated by reference. Another source of proposed teachings regarding power-management functions is provided by the DS1227 product preview, contained in the 1988 data book of Dallas Semiconductor Corporation, which is hereby incorporated by reference.) These approaches tend to extend the usable working time between recharges.

In addition, it has been recognized that management of the charging and discharging cycles of Ni-Cd batteries can help to extend their life.

Either of these power-management functions requires some intelligent control. The conventional way to implement this has been using the main microprocessor (CPU). To accomplish this, the necessary program steps are inserted into the BIOS software (basic input/output system software), which is stored in ROM.

BIOS Software

The BIOS software provides a robust startup for personal computers, and has been a key part of all DOS-compatible computers since the original IBM PC. However, the BIOS is inherently limited to 16-bit "real-mode" operation: it cannot operate in the 32-bit "protected mode" which is available in the 80-286 and later 80X86 processors.

Thus, any operating system which fully exploits the abilities of the more advanced processors must bypass the BIOS software. (Many systems copy the BIOS code into DRAM memory, simply for faster operation (because the access time of the BIOS ROM may be slow). This is not the same as replacing the BIOS, as described above, and does not present the same issues of compatibility.) For example, BIOS is bypassed when an ISA-architecture computer is running UNIX or PS/2 (which, in 1990, are the two most common 32-bit Intel operating systems).

Such advanced operating systems are becoming increasingly common. However, for some years to come, most computers sold will still need to be compatible with DOS.

This means that, if the BIOS is used for power-management, the power-management functions may disappear for users who are running an advanced operating system.

Many DOS programs will also bypass some parts of the BIOS. For example, many game programs replace the Disk handler or the keyboard handler. Windows 3.0 software (which is becoming extremely popular) also bypasses large parts of BIOS.

Thus, the risk is that, if hardware-specific power-management functions are inserted into the BIOS, they may be lost when programs bypass the BIOS. This can led to drastic problems, such as a computer which is locked out of sleep mode (and therefore runs down its batteries), or which is locked into sleep mode (and therefore is unusable).

For this reason, many existing laptop computers have been required to use only simplified power-management functions.

Previously proposed systems often rely on an interrupt to awaken the processor. In many cases, the interrupt used is the NM/signal (the non-maskable interrupt). The use of the NMI line is particularly likely to cause software problems, and especially so in a system which runs UNIX or OS/2.

Power-Management Microcontroller

In the presently preferred embodiment, a microcontroller performs battery monitoring and power-management functions. This microcontroller receives an interrupt signal which is an ANDed combination of many signals. (In the presently preferred embodiment, these signals include, e.g., TX and RX lines from both serial ports, lines from the parallel port, lines from the floppy disk controller, etc. However, this list could be expanded or contracted.) Thus, the microcontroller can readily detect activity or alarms (e.g. from the real-time clock).

Interface Chip

In the presently preferred embodiment, this power-management microcontroller is interfaced to the system bus through an interface chip which performs many interface management functions. This innovative interface chip provides greatly increased versatility and functionality. The combination of a microcontroller with such an interface chip provides advantages which are not limited to the needs of power management.

For the system to enter sleep mode, the Microcontroller sends a command to the interface chip, and the interface chip then allows the microcontroller to act as a MASTER on the system bus.

The interface chip also has other output lines, for controlling other subsystems.

The interface chip is also connected to intercept instructions fetched by the microcontroller from its off-chip program memory. Under certain conditions, the interface chip will replace a fetched instruction with a different instruction. This is called "return-cramming," and in effect permits different functions to be overlaid onto the microcontroller's program address space.

Thus, this capability permits certain additional flexibility to be achieved in a Harvard architecture microcontroller. The interface chip, in the presently preferred embodiment, watches for certain instruction sequences (e.g. a conditional jump into a certain address range) and initiates a "return-cramming" sequence if such an instruction sequence is detected. One use of this capability is to permit data to be stuffed back into the microcontroller's program memory space (which can otherwise be difficult in a Harvard architecture).

Sleep and Standby Modes

The presently preferred system embodiment has both sleep and standby modes: in sleep mode the microprocessor (CPU) is still executing at reduced speed—and the screen and hard disk may or may not be turned off. (Thus, the choice to enter sleep mode or not relates primarily to the presence or absence of I/O activity.) Almost any stimulus will bring the system out of sleep mode.

In the standby mode, more of the system is powered down. The standby mode must be entered actively, i.e. in response to a user command (or software command). The standby mode, in the presently preferred embodiment, can be exited only by a manual input from the user.

Sample System Configuration

In the presently preferred embodiment, as shown in FIG. 1, a variety of peripherals are connected to the system bus. These preferably include at least a floppy disk drive, a hard disk drive, a serial port UART, and a display controller. Of course, other systems may be configured with other peripherals, depending on the system bus, such as memory expansion boards, real-time clock, etc.

The specifics of these peripherals are not highly relevant to the disclosed power management architecture. However, one feature to note, regarding at least some of these peripherals, is that a great deal of power can be saved by powering them down into a standby state. For instance, two primary candidates for such standby action are the hard disk drive and the display. Even with an LCD display, the power budget required to operate the display controller and the display is quite significant. Similarly, any hard disk drive, even when the heads are not being moved, a non-zero amount of power is consumed to maintain the synchronous rotation of the platters.

The innovative teachings disclosed herein provide a personal computer in which a microcontroller, separate from the main processor, is used for power-management functions. Under certain conditions, this power-management microcontroller can take control of the system bus.-This provides BIOS-independent power management, even for devices which have I/O-addressed ports which must be written to enter standby mode, and permits sophisticated power management to be performed without placing any burden or constraints on the primary operating system.

BRIEF DESCRIPTION OF THE DRAWING

The present invention will be described with reference to the accompanying drawings, which show important sample embodiments of the invention and which are incorporated in the specification hereof by reference, wherein:

FIG. 6A-1 is a diagram of the MC-intfc block shown in FIG. 6A.

FIG. 6B-1 is a diagram of the index block shown in FIG. 6B.

FIGS. 8A-8J show various views of the external physical appearance of the portable laptop computer of the presently preferred embodiment.

DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Overall Organization

The presently preferred embodiment provides a 80C286 or 386SX laptop computer, with hard disk and LCD display, powered by rechargeable NI-Cd batteries and a nonrechargeable lithium battery.

Physical Conformation

FIGS. 8A-8J show various views of the external physical appearance of the portable laptop computer of the presently preferred embodiment. This provides a "laptop" computer, which can provide the full power of a normal personal computer for several hours of operation between battery recharges. This is a 'notebook" size laptop computer, measuring approximately 8.5×11×2 inches, in the presently preferred embodiment. Weight, cost and power consumption are important considerations in such products.

Figure 8A:
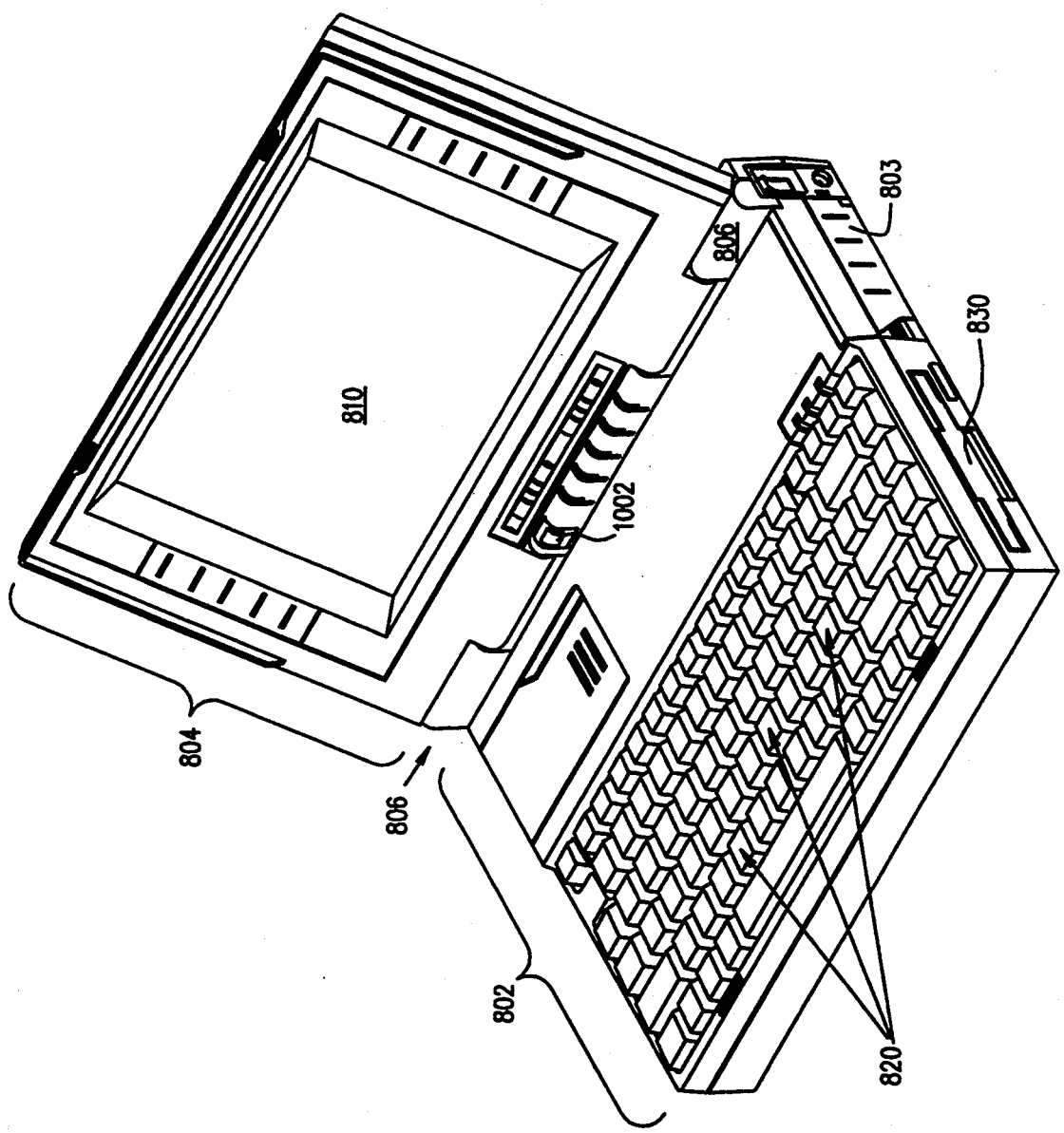

FIG. 8A shows a perspective view of the notebook computer of the presently preferred embodiment in the open position. Visible elements include case 802, cover 804, hinges 806, display screen 810, keyboard 820, floppy disk drive 830, and dust cover 803 (which covers the receptacle for the rechargeable battery pack).

Figure 8B:
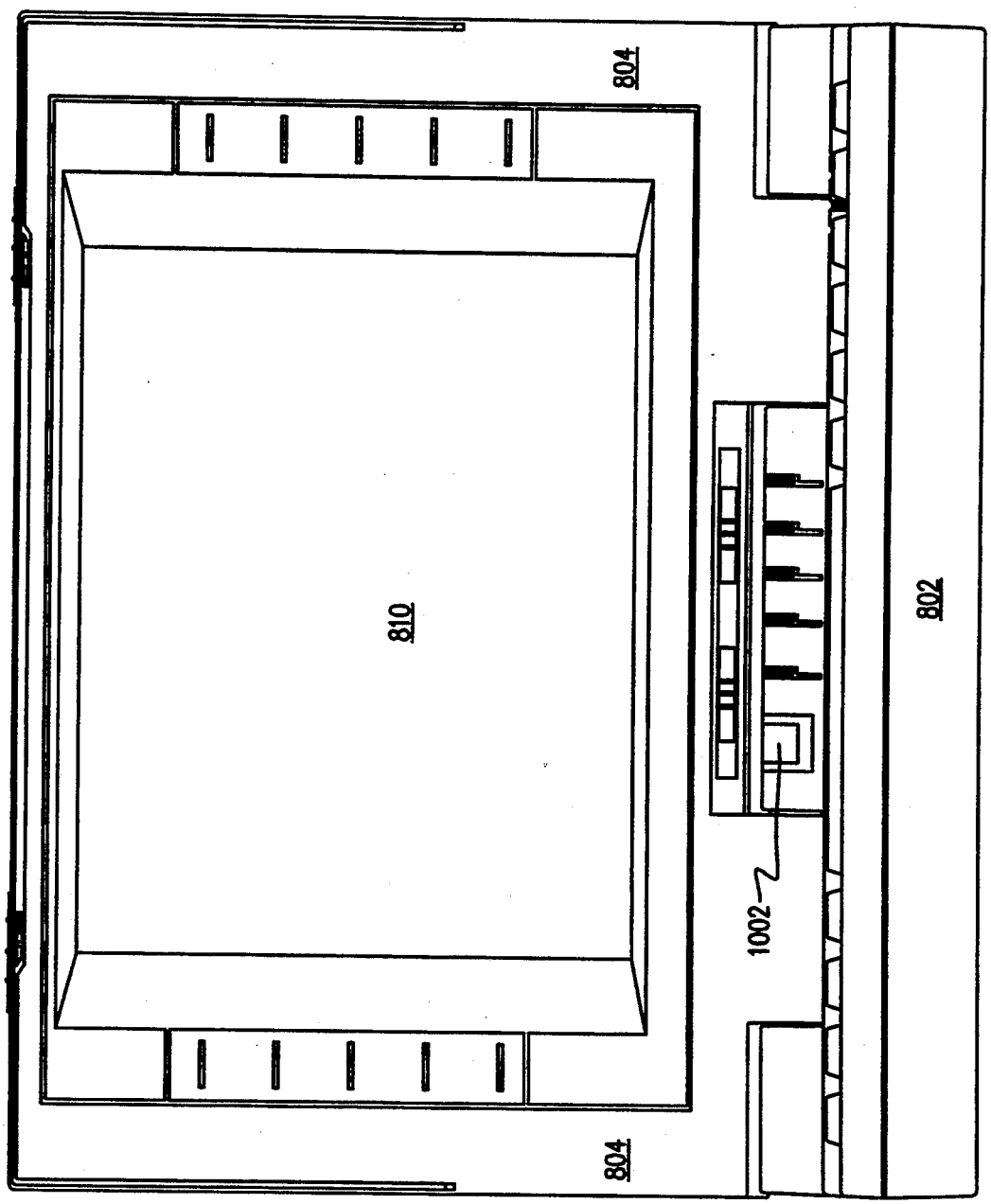

FIG. 8B shows a front view of the computer of FIG. 8A, with the cover open. Note that the dual-purpose standby/sleep button, described below, is visible.

Figure 8C:
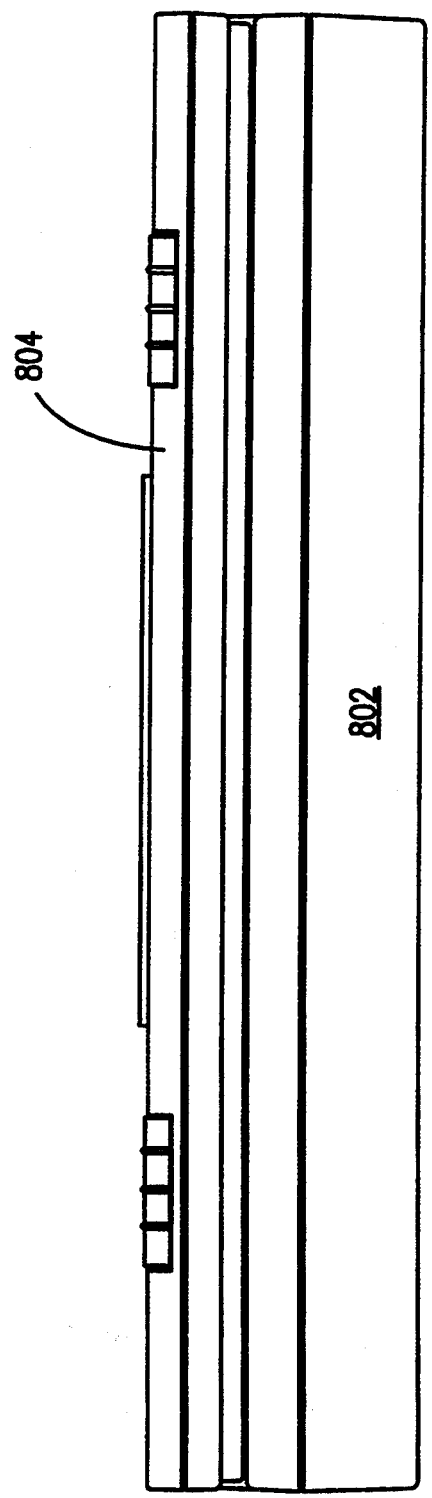

FIG. 8C shows a from view of the computer of FIG. 8A, with the cover closed.

Figure 8D:
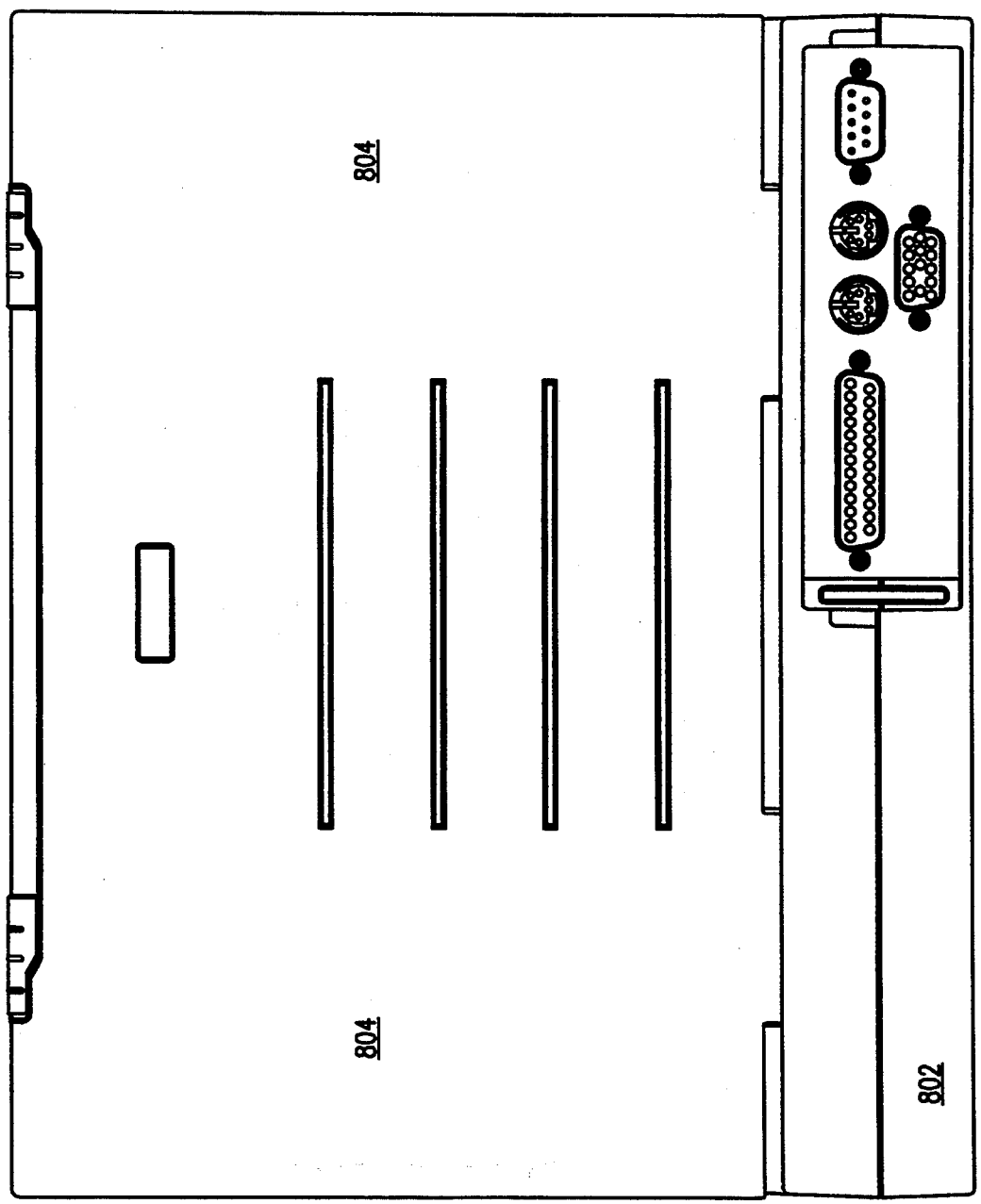

FIG. 8D shows a rear view of the computer of FIG. 8A, with the cover open. Note that keyboard, display, and serial port connectors are visible.

Figure 8E:
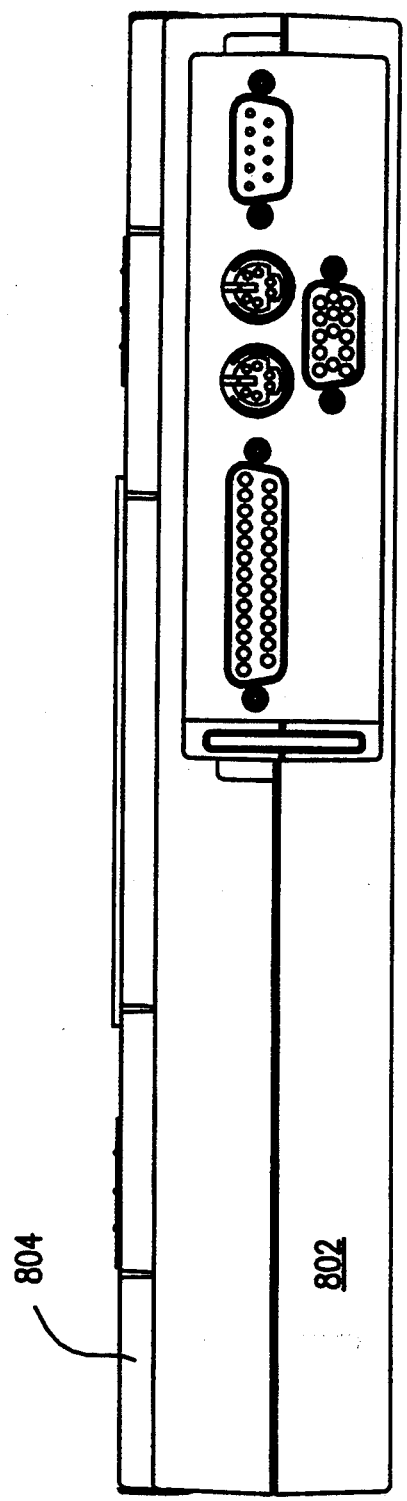

FIG. 8E shows a rear view of the computer of FIG. 8A, with the cover closed.

Figure 8F:
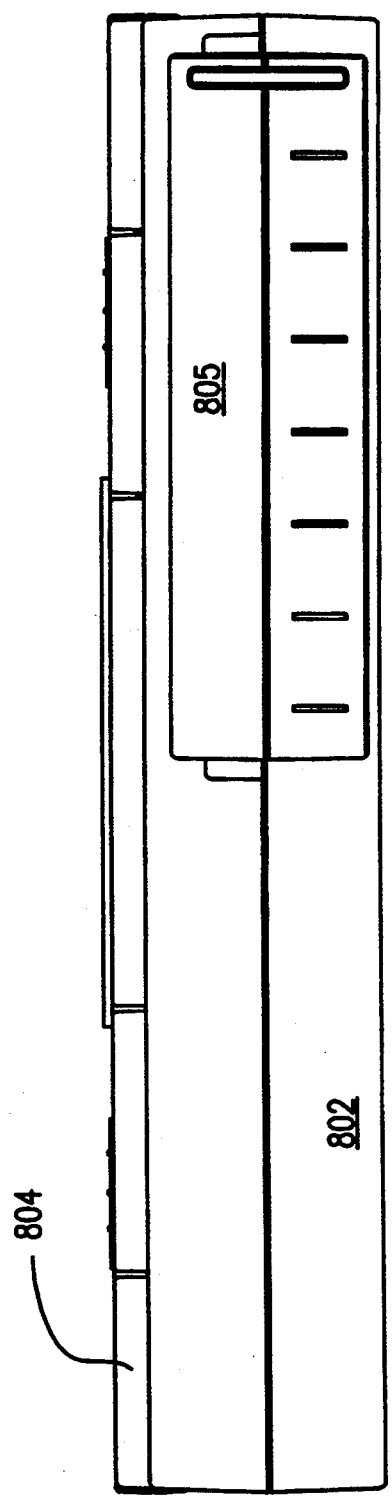

FIG. 8F shows a rear view of the computer of FIG. 8A, with the cover closed, and with a dust cover 805 eraplaced to cover the external connectors visible in FIGS. 8D and 8E.

Figure 8H:
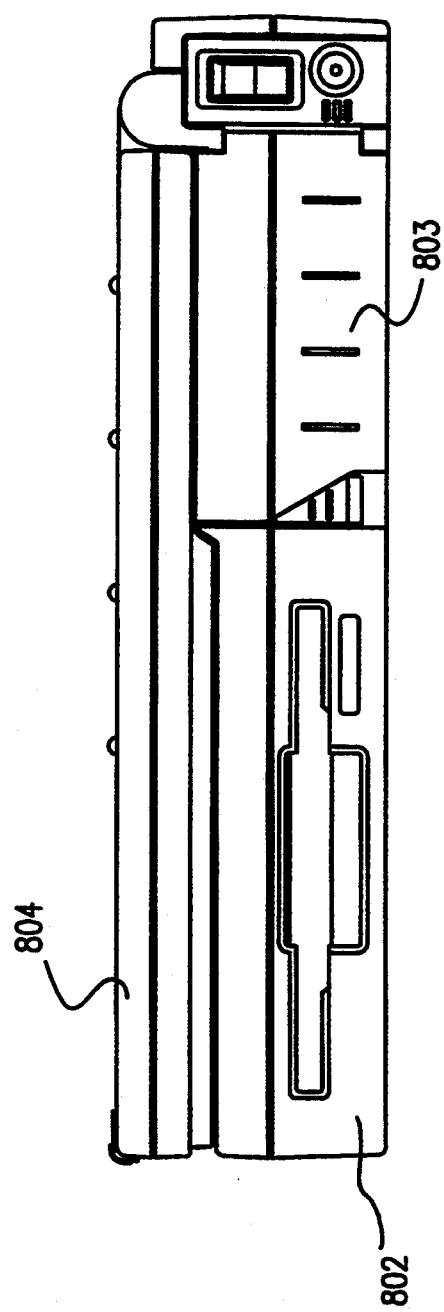
Figure 8J:
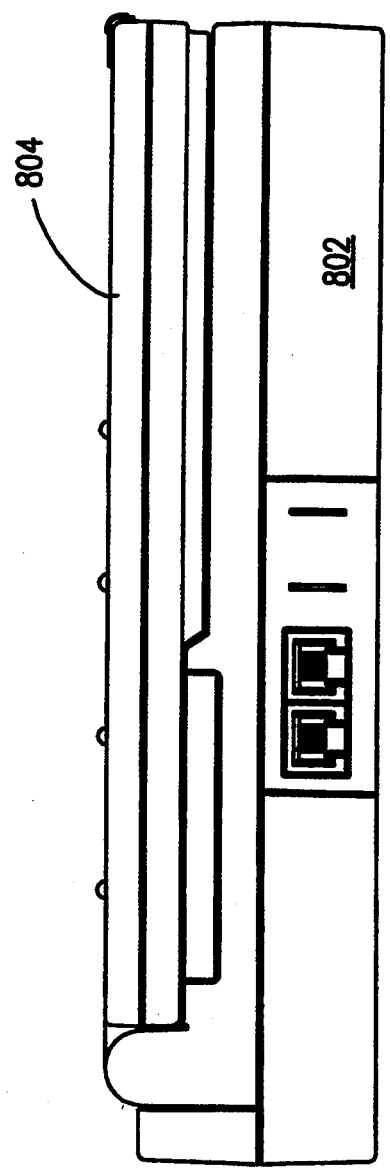

FIG. 8G shows the right side of the computer of FIG. 8A, with the cover open, and FIG. 8H shows the fight side of the computer of FIG. 8A, with the cover closed. FIG. 8I shows the left side of the computer of FIG. 8A, with the cover open, and FIG. 8J shows the left side of the computer of FIG. 8A, with the cover closed.

The presently preferred embodiment is actually planned for production in two versions, one using a CMOS version of the 80286 processor and one using a CMOS version of a 386SX processor. Of course, these two processors are extremely similar to each other, and the differences between them have little relevance to the power of management architecture features described. Disclosed innovations can be applied not only to other Intel 8086-derived processors, such as the 80386 and 80486, but can also be applied to other processor families which may, in the future, find use in low-power portable computer systems.

The presently preferred embodiment relates to systems used in the ecture. (Such systems are also referred to as systems which use the "AT bus.") However, it is alternatively possible to adapt at least some of the disclosed teachings to other architectures, such as EISA bus systems or to other buses which may find use in the future.

In the presently preferred embodiment, an HT21 chip, from Headland Technologies, is used to provide a variety of peripheral support functions to the main microprocessor. These include bus management, memory management, interrupt control, and DMA control. Serial port management and keyboard interface are provided by an 82C186 combination chip from VTI. Of course, other implementations of support logic and glue logic can be used if desired, within this well-known architecture.

The presently preferred system embodiment is a family of two highly similar notebook computers, varying primarily in the processors used. Both have an external closed size of about 8.5×11×2 inches. One version is based on an Intel 80C286 microprocessor running at 12.5 MHz, and the other version is based on an Intel 386SX processor running at 20 MHz. Both notebooks contain similar I/O devices, including, in the presently preferred embodiment:

a Sharp VGA flat panel display;
Conners Peripherals 222 or 242 20 or 40 MB 2.5" hard disk;
Epson 3.5" floppy disk drive;
WD 90C20 VGA controller chip;
VTA 82C106 I/O combo chip;
1 MB on board VSOP memory;
2 expansion memory slots; and
Power management microcontroller, with the Microcontroller
Interface chip ("MILES") gate array assembly.

In addition, the following I/0 connectors are available on the back panel for external devices:
25 pin D connector for parallel/floppy disk;
9 pin D connector for serial;
15 pin D connector for external CRT;
6 pin DIN connector for mouse; and
6 pin DIN connector for external keyboard.

Also available, through slide off panels, are an expansion connector for an optional modem, an 80387SX numeric coprocessor socket, and the 2 expansion memory connectors.

Figure 9:
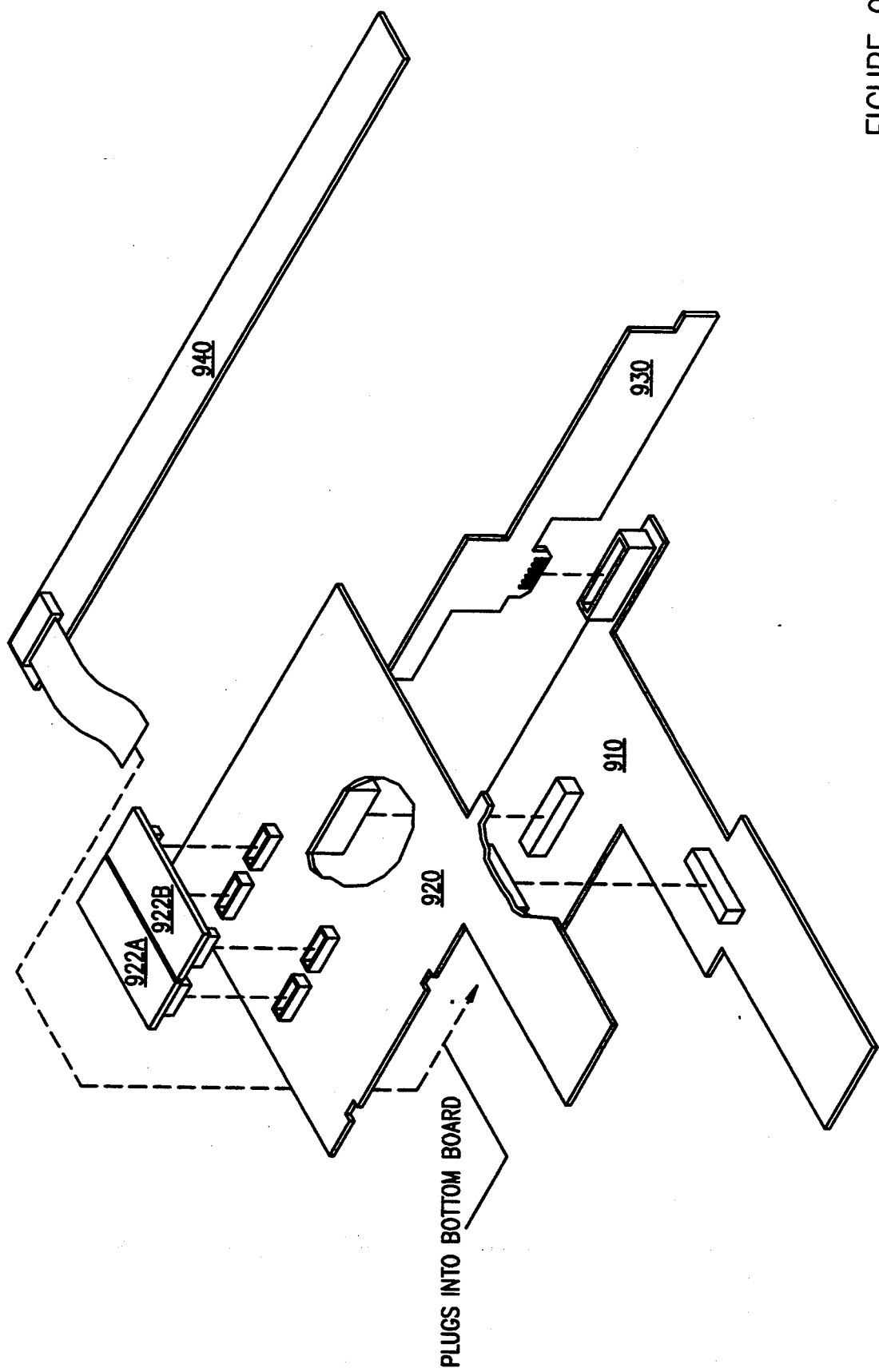
FIG. 9 shows generally how circuit boards are emplaced and connected in the portable laptop computer of the presently preferred embodiment.

FIG. 9 shows generally how circuit boards are emplaced and connected in the portable laptop computer of the presently preferred embodiment. Top board 920, and power module 930, are docked into Bottom board 910.

Figure 10:
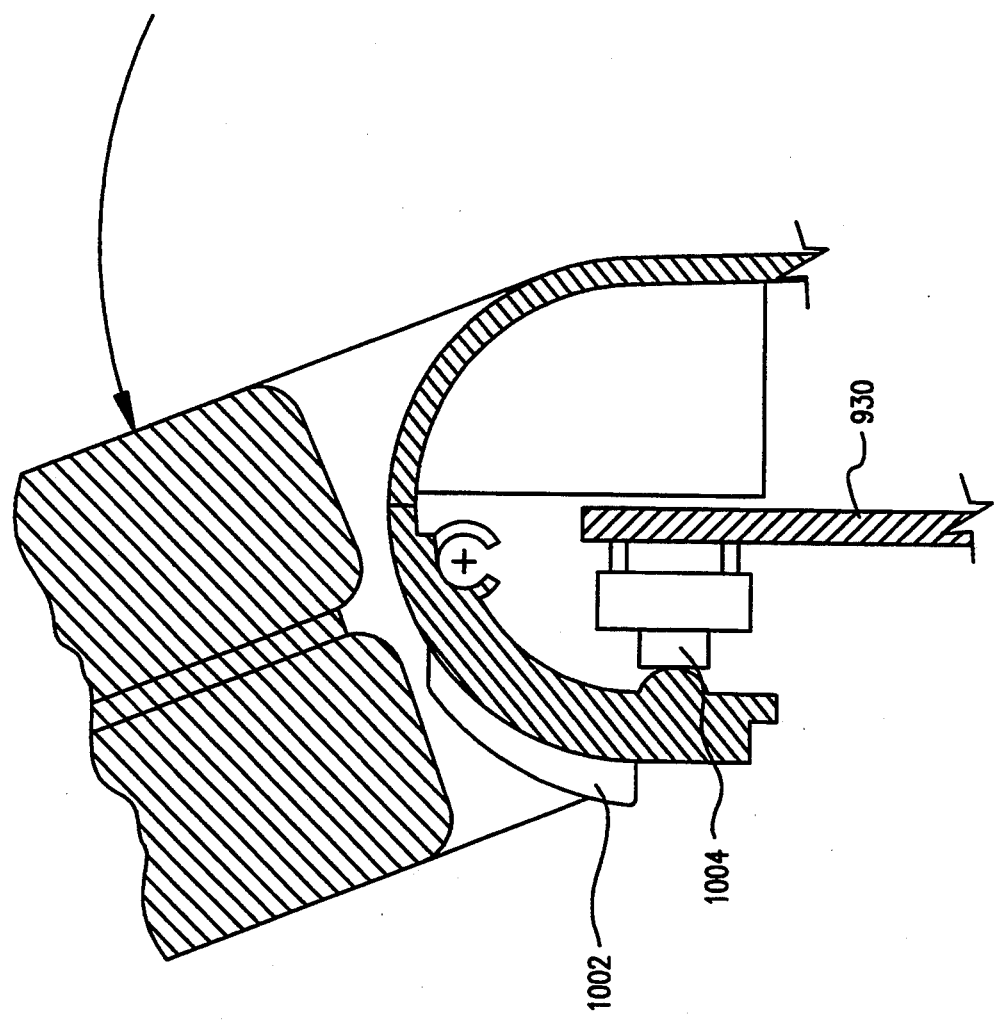
FIG. 10 is a detail view of the case-closing switch and button of the presently preferred embodiment.

FIG. 10 is a detail view of the case-closing switch and button of the presently preferred embodiment. (This is a cutaway view, looking from the fight side of the case, showing the lid in the process of closing.) When the lid 904 is closed, it bears against movable lever 1002, which in turn bears against switch 1004. However, when the lid is open, button 1002 is easily accessible to the user's finger, as may be seen in FIG. 8A.

Thus, the cam-like action of lever 1002 provides reliable button depression when the case is closed. The switch 1004 is mounted, in the presently preferred embodiment, on the power module board 930.

Rechargeable Battery Module

Figure 7A:
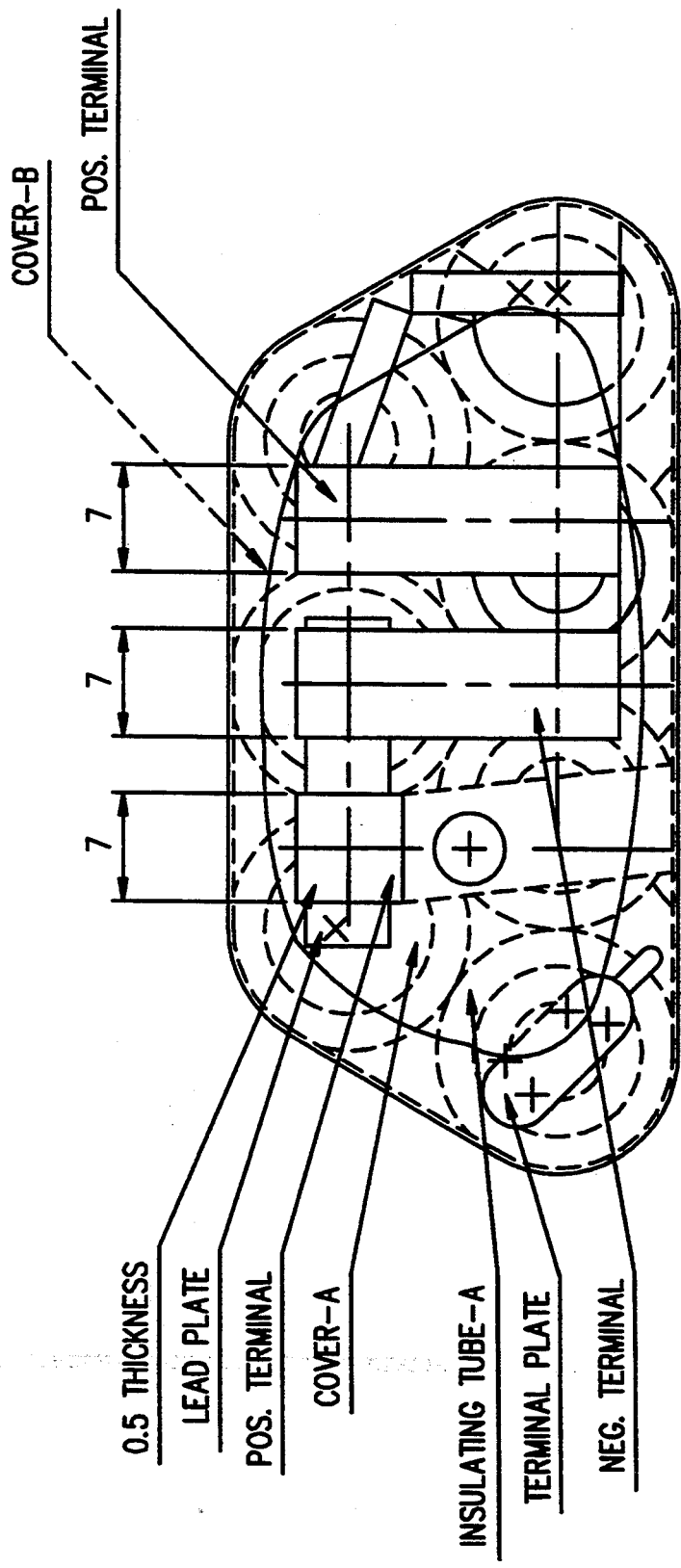
FIG. 7A shows the physical structure.
Figure 7B:
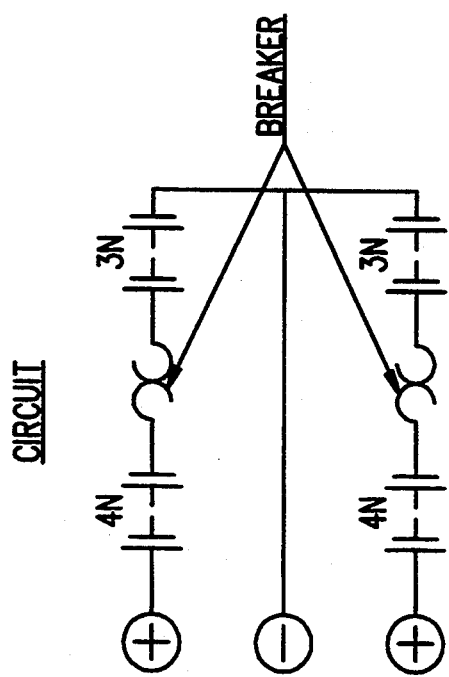
FIG. 7B shows the electrical connections, of the rechargeable battery module of the presently preferred embodiment, containing two electrically separate banks of 7 batteries each.

FIG. 7A shows the physical structure, and FIG. 7B shows the electrical connections, of the rechargeable battery module of the presently preferred embodiment, containing two electrically separate banks of 7 batteries each. Note that a fuse is included in the model of each bank of batteries.

In the presently preferred embodiment, the battery module is configured as two banks of 7 Ni-Cd batteries in series. Thus, each bank provides a rated voltage of 8.4 Volts.

The battery sizes are selected, in the presently preferred embodiment, to provide a charge capacity of 1700 mA-hr for each bank; but of course the battery sizings could be changed if needed.

Connections for Power Supply and Management

Figure 2:
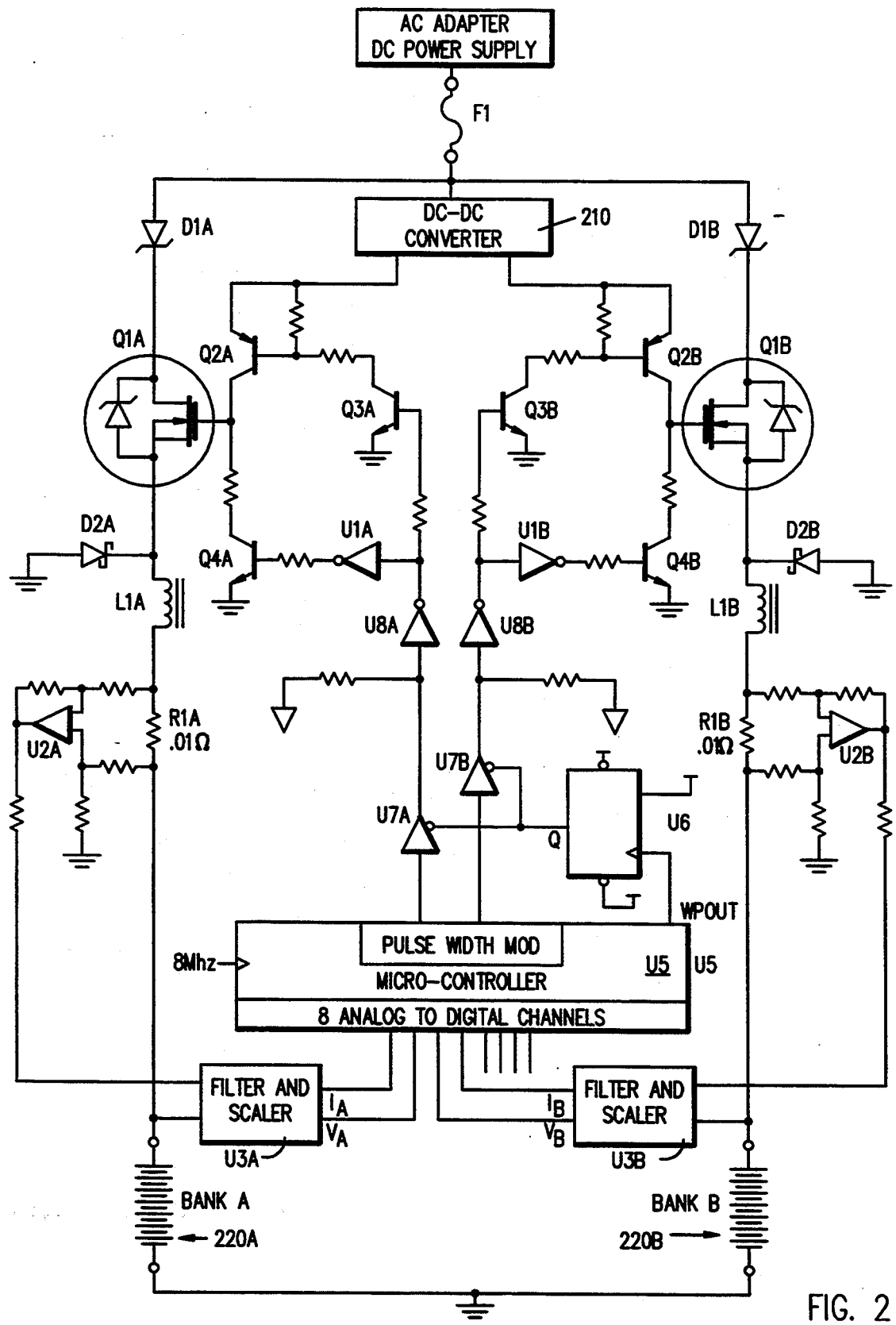
FIG. 2 shows the analog connections used, in the presently preferred embodiment, for monitoring the state of the two battery banks.
Figure 3A:
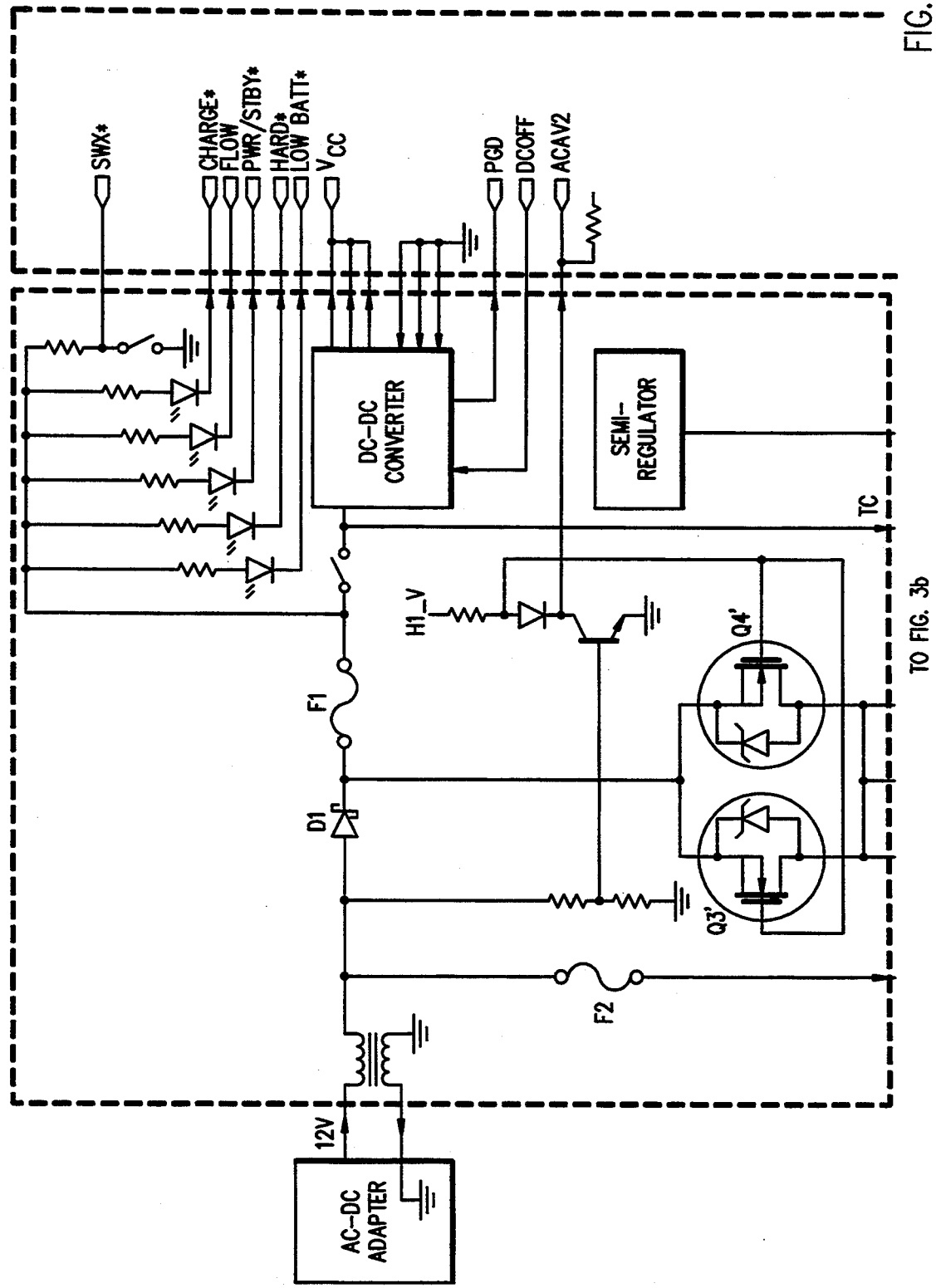
FIG. 3 shows more details of the power-supply and power-control circuitry actually used, in the presently preferred embodiment.
Figure 3B:
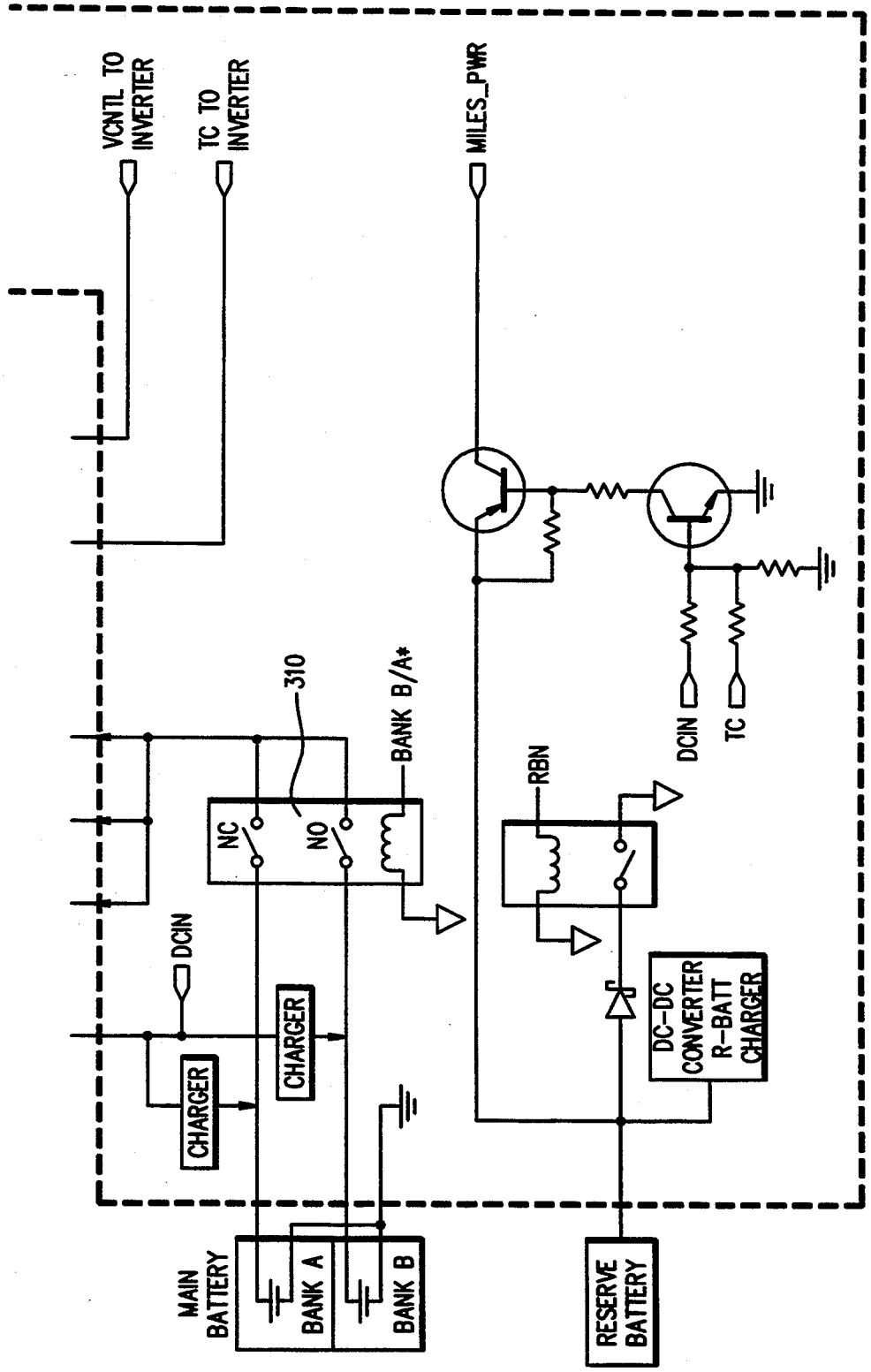
Figure 4A:
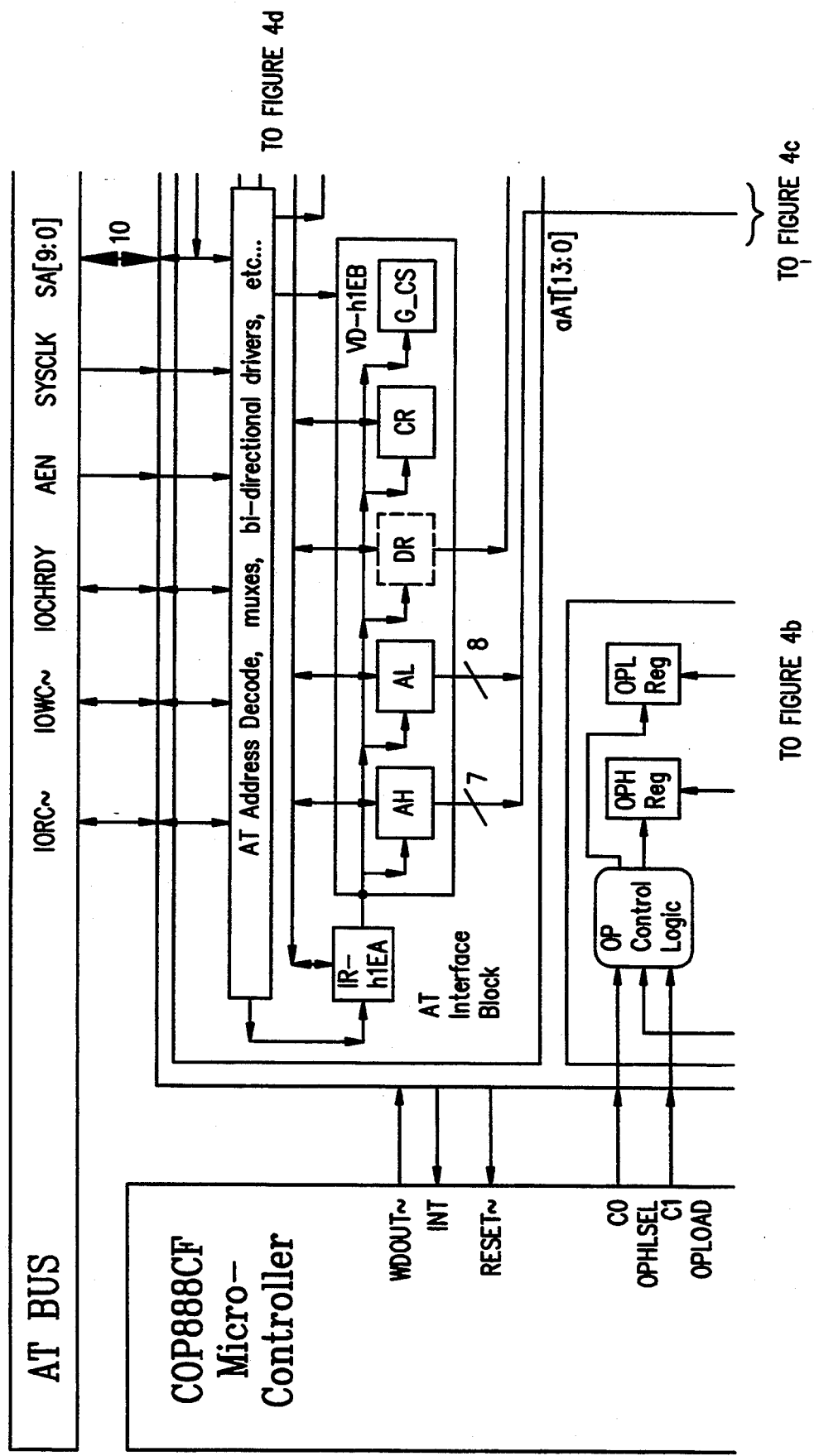
FIG. 4 is a block diagram of the microcontroller interface chip, in the presently preferred embodiment.
Figure 4B:
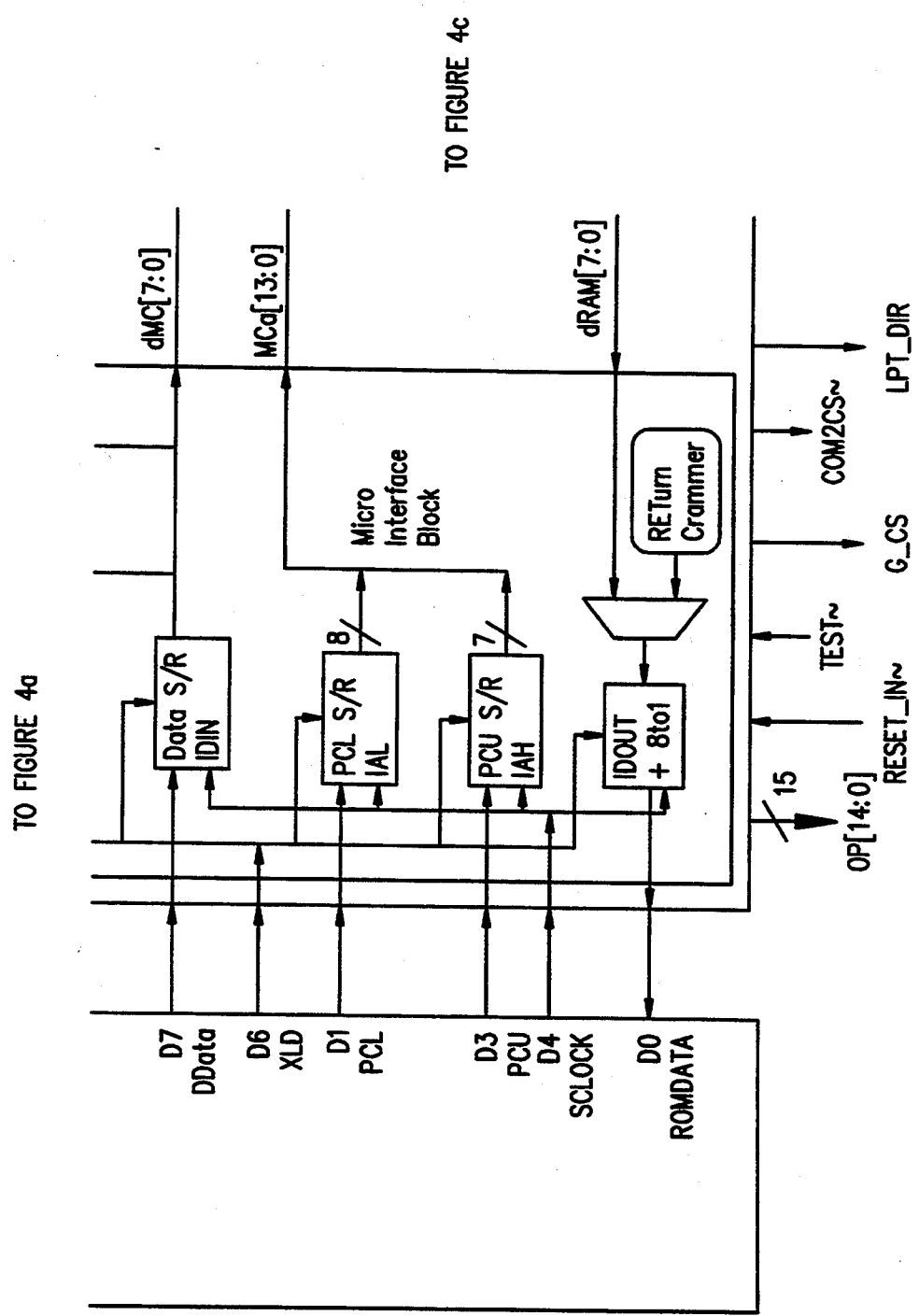
Figure 4C:
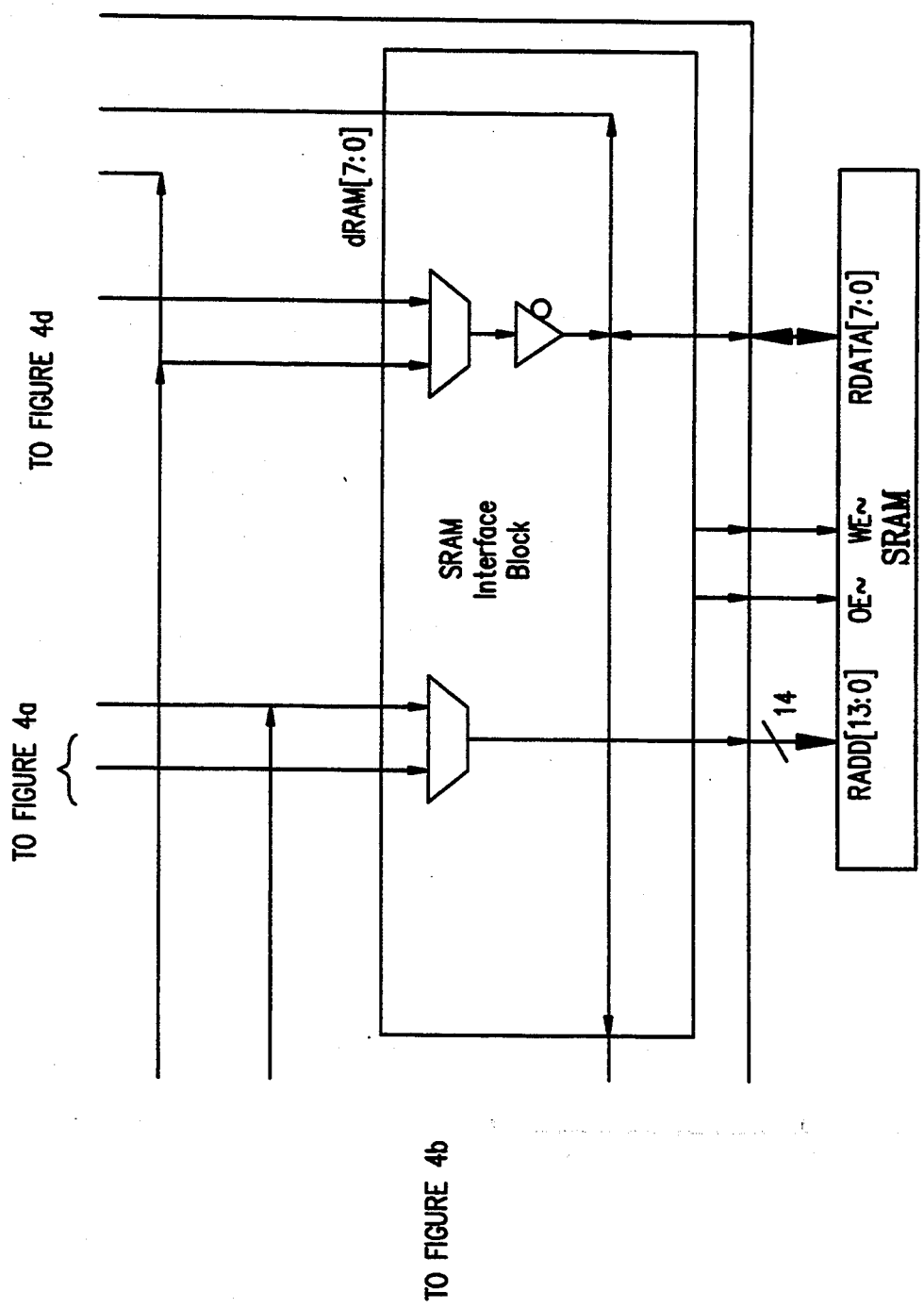
Figure 4D:
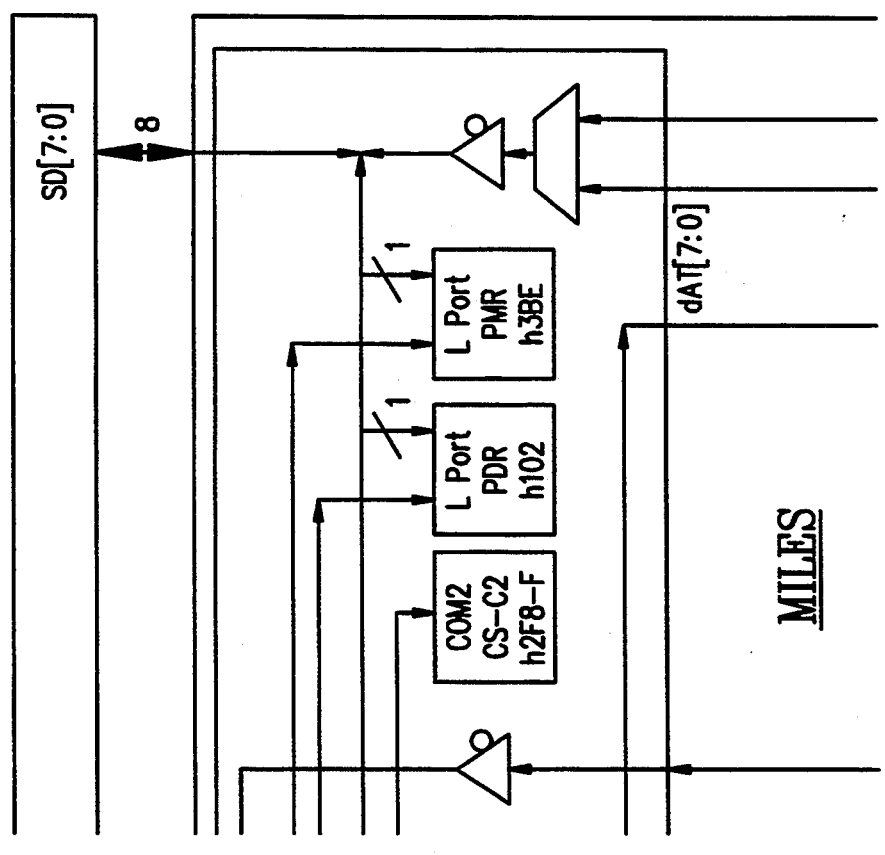

FIG. 2 shows the analog connections used, in the presently preferred embodiment, for monitoring the state of the two battery banks. FIG. 3 shows further details of the power-supply and power-control circuitry in the preferred embodiment.

The power system for any battery powered computer varies quite a bit from a standard desktop computer. The power system used in the presently preferred embodiment is unusual, even for battery powered systems. Power is available from several sources; the main battery, a reserve battery, and an AC to DC adapter which is external to the system. Power from the main battery and the AC to DC converter must be regulated to 5 volts through the DC to DC converter 210. This is located on the System Power Module 930, which is located along the back fight hand wall of the case. the ON/OFF switch is also located on the SPM, and protrudes through the plastic case on the fight side of the unit (as seen in FIG. 8A). Since the external AC to DC adapter and main battery are on a common node on the input to the DC to DC converter, the battery banks are protected from overcurrent from the AC adapter by diodes D1A and D1B. Diodes D1 can dissipate up to 900 mW at their 2 Amp nominal current draw. A significant dissipation results even when a low voltage drop Schottky Barrier diode is used. In the presently preferred embodiment, this power loss is reduced by shorting diodes D1 with a pair of FETs whenever there is no external power being supplied. (This circuit arrangement, with FET pair Q3' and Q4', may be seen in FIG. 3.)

The battery management circuitry, in the presently preferred embodiment, is centered around a national Semiconductor COP888CF microcontroller (shown as U5 in FIG. 2). This device has 8 analog inputs to an analog to digital converter, 2 timer outputs that can be set up as pulse generators, several digital I/O lines and internal program ROM. The microcontroller monitors both banks of batteries 220A and 220B for both the current through, and the voltage of, each string of 7 cells. (In the presently preferred embodiment, each battery bank includes seven KR-1700AE Ni-Cd cells, as shown in FIGS. 7A and 7B.) The microcontroller software applies a very short duty cycle pulse for a period of time to check that the battery is accepting the charge current properly, and is not shorted. Then, when the battery voltage reaches about 7 volts, the pulse width is increased until about 800 mA are being applied.

The microcontroller has a feature called the "Watchdog timer output." Through a fairly safe scheme, this output will generate a pulse on line WPOUT if the microcontroller is not executing its program properly. If this occurs, U6 latches the condition, which tristates U7A and U7B. A pullup on the output causes the gate of Q1A and Q2B to be pulled to ground, shutting the charger's current path off to the battery. This provides a safe condition during reset, and a safe condition in case the microcontroller should fail.

The charge current is regulated through a pulse width modulation scheme in which Q1A and Q1B are switched at a frequency of about 10 kHz. The width of the pulse determines how much average current is allowed to flow through the battery. L1A and L1B are toroidal core inductors that prevent excessive amounts of current to be sourced from the adapter. The two diodes D2A and D2B provide negative current to flow through L1A and L1B after Q1A and Q1B are turned off, and the field induced in L1 collapses. Transistors Q3A and Q2A are turned on to allow the gate of Q1A to be pulled to the 21 volt level of the dc to dc converter. Op amp U2A is used as a differential amplifier across R1A (0.01 ohms) to obtain a signal IA which measures the current from battery bank 220B. The output of U2A is filtered and scaled by U3A, and is read by the microcontroller U5 through one of its analog to digital converter inputs. The pulse width is adjusted by the microcontroller U5 to maintain a constant current of about 800 milliAmps. U3A is also used to filter and prescale the battery voltage measurements, to produce an analog signal VA to U5. Signals VB and IB are similarly generated to measure the voltage and current of the other main battery bank 220B.

Q3 is turned on by the microcontroller pulse through U7 and U8. Turning on Q3 pulls the base of Q2 low, which causes it to conduct, allowing 21 volts to be supplied to the gate of the power FET, Q1. U1 inverts the signal from the microcontroller, turning Q4 off whenever Q3 is on when the signal from the microcontroller goes inactive (high), the base of Q4 is driven high, causing Q4 to conduct and drain the gate capacitor of Q1 through a small resistor (about 220 ohms) to ground. This allows for a fast turn off and turn on time for the FET (Q1). Keeping Q1 in its non-linear region keeps it from becoming heated, so that no heat sink is needed for these FETs.

FIG. 3 shows some additional details of the power management circuitry. This circuitry is shown primarily for very full compliance with the best mode requirements of the U.S. patent law. Note, however, the relay 310, which switches back and forth between the two battery banks 220A and 220B.

Power-Management Program

The following high-level pseudo-code shows the program structure which is a actually used, in the presently preferred embodiment, for power management.
POWER ON
    Perform basic integrity check
    Check power switch
        If switch on go to NORMAL START
        If switch off go to NORMAL CHARGE MODE
NORMAL START
    Turn on POWER ON led
    Initialize port direction and interrupt registers
    Initialize timers
    Test for AC Available
    Begin Normal Operation MAIN Loop
MAIN—(Normal Operation)
    Monitor—Battery Voltage Standby Switch AC Available System ON switch and blink Charge LED if on Activity Lines (Reset timeouts when active) If Dynamic adjustment enabled reset HD and floppy timeouts during keyboard activity.
TIMER INTERRUPT—5.12 msec.
    Service Watch Dog Timer Register
    Store current battery voltage
    Compare with past for rapid drop detection
    Compare with minimum absolute level
    Compare with warning level
        Test alternate battery before activating alarm and switch batteries if indicated
    Decrement Seconds Timer
        Each Second:
            Decrement timeout counters
                Battery Change
                Hard Disk
                System Sleep
                Backlight Timeout
    If Beeper active
        Decrement pause counter and call BEEP
    Test and debounce standby switch
BATTERY DETECT INTERRUPT
    Switch to reserve battery
    Start 2 minute timeout for system power off
    Turn off LCD to reduce power consumption
    If Floppy and HD not active, put system in standby mode
    Accumulate reserve battery use time, (After 1 minute of reserve on time, or one month of operation, the reserve charger will be enabled during the next battery charge cycle. After 2 minutes of use the reserve battery will be charged from the main battery if no AC is available.) Monitor BDT* line for new battery installed to terminate function Test new battery and switch reserve off if voltage good
BATTERY CHANGE
    Read current battery voltage
    Read target battery voltage
    Switch if alternate is same or higher
LOW-POWER—1 mode
    BEEP for 5 seconds (2 times every second) (COP should enable speaker on low volume if user has it off)
    Turn on LOW BATTERY LED
    Set Low Power 1 Flag
LOW-POWER—2 mode
    Beep for 5 seconds (2 times every second) (COP should enable speaker on high volume regardless of the user setting)
    Flash LOW BATTERY LED
    Turn off LCD back light
    Set CPU clock to slow speed
    Set Low Power 2 flag
    Enable keyboard interrupt and turn LCD backlight on with any key
    Scan for presence of external power or new battery
LOW-POWER—3 mode
    Place main CPU in standby mode if not already there
    Output continuous beep for 3 seconds
    Save voltage reading for future comparison
    Turn off the power module
POWER ON ALARM (Standby Switch held low for 5 sec or more)
    Exit immediately if external video active
    LCD backlight is turned off
    CPU clock speed goes t slow speed.
    Flash Power On LED indicating Standby mode
    A beep alarm is sounded if operating on batteries. (2 beeps every 4 minutes)
    Monitor the standby switch to determine when the LCD panel is opened to exit this mode.
    Exit standby immediately when the cover is opened.
STAND-BY/RESUME KEY
    Enter and exit standby when button lifted CPU clock set to slow speed
LCD backlight is turned off
CPU is placed in HOLD mode for minimum power consumption
POWER LED is flashing (0.5 sec on 2 sec off)
COP pulses the HT21 refresh line to refresh memory
Monitor the STAND-BY/RESUME key to exits stand-by mode
Exit hold for a fixed period on each timer interrupt to allow system time to be maintained.
Mask keyboard and mouse interrupts and have COP clear the keyboard controller buffer and restore the interrupt controller mask register before exiting standby.

SLEEP MODE
Reduce clock speed to slow
Turn off LCD backlight
Enable keyboard interrupt
Monitor system activity (keyboard, ports, and restore full speed if any activity detected
If inactive for more than 1 minute and AC is available, begin Sleep Charge Mode
Allow Standby Key press to exit sleep mode NORMAL CHARGE MODE
Turn on CHARGE led
If Reserve Charge Flag set, start reserve charge with 2.5 hour fail safe timeout
Minimum duty cycle for 3 minutes
Monitor voltage rise and current
If max voltage and no current then battery open
If current rise with no voltage then shorted
If OK gradually increase current to target value of 750 mA. Start fail safe timeout of 4 hours
Monitor voltage until it starts to decline or holds constant for xx minutes
If voltage reaches the power supply maximum then monitor the charge current watching for an increase or a constant value for xx minutes to indicate end of charge
When end conditions are reached shut off charging current Flash CHARGE led at a low duty cycle when charged
Wait 0.5 hour with charge off before resuming trickle charge on batteries to allow them to cool off from charge SLEEP CHARGE MODE
Turn on CHARGE led
Minimum duty cycle for 3 minutes
Monitor voltage rise and current
If max voltage and no current then battery open
If current rise with no voltage then shorted
If OK gradually increase current to target value of xxx mA. Start fail safe timeout of xx hours
If voltage reaches the power supply maximum then monitor the charge current watching for an increase or a constant value of xx minutes to indicate end of charge
Exit charge mode and start blink of CHARGE led before system exits sleep mode
Flash CHARGE led at a low duty cycle when charged
When end conditions are reached shut off charging current HOST BIOS FUNCTIONS
POST
Reset COP
Checksum MILES SRAM and compare version number
If necessary reload COP program
Start COP
Transfer setup parameters to SRAM and clear CDONE to interrupt COP
Check for proper operation of COP
Set processor to compatibility speed (per SETUP)
Turn on LCD backlight
SWITCH DISPLAYS
Send Display_Type command to COP (LCD/CRT)
WAIT FOR KEY (INT 16H function 0)
If no character is available issue a CPU-HOLD command to the COP
SETUP
COP returns status of standby button, et. to setup
Transfer interrupt mask to be used in standby to COP
Transfer parameters to COP before-exiting setup
CTL/ALT/DEL (soft boot)
Place COP in reset before resetting CPU
EXTERNAL PROGRAM INTERFACE
Verify power status before programming Flash Eproms
Enable reserve battery for Flash programming power backup The Appendix shows a detailed implementation of the COP code to perform these functions, in the presently preferred embodiment. However, the foregoing listing shows the key relations of the preferred program structure.

CPU AND BUS MANAGEMENT

The presently preferred embodiment provides two versions, differing primarily in the choice of CPU: one version with an Intel 80C286, and one version with an Intel 386SX.

The presently preferred embodiment relates to systems used in the ISA architecture.

(Such systems are also referred to as systems which use the "AT bus.") However, it is alternatively possible to adapt at least some of the disclosed teachings to other architecture's, such as EISA bus systems or to other buses which may find use in the future.

In the presently preferred embodiment, an HT21 chip, from Headland Technologies, is used to provide a variety of peripheral support functions to the main microprocessor. These include bus management, memory management, interrupt control and DMA control. Additional information regarding this chip may be found in its data sheet, which is available from Headland Technologies, and which is hereby incorporated by reference.

Serial port management and keyboard interface are provided by an 82C186 combination chip from VTI. Of course, other implementations of support logic and glue logic can be used if desired, within this well-known architecture.

In the presently preferred system embodiment, the BIOS is carried in flash EPROM. Thus, BIOS update requires erasing the flash EPROM. If power were lost while this operation were in progress, the machine would become nonfunctional. Therefore, in the presently preferred embodiment, the on/off switch is disregarded while flash EPROM programmation is in progress.

POWER-MANAGEMENT MICROCONTROLLER

A COP888CF microcontroller is used to perform the power-management functions, in the presently preferred embodiment. This microcontroller has an unusual feature: A/D converter circuitry is included on-chip, so that the chip can directly receive 8 channels of analog input. However, alternatively, other microcontrollers could be used, with off-chip converters or analog interface chips if desired.

THE MICROCONTROLLER INTERFACE CHIP ("MILES")

FIG. 4 is a block diagram of the microcontroller interface chip, in the presently preferred embodiment. This figure shows significant signals which interface to the other chips, and also shows some important on-chip registers. The significance of these signals and registers will now be described.

The microcontroller interface chip (which is often referred to herein as "MILES") is an interface chip between the National Semiconductor COP888CF microcontroller, its SRAM for program memory, and the AT bus.

The Microcontroller Interface Chip allows the BIOS to download programs to the SRAM, and the COP888CF can thus execute in ROMless mode by fetching code from the SRAM. This is accomplished by a serial communication channel between the Microcontroller Interface Chip and the Microcontroller.

The Microcontroller Interface Chip also allows the COP888CF to read and write to the AT bus, so that it can control the system clock speed register in the HT21 chip, etc. The AT bus also has the capability to perform I/O reads or write to the SRAM while the COP888CF is executing code.

The COP888CF performs power management functions such as monitoring the battery level, turning off the display when not in use, and powering down the machine after programmable periods of inactivity.

The main function of the Microcontroller Interface Chip is to interface between COP888CF microcontroller, an external SRAM, and the AT bus (which is driven by the HT21 chip by Headland Technologies).

FUNCTIONAL BLOCK DEFINITIONS

MILES AT BUS INTERFACE BLOCK

This interface (schematically shown in FIG. 4) controls the AT address, data, and control signals (IORC~, IOWC~, AEN, IOCHRDY (In the present document, a tilde~following a signal name is used conventionally to indicate an inverted or active-low signal.) when executing AT I/O cycles to the Microcontroller Interface Chip. This interface handles both slave and master cycles on the AT bus by providing an intelligent state machine. This state machine keeps track of AT cycles as well as tristating the address/data busses and control signals. Address bits are be latched, and data bits are not latched, on slave cycles (i.e., when an AT master is writing to the SRAM). Data is read from or written directly to the SRAM.

MILES COP888CF MICROCONTROLLER BLOCK

This interface (schematically shown in FIG. 4) includes a serial/parallel shift register for both the address and the data paths. The SRAM address is supplied from the AH and AL registers. The COP888CF always provides the address and data serially, and expects to receive the data requested serially on the next cycle. As will be described later, COP888CF reads from certain addresses are treated as Exception Cycles by the Microcontroller Interface Chip.

The microcontroller address is first shifted into the Microcontroller Interface Chip serially via the COP888CF D port pins D1 and D3 and then, depending on the cycle type, is passed to the SRAM or the AT bus. The COP888CF read data is then latched in the Microcontroller Interface Chip and shifted serially into the DO pin of the microcontroller while the D port write data is shifted into the Microcontroller Interface Chip from the D7 pin and redirected to the SRAM, or the AT bus.

This block also includes two 8-bit control registers which can be loaded from the output data from the D7 pin of the microcontroller. Fifteen of these status bits are output directly to MILES output pins to control various external devices. The remaining bit selects either 1) AT I/O cycles or 2) SRAM or Register cycles for the COP888CF Exception Cycles. (See Sect 1.3.4.)

MILES EXTERNAL SRAM BLOCK

This interface (schematically shown in FIG. 4) generates the SRAM control signals (OE~, WE~, CE~) as well as tristating the data bus during SRAM read cycles. Internal handshake signals, between the SRAM, the microcontroller and the AT bus, are mainly decode signals to distinguish between cycle types. The SRAM interface is compatible with 8K×8 memory as well as 32K×8.

MILES STATE MACHINES

The Microcontroller Interface Chip Gate Array includes two state machines: 1) a Slave state machine, and 2) a Master (Exception Cycle) state machine.

The Slave state machine tracks any AT bus cycles to the SRAM and generates the AT system data (SD) tristate enables. It slow monitors the AT signals SA, IOWC~, IORC~, and AEN to distinguish between read and write cycles. It also generates IOCHRDY to insert wait states on the Microcontroller Interface Chip Slave I/O cycles to SRAM until the COP888CF is finished accessing the SRAM. This prevents conflicts between microcontroller accesses and AT accesses to the SRAM.

The second state machine, the Master state machine, controls all Exception Cycles. This includes microcontroller writes to the SRAM, the Microcontroller Interface Chip Master I/O cycles to the AT Bus, and the Set CDONE Bit cycles. This state machine drives the necessary AT control signals and busses required for the Master I/O cycles (SD, SA, AEN, IOWC~, and IORC~).

MILES MISCELLANEOUS BLOCK

This block includes latches for AT control signals IOWC~, IORC~, IOCHRDY). It also includes logic to generate the state machine reset signal when the microcontroller is HALTed since the COP888CF Shift Clock does not clock during HALT. It also includes the slave state machine time out signal generated from a 3-bit counter.

MILES REGISTER DEFINITIONS AT BUS INTERFACE REGISTERS

These four registers and one chip select are the only the Microcontroller Interface Chip registers that appear in the AT address space. The address in the table heading is the AT address.

Index Register (IR): AT Address: h1EA

| X | X | X | X | X | Index Value |
|---|---|---|---|---|---|

The Index Register (IR) is an 8-bit index into the Internal Interface Registers (IIR) of the Microcontroller Interface Chip. When the AT bus master reads or writes to the Virtual Data Register (VD), it accesses the (IIR) indicated by the contents of the (IR). Only bits 2-0 are implemented. All other bits will be read as zeroes. Writing to bits 7-3 has no effect. On RESET_IN~low, this register is set to zero.

Virtual Data Register (VD): AT Address: h1EB

| Virtual Data |
|---|

The virtual Data Register (VD) is an 8-bit port into the (IIR) of the Microcontroller Interface Chip. When the AT bus master accesses the (VD), it actually accesses the (IIR) indicated by the current value of the (IR).

Parallel Port Direction Register (PPD): AT Address: h3BE,SD5

| X | X | PPD | X | X | X | X |
|---|---|---|---|---|---|---|

The Parallel Port Direction Register (PPD) is a single-bit register used in conjunction with the Parallel Port Mode Register (PPM) to control the direction of the Parallel Port. When the (OOM) is set for Extended Mode Operation, this register controls the LPT_DIR pin out of the Microcontroller Interface Chip. When the (PPM) is set for Compatibility Mode Operation, then the LPT_DIR pin is always forced high (i.e., the Port is always an output) and the (PPD) has no effect on the port. Only bit 5 is implemented. Writing to any other bits will have no effect. This register cannot be read from the Microcontroller Interface Chip. When this address is read, the Microcontroller Interface Chip will not drive the SD bus; another device may drive the data (but not necessarily). On RESET_IN~low, this register is set to zero.

Parallel Port Mode Register (PPM): AT Address: h102,SD7

| EMODE~ | X | X | X | X | X | X |
|---|---|---|---|---|---|---|

The Parallel Port Mode Register (PPM) is a single-bit register used to set the Mode of Operation of the Parallel Port. When bit 7, SD[7], is written low, the port is set to Extended Mode operation. When bit 7 is written high, the port is set to compatibility mode operation, with the port configured as an output. Writing to any other bits will have no effect. In the presently preferred embodiment, only bit 7 is implemented. This register cannot be read from Microcontroller Interface Chip. When this address is read, the Microcontroller Interface Chip will not drive the SD bus, another device may drive the data (but not necessarily). On RESET_IN~low, this register (bit 7 only) is set to one.

| EMODE~ = 1 → LPT_DIR = HIGH |
| EMODE~ = 0 → LPT_DIR = PPD~ |

COM2CS~(C2) Modem Chip Select: AT Address: h2F8-h2FF

The COM2CS~(C2) is a direct decode of the above AT addresses. Whenever there is an I/O read or write in this address range, the COM2CS~pin on the Microcontroller Interface Chip will be driven low. All other times it is inactive high the Microcontroller Interface Chip does not drive onto the SD bus during these accesses. Reset has no effect.

MILES Internal Interface Register (IIR)

These four registers are used to generate and control AT read and write accesses to the SRAM. They are accessed indirectly from the AT bus by writing the address f the desired register into the (IR) and performing a read or write cycle to the (VD) Register.

Address High Register (AH): AT Address: h1EB

| X | A14 | A13 | A12 | A11 | A10 | A9 | A8 |
|---|---|---|---|---|---|---|---|

The Address High Register (AH) contains the 7 high order address bits of the 14-bit address to be applied to the SRAM. During AT I/O reads or writes to the SRAM, the contents of this register are input to address pins A8-A13 of the SRAM. A14 is output on pin OP14 if it is enabled by the A14EN bit in the Control Register. The AH register does not increment after access to the Data register. The unused bit (7) is not implemented and will be read as a 0. Writing to the unused bit has no effect. The AH Register is undefined after RESET_IN~goes low.

Address Low Register (AL): AT Address: h1EB

| A7 | A6 | A5 | A3 | A1 | A0 |
|---|---|---|---|---|---|

The Address Low Register (AL) contains the 8 low-order address bits of the 13-bit address to be applied to the SRAM. During ATI/O reads or writes to the SRAM, the contents of this register are input to address pin A0-A7 of the SRAM. During SRAM accesses, the AL register auto increments as an 8-bit counter. The register is incremented at the completion of an access to the Data Register. The AL Register is undefined after REST_IN~goes low.

Data Register (DR): AT Address: h1EB

| D7 | D6 | D5 | D4 | D3 | D2 | D1 | D0 |
|---|---|---|---|---|---|---|---|

The Data Register (DR) is the data port to the SRAM for AT Master and Slave I/O cycles. Since the AL register auto-increments, sequential reads can be accomplished by multiple reads from the DR. Likewise, sequential writes to SRAM can be accomplished by multiple writes to the DR. The DR does not actually latch data; it is a data port between the Microcontroller Interface Chip and the AT.

Control Register (CR): AT Address: h1EB

| X | X | X | A14EN | WDOUT~ | RST~ | CDONE |
|---|---|---|---|---|---|---|

The Control Register (CR) contains 4 bits which control or contain information about the state of the Microcontroller Interface Chip gate array. The unused bits (7-4) are not implemented and will be read as )'s. Writing to the unused bits has no effect. The Control Register bits are described on the following page:

The Microcontroller Interface Chip Control Register (CR) bits are defined as follows:

A14EN: A14EN controls whether A14 is output form port OP14 during SRAM accesses.

This allows the upper 16 k of a 32 k×8 SRAM to be used.

1—A 14 output on OP 14.
0—A14 not output on OP14.
0 is the RESET_IN~value.

WDOUT~: WDOUT~reflects the value of the WDOUT~signal from the COP888CF.

WDOUT~can be serfcleared in three ways:
1) set to 1 by writing a 1 to the WDOUT~bit in the Control Register.
2) set to 1 by asserting the RESET—IN~pin low.
3) cleared to 0 by asserting the WDOUT~pin from the microcontroller.

The COP888CF asserts a pulse when the WatchDog times out; it does not hold it.

RST: The RST~bit controls the RESET~output to the COP888CF microcontroller.

When RST! is low, the COP***CF is held in reset and ATI/O cycles to the (DR), and SRAM accesses will complete with no wait states. When RST~is high, the COP888CF will be executing code, and ATI/O cycles to the (DR) may have wait states inserted by IOCHRDY while the Microcontroller Interface Chip waits for the proper time in the COP888CF instruction cycle to access the SRAM.

1—the RESET~output pin is driven high (deasserted)
0—the RESET~output pin is driven low (asserted)
0 is the RESET_IN~Value (the Microcontroller Interface Chip Reset)

CDONE: The Controller DONE bit is a handshake bit between the AT host and the COP888CF microcontroller. The COP888CF will set this bit to indicate that it has performed the action requested by the AT host. To indicate that it has performed the action requested by AT host. To indicate that it wants the COP888CF to perform an operation, the AT host should load a command into the SRAM, clear the CDONE bit, and poll the CDONE bit to see when the COP888CF has completed executing it. When the Microcontroller Interface Chip sees the CDONE bit has been cleared, it asserts INT (interrupt) to the COP888CF. The interrupt handling routine will fetch the command from SRAM, execute it, and then execute the set CDONE Exception Cycle setting the CDONE bit which deasserts the INT signal. The CDONE bit can be set/cleared in four ways:

1) Set when RESET_IN~is asserted.
2) Set when MC_RST~bit is asserted.
3) Set by the COP888CF via Exception Cycle.
4) Cleared by an AT I/O write of 0 to the CDONE bit.

Generic Chip Select (GCS): AT Address: h1EB
Index: b 100

An I/O read or write to this address will cause pin GCS~(Genetic Chip Select) to be asserted low while IOWC~or IORC~is asserted.

MILES COP888CF Internal Only Registers

These registers are part of the serial interface to the COP888CF and are not directly accessible to the AT channel.

Internal Address High register (IAH): (No AT Address)

| X | A14 | A13 | A12 | A11 | A10 | A9 | A8 |

The Internal Address High register (IAH) contains the upper byte of the address the COP888CF shifted out of the D3 pin. This address will be combined with IAL register and presented to the SRAM or AT Address Bus, depending on the cycle.

Internal Address Low register (IAL): (No AT Address)

| A7 | A6 | A5 | A4 | A2 | A1 | A0 |

The Internal Address Low register (IAL) contains the lower byte of the address the COP888CF shifted out of the D1 pin. The address will be combined with the IAH register and presented to the SRAM or AT Address Bus, depending on the cycle.

Internal Data Out register (IDOUT): (No AT Address)

| D7 | D6 | D5 | D4 | D3 | D2 | D1 | D0 |

The Internal Data Out register (IDOUT) is written with the COP888CF D-port data. It is serially shifted out of the D7 pin at the same time as the address. This data is the microcontroller output data for all microcontroller write cycles to the SRAM or AT channel.

Internal Data In register (IDIN): (No AT Address)

| D7 | D6 | D5 | D4 | D3 | D2 | D1 | D0 |

The Internal Data In register (BIN) contains the byte of data that was read from the SRAM and will be shifted into the DO pin of the COP888CF.

Internal Output Port High register (OPH): (OP Register)

| IO_M~ | OP14 | OP13 | OP12 | OP11 | OP10 | OP9 | OP8 |

The Internal Output Port High register (OPH) and the Internal Port Low register (OPL) and internal registers that are controlled by the C1 and CO pins of the COP888CF C-port. On XLD, if cl=1, the data from the IDOLIT register is latched into the □P register indicated by the CO bit. The IO_M~bit is a dedicated control bit. During Exception Cycles, it selects either 1) I/O read/write cycles or 2) SRAM Writes or Set CDONE Bit cycles. All the other bits are output on the OP [14:8]pins. When RESET_IN~goes low, the OPH register is cleared to all zeros.

Internal Output Low register (OPL): (OP Register)

| OP7 | OP6 | OP5 | OP4 | OP3 | OP2 | OP1 | OP0 |

The Internal Output Port Low register (OPL) and the (IOH) register are internal registers that are controlled by the C 1 and CO pins of the COP888CF C-port. On XLD, if Cl=1, the data from the IDOUT register is latched into the OP register indicated by the CO pin. All the OPL bits are output on the OP [7:0] pins. When RESET_IN~ goes low, the OPL register is cleared to all zeros.

Internal Address Compare register (IAC): (No AT Address)

| A14 |

The Internal Address Compare register (IAC) is loaded with the value of the upper bit of the IAH register, bit 14, on COP888CF Exception Cycles. It is then compared with each subsequent cycle's bit 14 and will prevent the exception action (SRAM write for example) from repeating if there is a match. This will continue until the first compare fails, at which time normal operation will resume. The reason for this is to prevent multiple Exception Cycles from being generated erroneously. When the COP888CF generates a subroutine call to an address with bit 14 set, it will generate a read to that address the Microcontroller Interface Chip will recognize this and jam a RET (urn from subroutine) instruction into the input data pin, D0, of the COP888CF. While the microcontroller is executing this instruction, it will continue to prefetch data from the location of the bogus subroutine. Since the Microcontroller Interface Chip will ignore these fetches, it will not generate additional Exception Cycles. While the IAC is active during Exception Cycles, the IAH and IAL bits 0-13 will be latched until A14 is cleared to prevent the AT address from changing during AT I/O Exception Cycles.

MILES Cycle Definition

MILES Slave I/O read/write cycles to MILES Registers(AT is Master)

MILES Slave I/O reads and writes to the Microcontroller Interface Chip Internal Interface Registers (IIR) are accomplished by accessing the AT Interface Registers at address h1EA and h1EB, using the appropriate index as was described above.

MILES Slave I/O read/write cycles to MILES SRAM (AT is Master)

When an AT device initiates an I/O read or write to the Microcontroller Interface Chip SRAM, it must supply the appropriate indices to provide the memory address which will be latched in the AL and AH registers in the Microcontroller Interface Chip. These addresses are then passed to the SRAM. During the data phase of the cycle (when the DR is indexed), the AT state machine in the Microcontroller Interface chip will immediately drive and hold IOCHRDY low until the SRAM is available for access by the AT device. IOCHRDY will then be released and the cycle completed. After every access to the DR, the AL is auto incremented in the Microcontroller Interface Chip. (NOTE: Data for slave cycles is never latched in the Microcontroller Interface Chip.) For no wait state reads or writes (i.e., loading SRAM with code or for executing a quick check sum on the SRAM), the RST~ bit should be asserted low prior to initiating the slave block reads or writes. When RST~ is asserted, the microcontroller will be held in reset so that the AT state machine in the Microcontroller Interface Chip will not drive IOCHRDY to insert waits.

Microcontroller Read from SRAM

When the COP888CF microcontroller reads from the SRAM, it generates the address via its D1 and D3 pins serially through the Microcontroller Interface Chip to the SRAM. The SRAM data will then be shifted serially out of the Microcontroller Interface Chip into the COP888CF via pin DO.

Microcontroller Write to OP Registers

When the COP888CF wants to write a value to the OPH or OPL registers, it should write that value to its D port into the Microcontroller Interface Chip IDOUT register. It should then write the appropriate control value to the C port. When XLD is asserted at the end of a microcontroller SRAM read cycle, if C1 of the C port is high, the 8-bit OP latch indicated by the CO bit will be open. The input data for the OP registers is the IDOUT register. When XLD is deasserted, the latch will close and retain the data from the IDOUT register which is driven out the corresponding OP pins of the Microcontroller Interface Chip.

Microcontroller Exception Cycles

These are special cycles that are implemented by the Microcontroller Interface Chip. The COP888CF initiates an Exception Cycle by performing a subroutine call to the top 16 K of its Program Memory Map; e.g. address bit 14 is set the Microcontroller Interface Chip will recognize the address as an indication of an Exception cycle and stuff a RET (urn from subroutine) instruction into the IDIN register the Microcontroller Interface Chip then takes whatever action is indicated by the exception during the next serial code fetch from the COP888CF.

To the COP888CF, it will appear that the first instruction of the routine is a return and it will pop the old PC off its internal stack and continue to execute instructions after the subroutine call.

Since the COP888CF takes 5 cycles to complete the PET instruction, and since it will prefetch instructions from the virtual subroutine it thought it jumped to, the Microcontroller Interface Chip will ignore all subsequent cycles to the exception space until it sees a microcontroller read from SRAM cycle. This will prevent the Microcontroller Interface Chip from taking erroneous exceptions while still allowing back-to-back Exception Cycles by the COP888CF code.

The Exception Cycle Memory Map is as follows:

| IO_M~ | A14 | A13 | A12 | A11 | Action |
|---|---|---|---|---|---|
| 1 | 1 | 0 | X | X | Master I/O Read |
| 1 | 1 | 1 | X | X | Master I/O Write |
| 0 | 1 | 0 | X | X | SRAM Write |
| 0 | 1 | 1 | X | X | Set CDONE bit |
| X | 0 | X | X | X | SRAM Read |

IO_M~ is a control bit in bit 7 of the OPH register. It selects between: 1) I/O read/write cycles and 2) SRAM or Set CDONE Bit cycles. It is the microcontrollers' responsibility to set this bit to the proper value prior to initiating the Exception Cycle.

For ALL Exceptions Cycles, the COP888CF must first acquire the AT bus by asserting DMA_REQ (DMA request) and waiting for DMACK (DMA acknowledge). It must then assert MASTER~ for proper execution of the I/O cycle.

MILES Master I/O Read

During a MILES Master FO Write to the AT bus, the microcontroller will shift the address into the Microcontroller Interface Chip IAH and IAL registers which will then drive the AT address. The AT bus state machine will write the data from the IDOUT register to the At data bus. The COP888CF should have written the intended AT write data to its D-port before executing the Exception Cycle.

Microcontroller Write to SRAM

Address and data reshifted into the Microcontroller Interface Chip serially to generate the SRAM address and data. The Address is collected in the IAH and IAL registers as for reads, the Data is collected in the IDOUT register. The COP888CF should have written the intended AT write data to its D-port before executing the Exception Cycle the Microcontroller Interface Chip will stuff a PET (run from subroutine) instruction into the IDIN register and complete the write during execution of the RET.

Microcontroller Set CDONE Bit

When the Microcontroller Interface Chip detects a read to the address for the Set CDONE Bit Exception, it will cram a PET (return from subroutine) instruction into the IDIN register and set the CDONE Bit in the Control Register, also clearing the COP888CF Interrupt previously set when CDONE was cleared.

Sample Specific Circuit Implementation

The actual circuit implementation of the presently preferred embodiment will now be described in very great detail. However, it must be noted that the drawings shown are actual engineering drawings, and therefore include a great deal of detail. Most of the signal names on these drawings correspond to those discussed above, but the significance of the others will be readily apparent to those skilled in the art of digital design.

FIG. 6 is a diagram of the microcontroller interface chip, in the presently preferred embodiment. Note that this diagram is somewhat more detailed, in certain respects, than the diagram of FIG. 4.

Figure 5A:
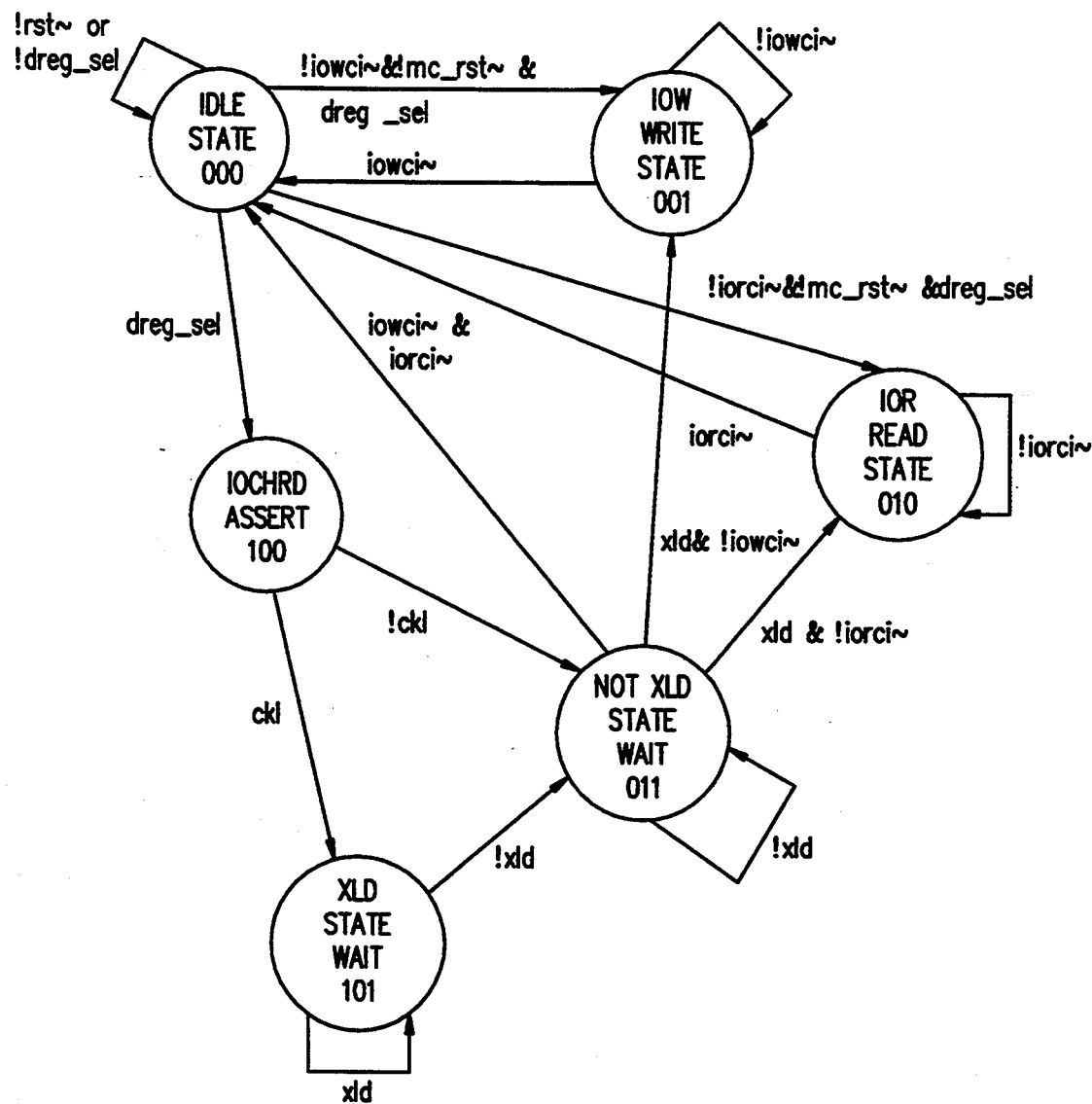
FIG. 5A is a state diagram which shows the operating of a first state machine, in operations where the microcontroller interface chip is accessing the system bus as slave.
Figure 5B:
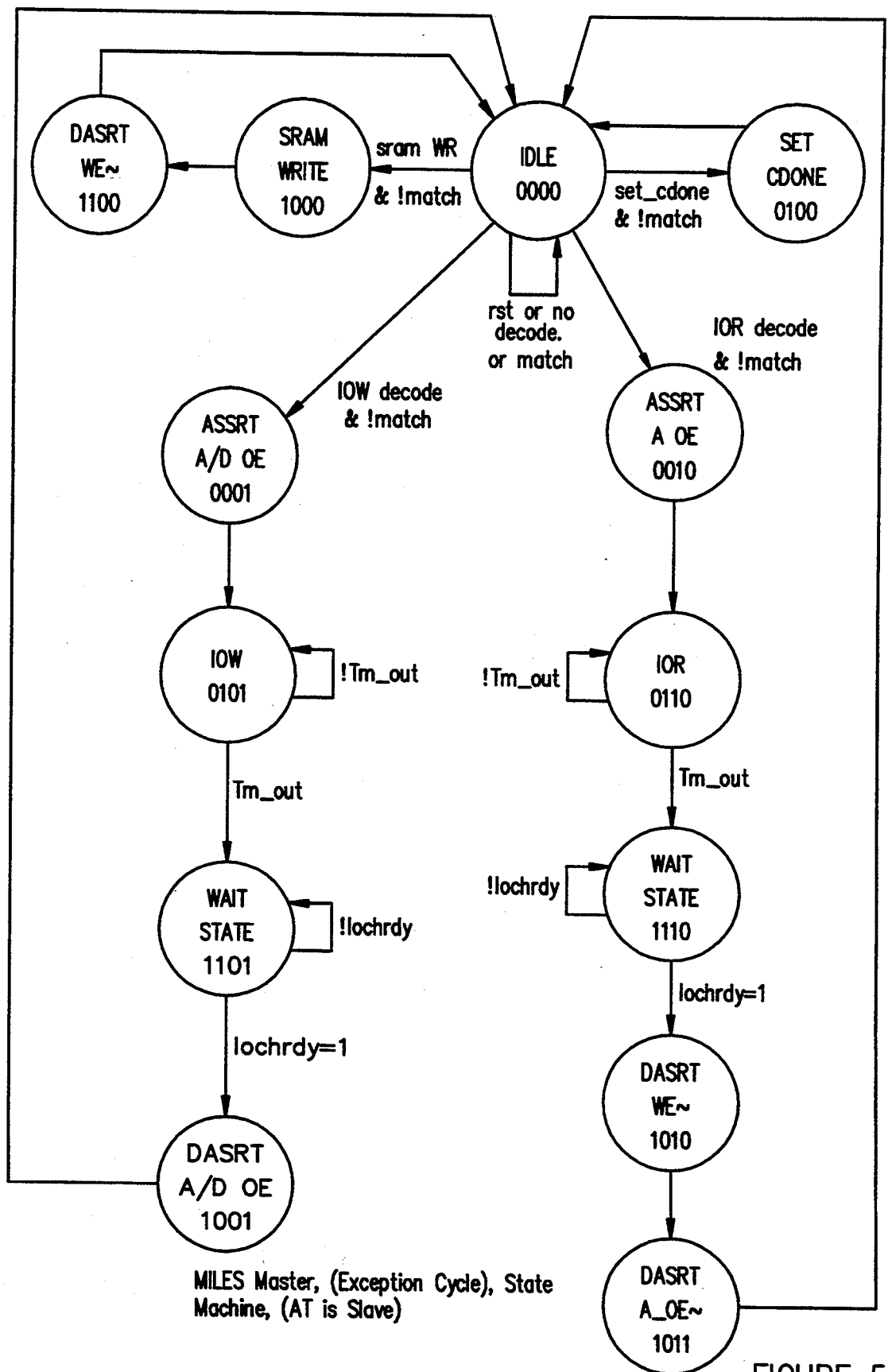
FIG. 5B is a state diagram which shows the operation of a second state machine, in operations where the microcontroller interface chip is accessing the system bus as master.
Figure 6A:
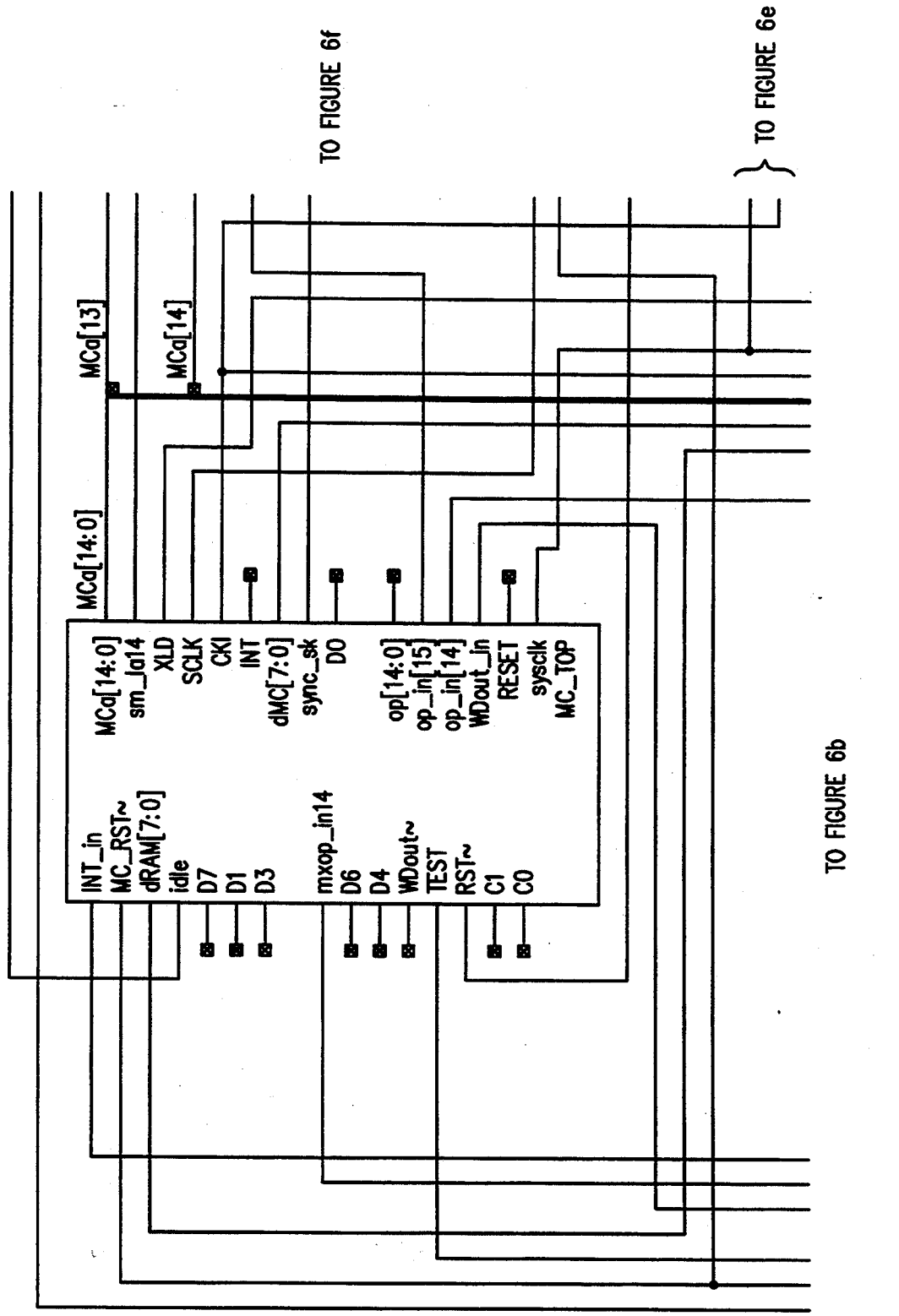
FIG. 6A is a diagram of the MC_TOP block shown in FIG. 6.
Figure 6B:
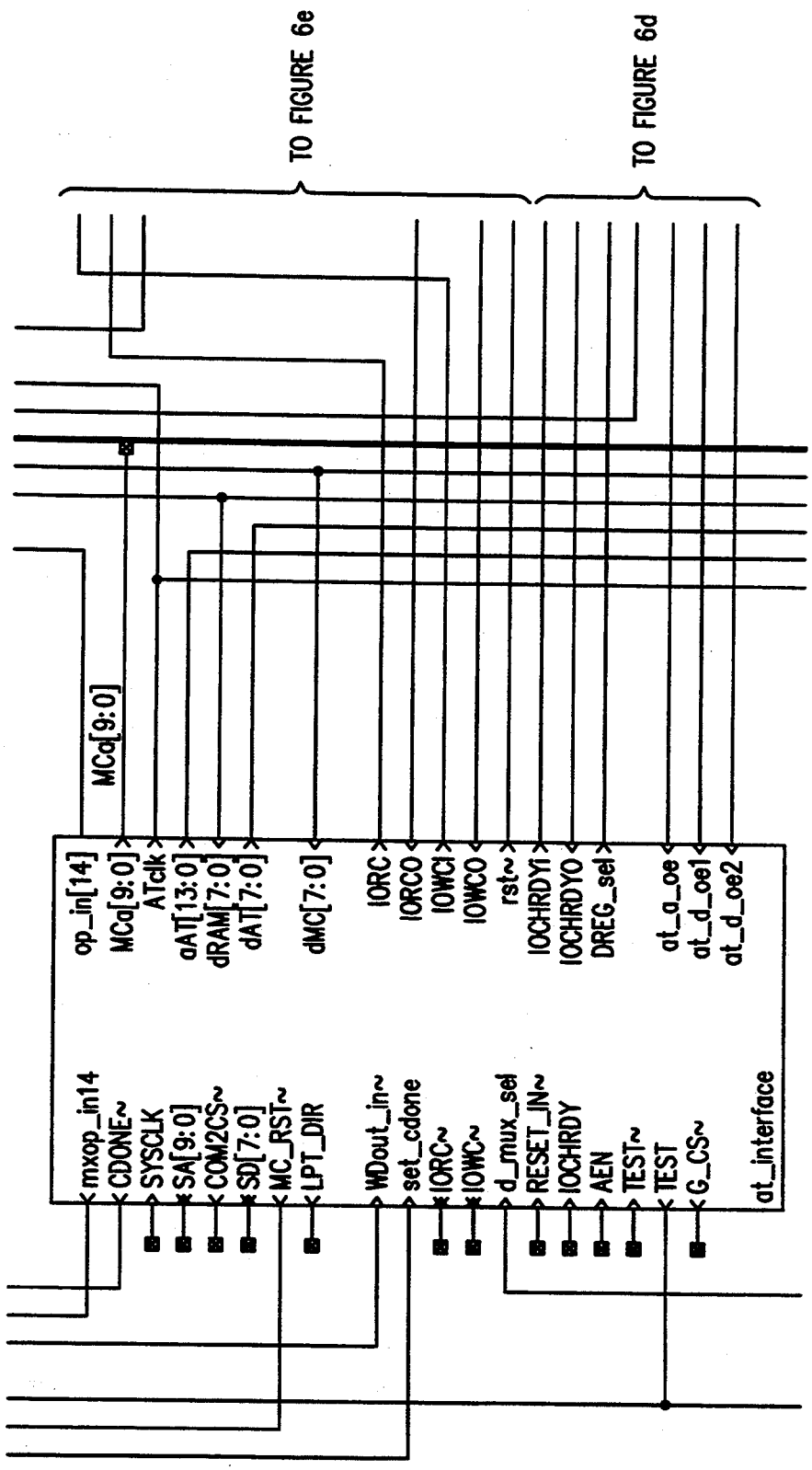
FIG. 6B is a diagram of the at_interface block shown in FIG. 6.

The at_interface block provides the interface to the AT bus, and is shown in more detail in FIG. 6B. The atmas block is a state machine, for accessing the AT bus as master, and corresponds to the state diagram of FIG. 5B. The atslv block is a state machine, for accessing the AT bus as slave, and corresponds to the state diagram of FIG. 5A. The misc_blk block is shown in detail in FIG. 6D. The MC_TOP block provides the interface to the microcontroller, and is shown in more detail in FIG. 6A.

Figure 1:
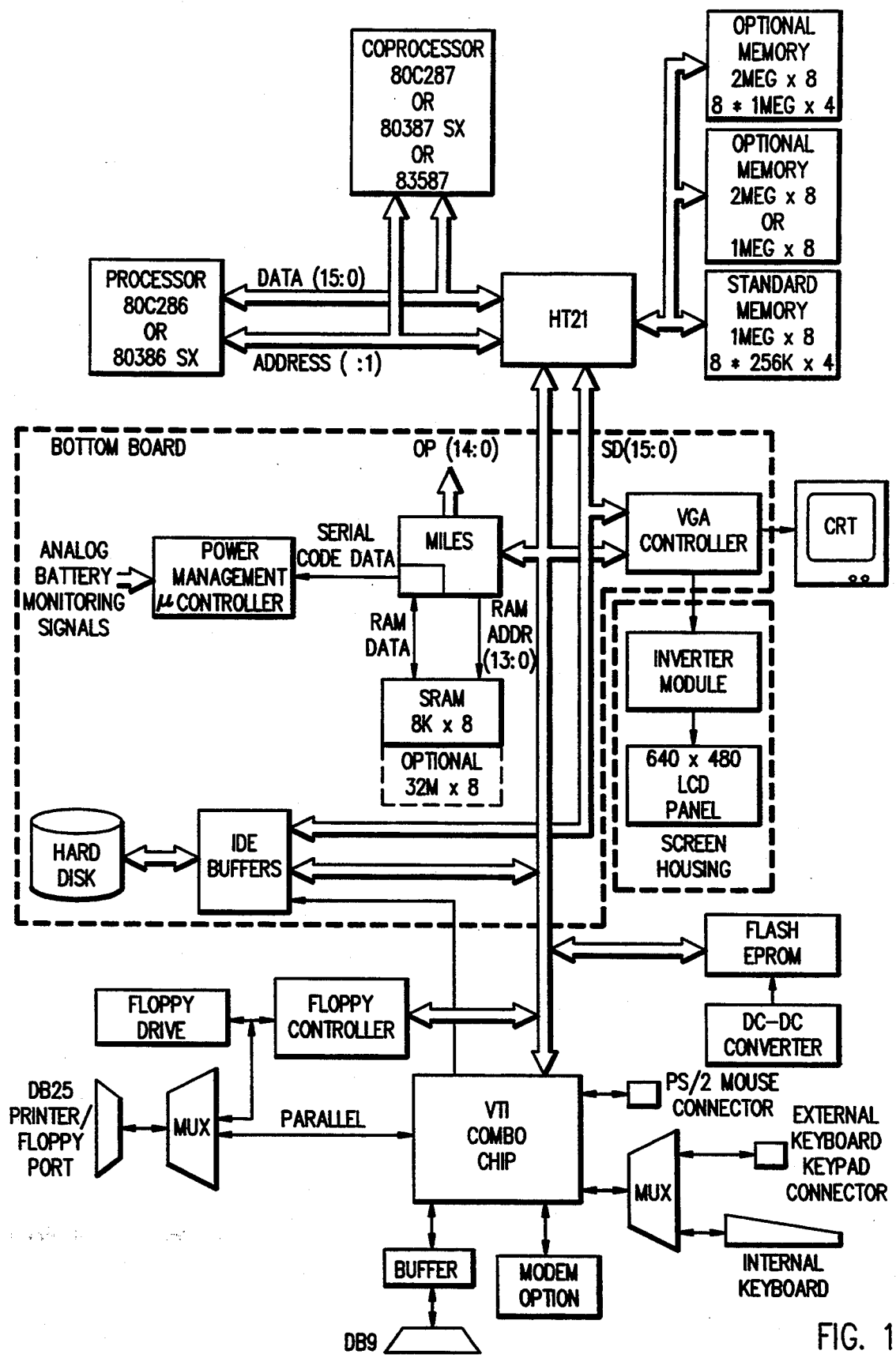
FIG. 1 shows the overall electrical organization of the portable laptop computer of the presently preferred embodiment.

FIG. 6A is a diagram of the MC_TOP block shown in FIG. 6, and FIG. 6A-1 is a diagram of the MC_intfc block shown in FIG. 6A. The block mc_pads merely represents pads and pad drivers. Block ret_mux8 is an 8-bit-wide multiplexer, which implements the return-cramming function: if line RET_SEL is low, data from the program memory will be selected; if line RET_SEL is high, data from the return cramruer memory will be selected. Block cdata_reg is simply a double register, which multiplexes the in byte onto the a and b bytes. Blocks lat15 and lat8 are latches. Block sclk_cnt3 is a 3-bit counter, which counts 8 sclock signals and then generates a LEN signal on the following sclock edge. Block s2p_reg8 is simply a serial-to-parallel register, and p2s_blk is a parallel-to-serial converter. Block addr_sr is a shift register for address conversion.

FIG. 6B is a detailed diagram of the at_interface block shown in FIG. 6. Block decode is simply a decoder, which implements tests for signal values as described above. Block SDpad is an 8-bit bidirectional interface (with registers) to I/O pads, and block sApad is a simple 10-bit bidirectional pad interface. Bloc at_regs is simply a large collection of registers.

FIG. 6B-1 is a detailed diagram of the index block shown in FIG. 6B. This block shows the logical used to implement four WR~bits, and the resulting Boolean relationships.

Figure 6C:
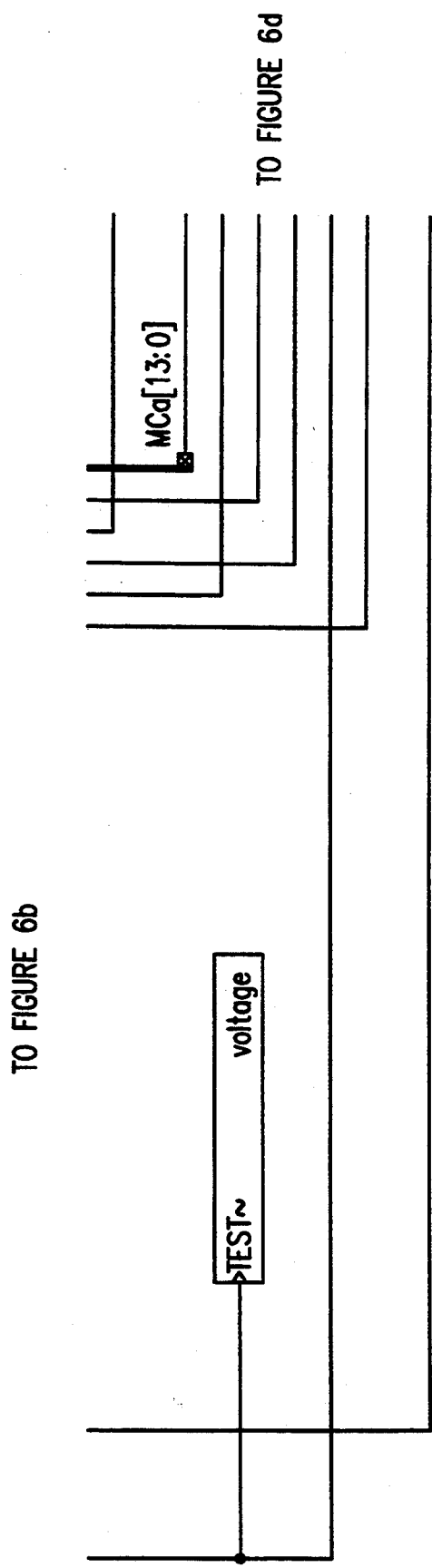
FIG. 6C is a diagram of the sram_intfc block shown in FIG. 6.

FIG. 6C is a detailed diagram of the sram_intfc block shown in FIG. 6, which implements the SRAM interface.

Figure 6D:
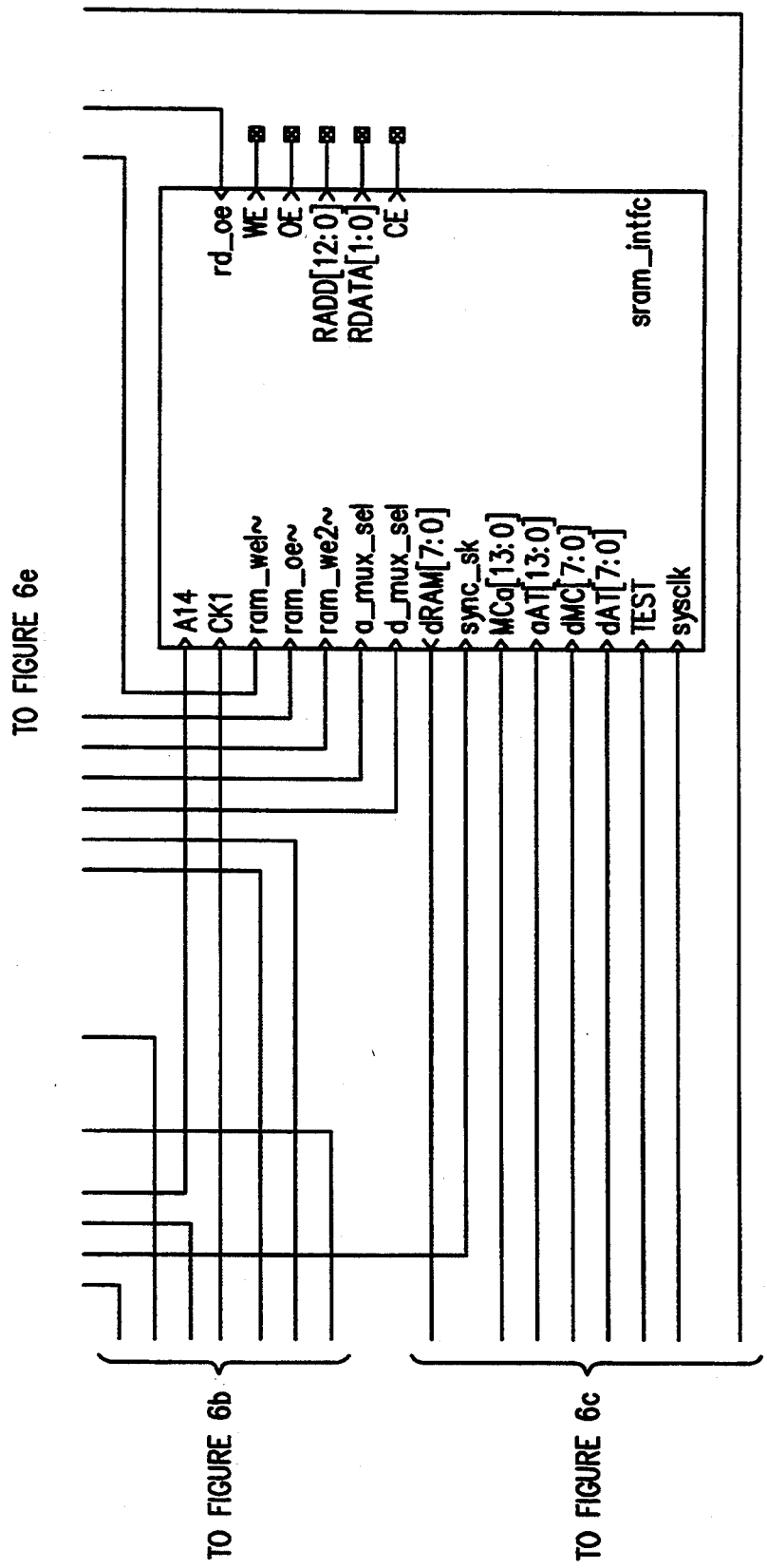
FIG. 6D is a diagram of the misc_blk block shown in FIG. 6.
Figure 6E:
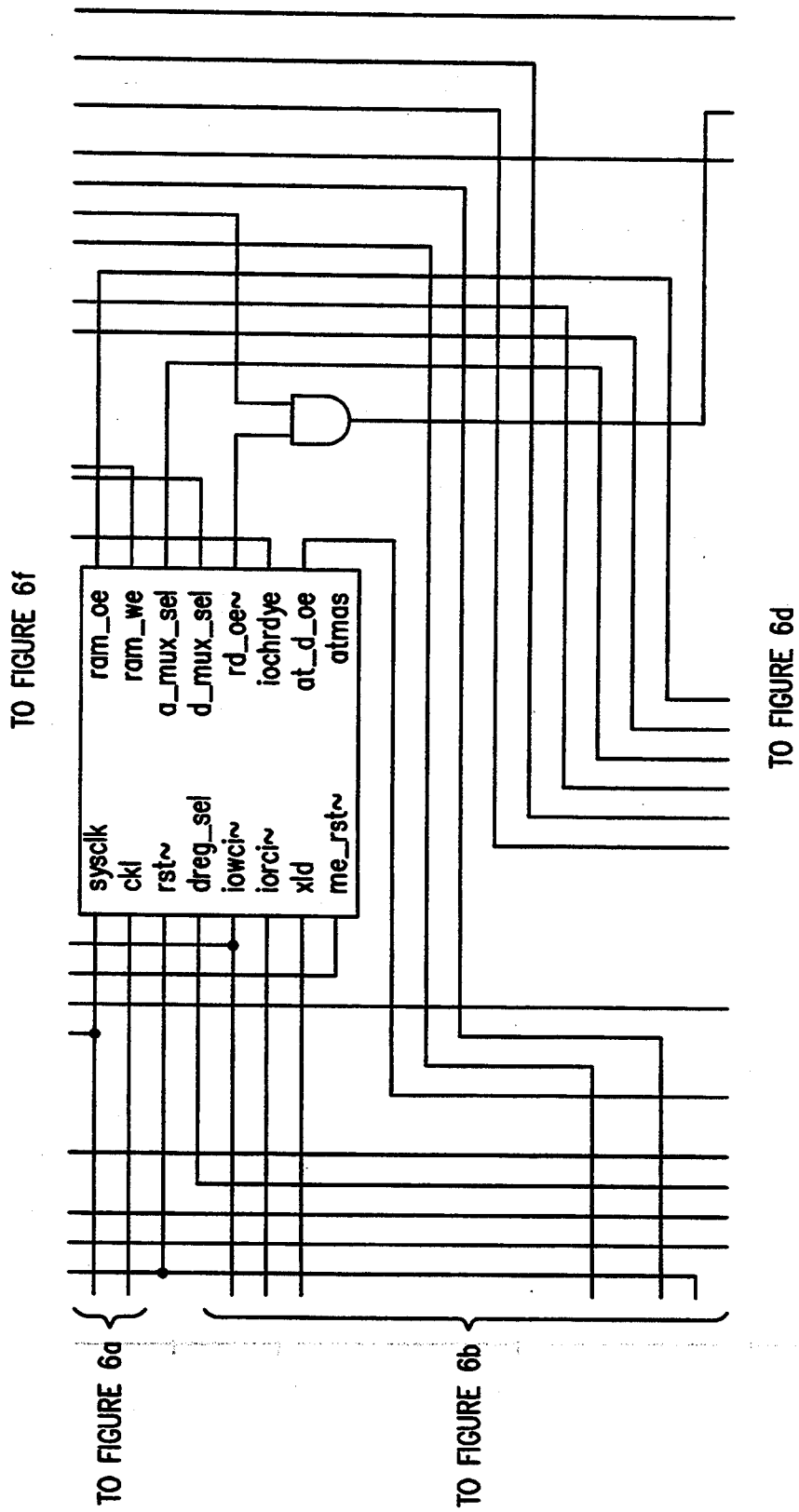
FIG. 6 is a diagram of the microcontroller interface chip, in the presently preferred embodiment. Note that this diagram is somewhat more detailed, in certain respects, than the diagram of FIG. 4.
Figure 6F:
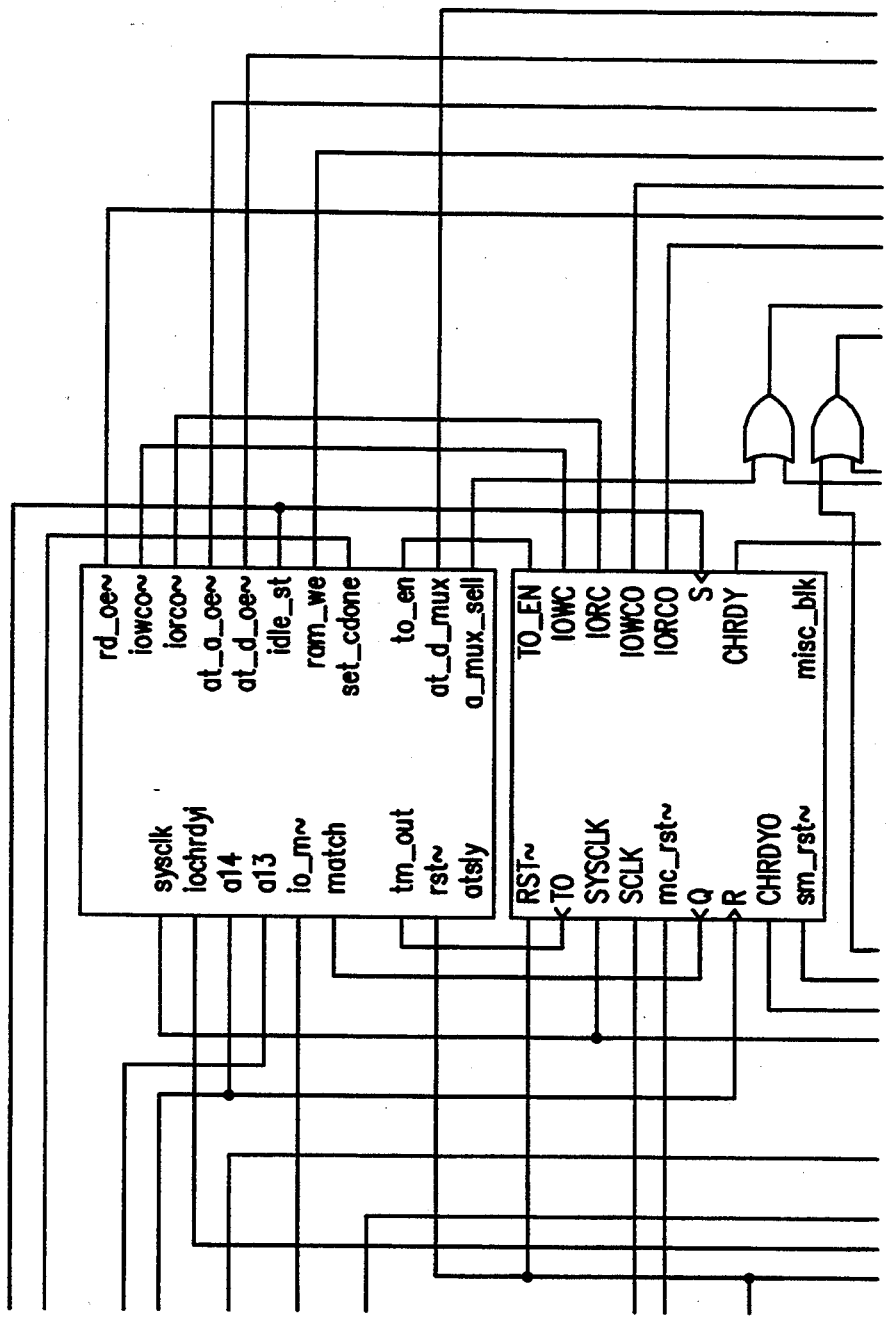
Figure 6A:
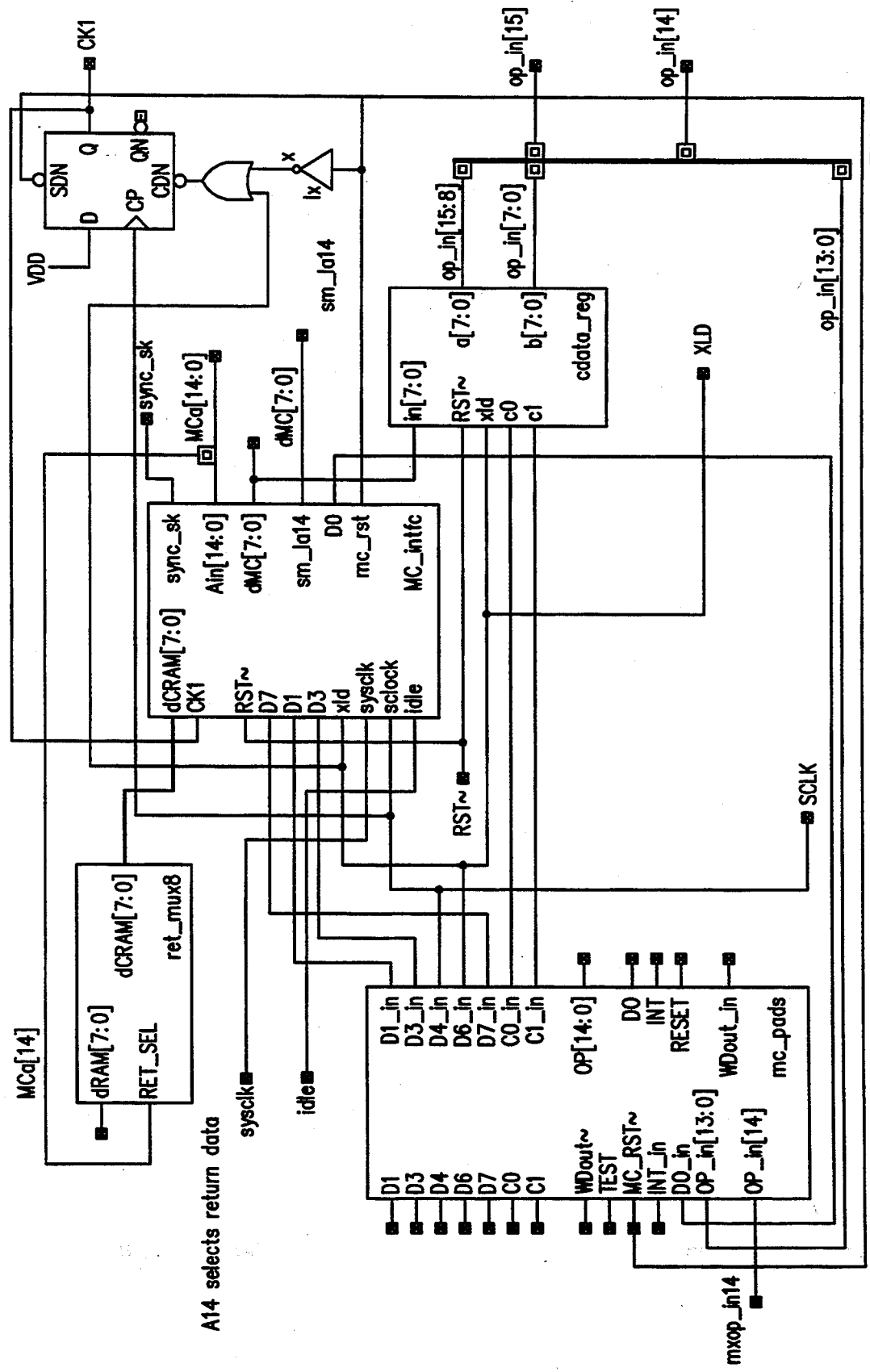
Figures 1, 6A:
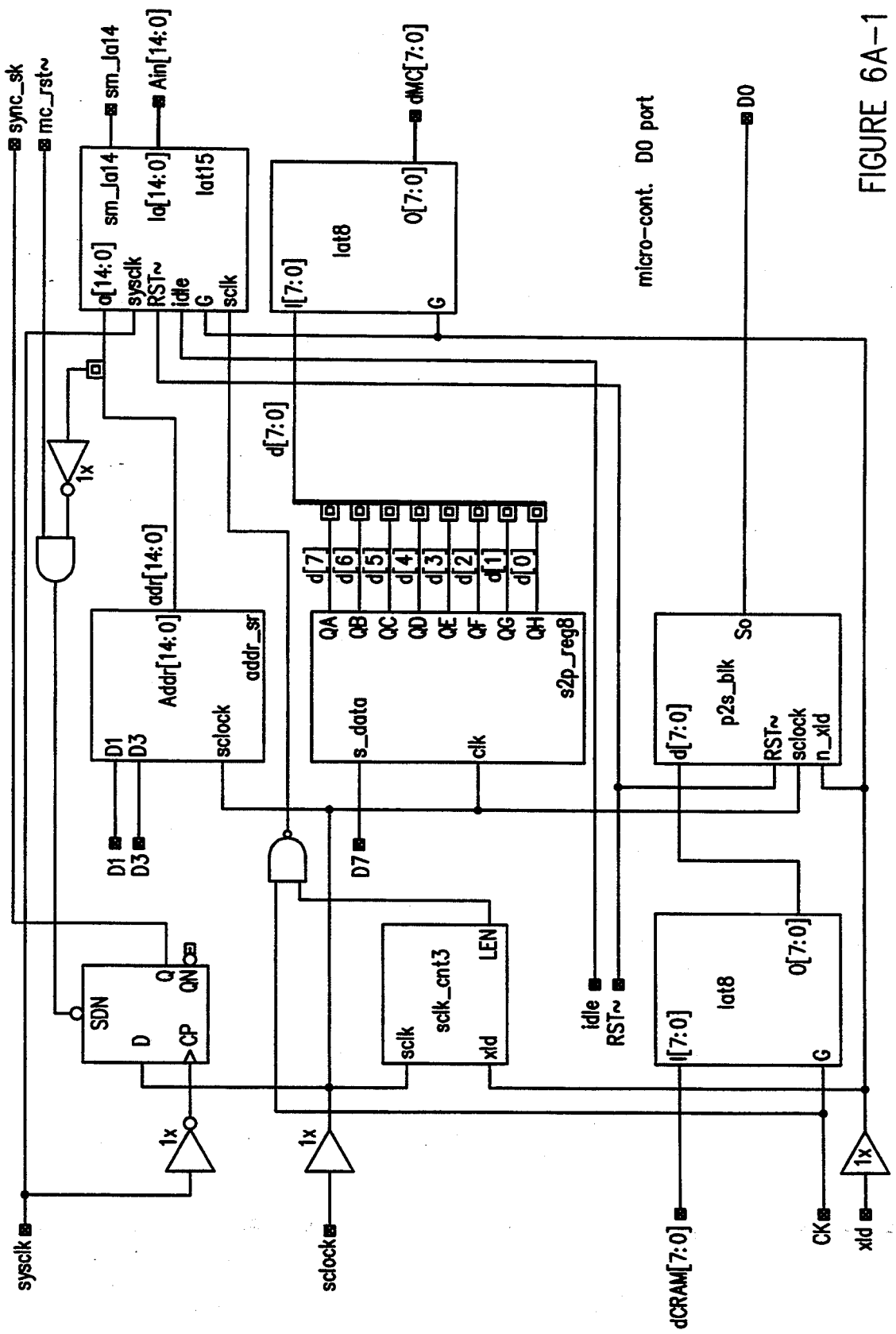
Figure 6B:
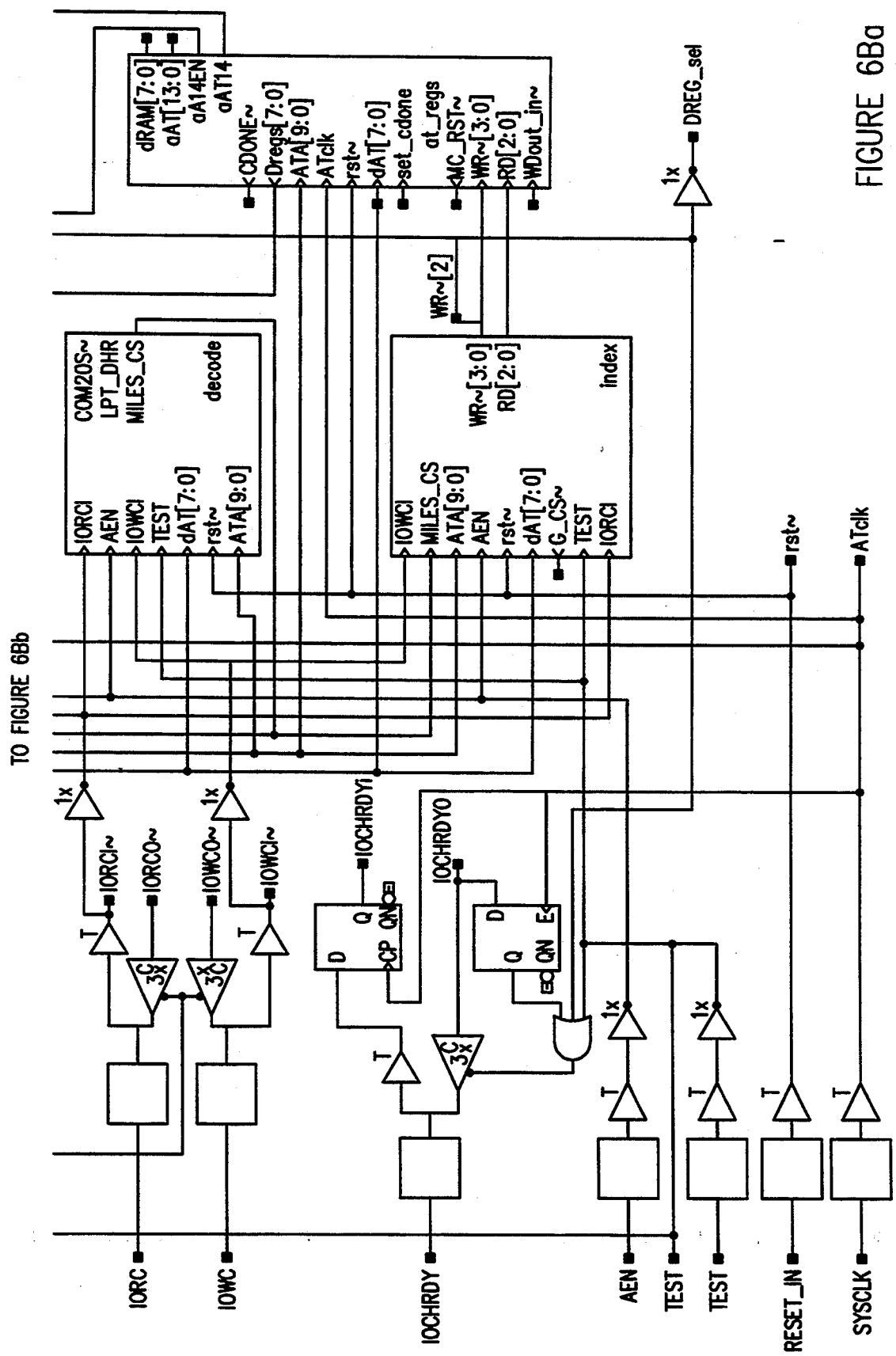
Figure 6B:
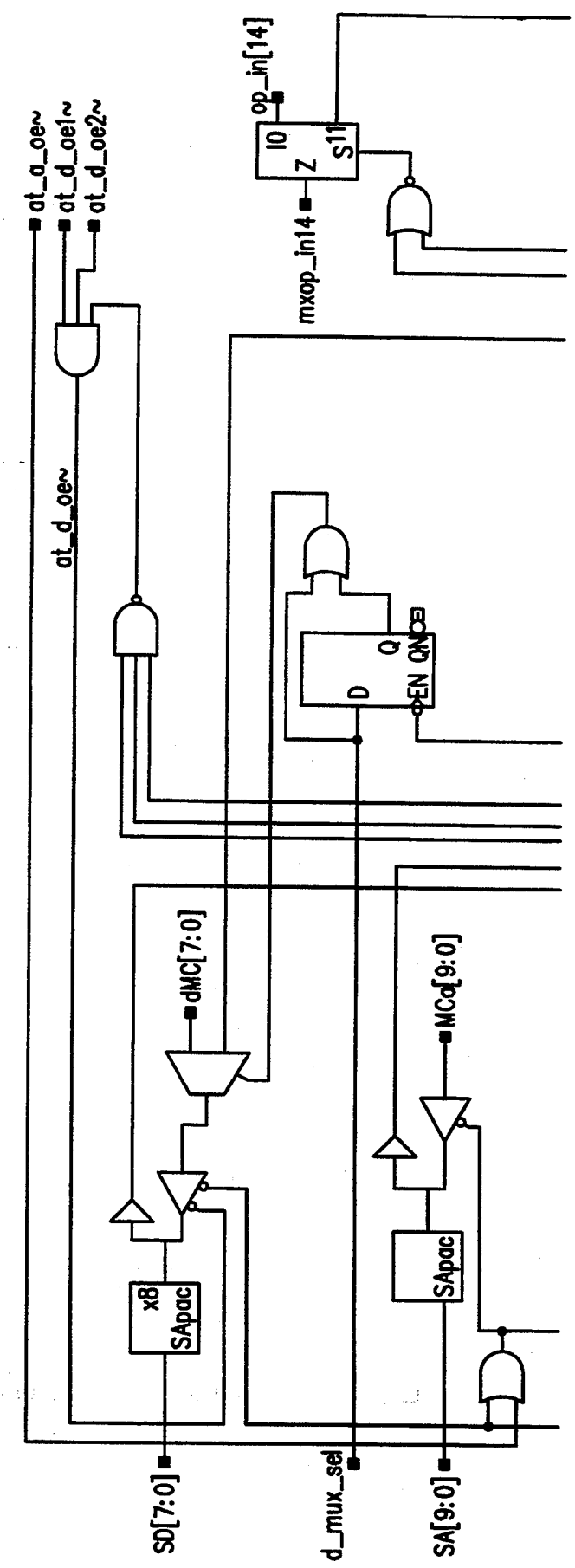
Figures 1, 6B:
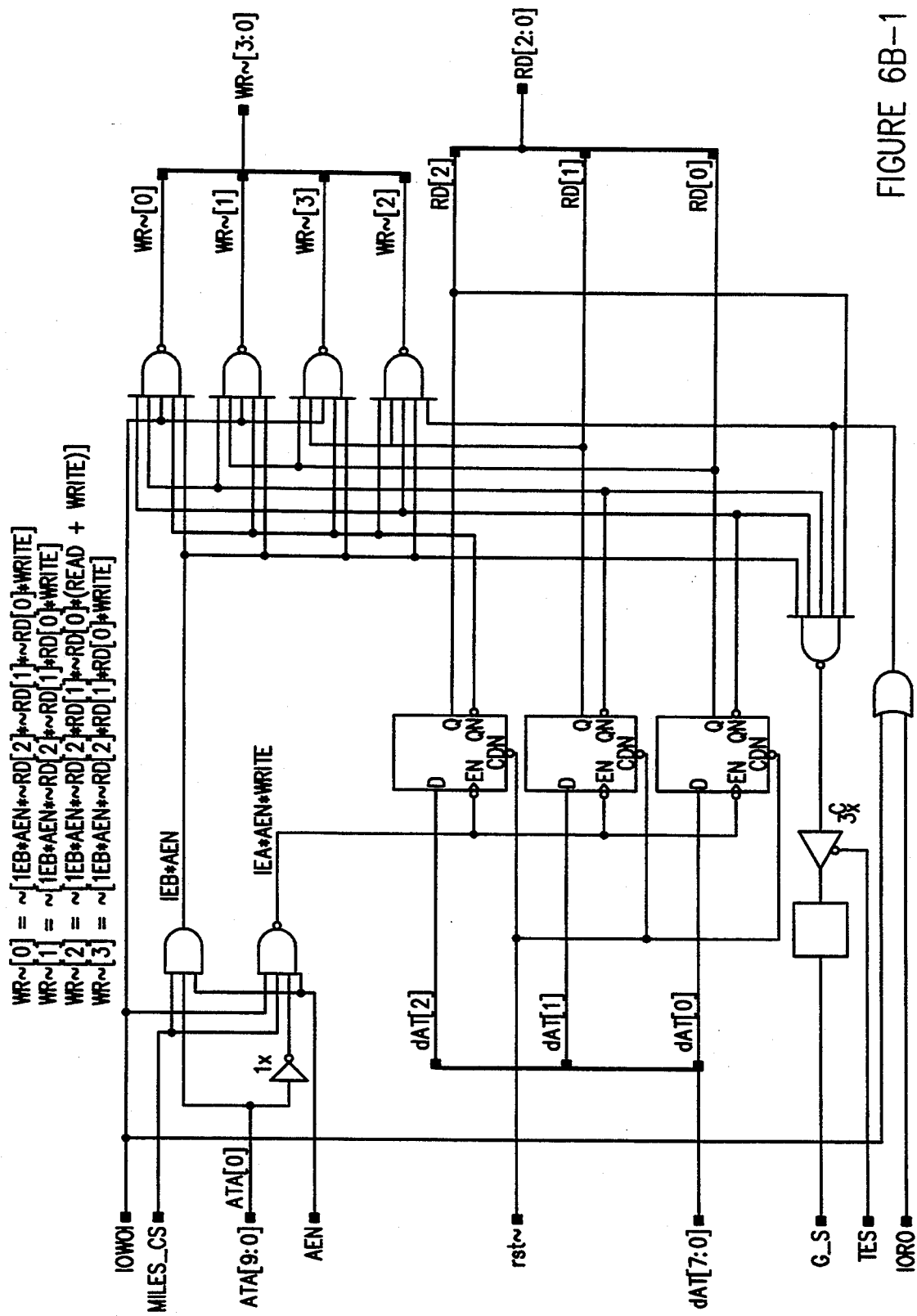
Figure 6C:
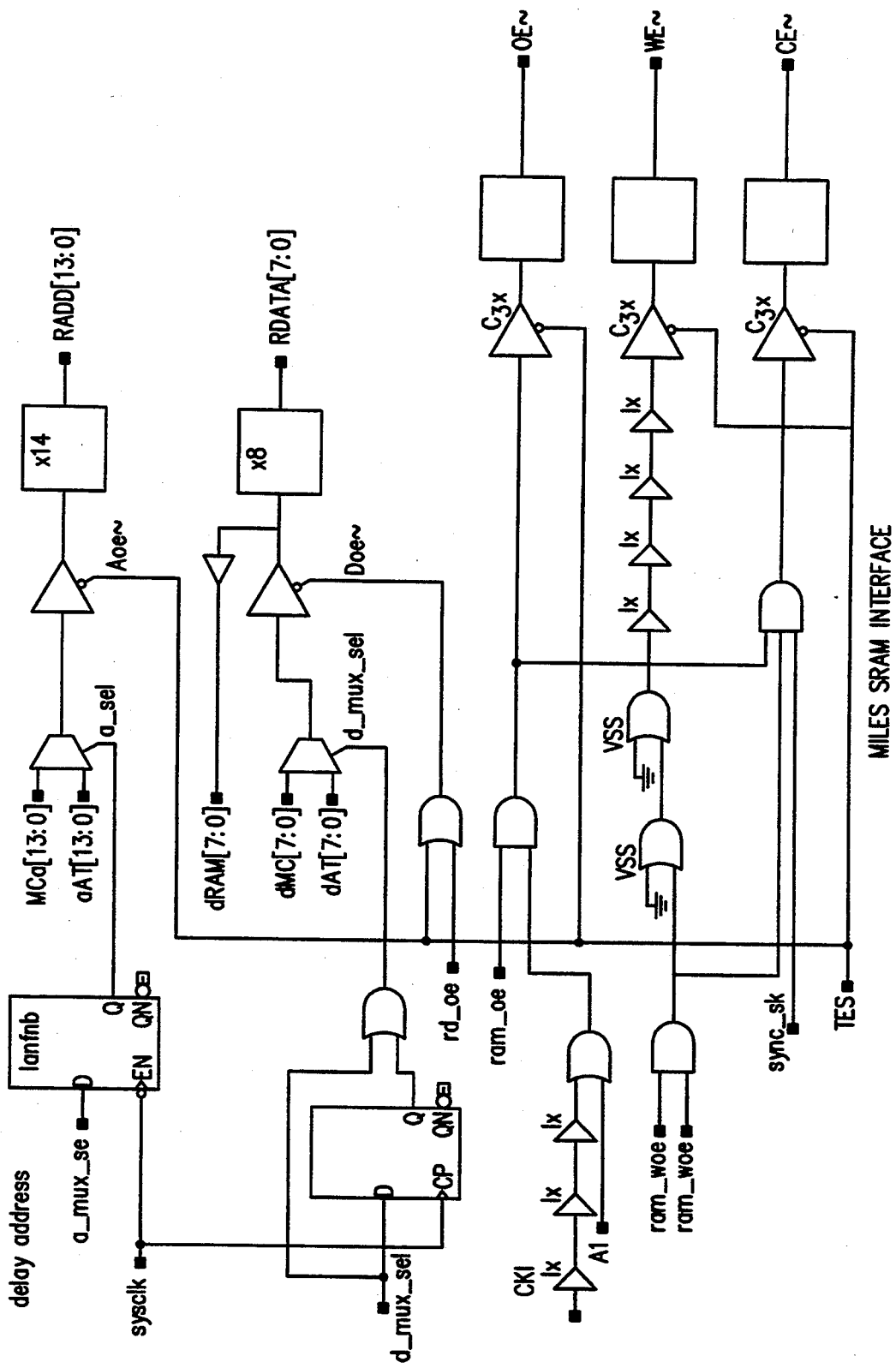
Figure 6D:
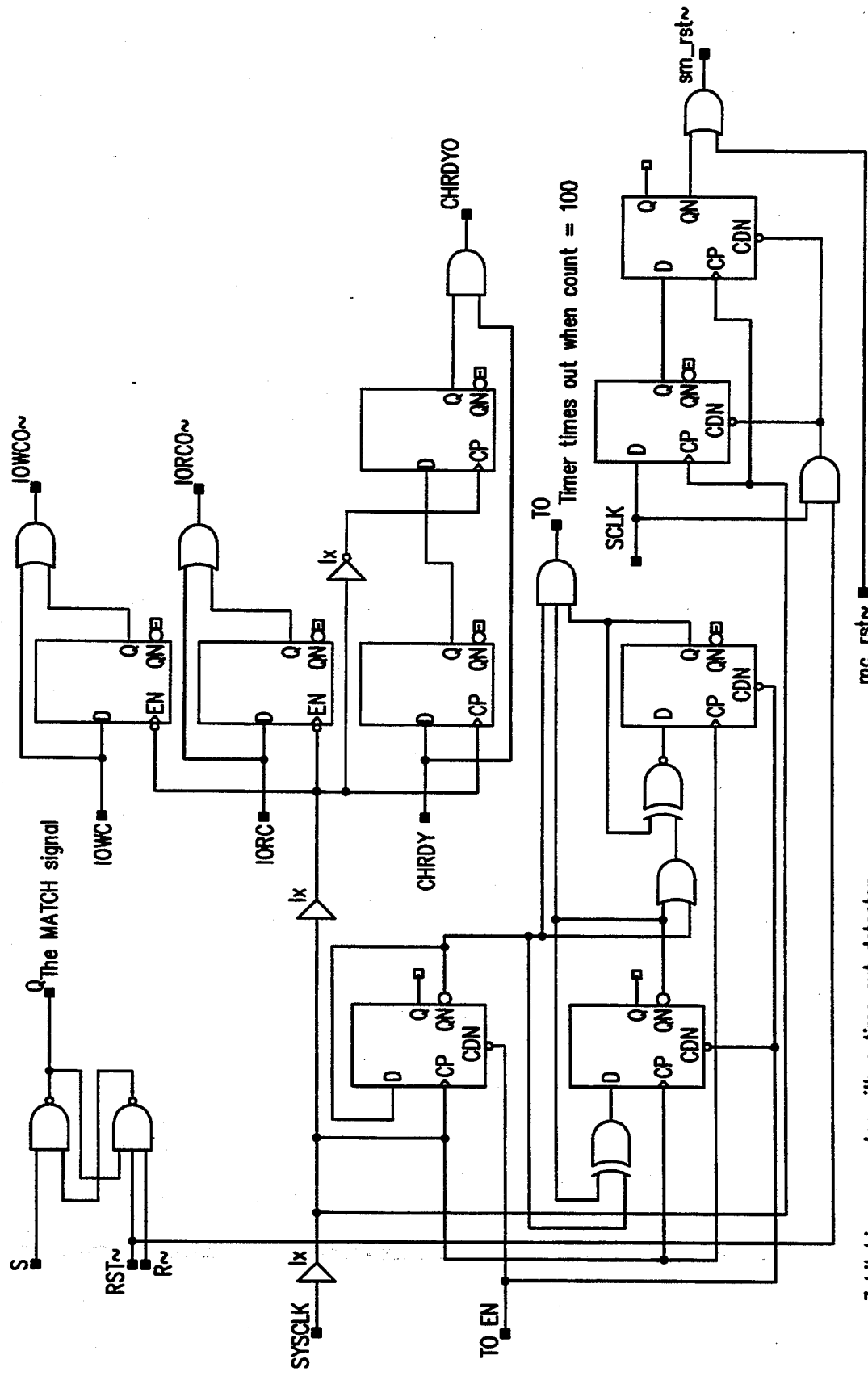

FIG. 6D is a diagram of the misc_blk block shown in FIG. 6. Note that this includes a 3 bit binary counter which will time out about 375 ns after TO_EN is asserted.

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of variations in the disclosed novel concepts.

The presently preferred embodiments, as discussed above, use Intel microprocessor for the CPU. However, of course, the disclosed innovations can also be applied to system using other non-Intel microprocessors of comparable architecture. The disclosed innovations can also be applied to other systems using other types of CPU, such as 680×0, SPARC, MIPS, or others. It is contemplated that, in the future, the disclosed innovations can also be applied to system using a multiprocessor CPU.

The presently preferred embodiment relates to systems used in the ISA architecture. However, it is alternatively possible to adapt at least some of the disclosed teachings to other bus architectures, including not only the EISA bus architecture (which is an extension of ISA), but also the many other buses which are now in use or which may find use in the future.

The presently preferred embodiment uses Headland Technology and VTI chips for CPU support functions. However, of course, a wide variety of other chips are available to perform these functions, and many substitutions are possible. In particular, some microprocessors have been proposed with added support functions on-chip. For another example, compact modules incorporating a microprocessor with peripheral support functions are also available. A huge variety of such substitutions can be made, while still obtaining the benefits of the disclosed inventions.

Of course, many I/O and storage peripherals can be added into a laptop system. The disclosed innovations are generally applicable to such systems, regardless of what peripherals have or have not been added. Thus, for example, a laptop which contains a large bank of NVSRAM, or which is connected to an Ethernet adapter, or which includes speech recognition or synthesis, would still present many power-management issues similar to those discussed above.

For example, the principal disclosed embodiment, as presently practiced, does not include any available expansion slots for the user to add cards into. However, it is contemplated that addition of an expansion bus might be advantageous, and particularly so in combination with microcontroller power-management architecture described above.

For another example, the principal disclosed embodiment, as presently practiced, does not include any available expansion slots for the user to add cards into. However, it is contemplated that addition of an expansion bus might be advantageous, and particularly so in combination with the microcontroller power-management architecture described above.

For another example, the principle disclosed embodiment, as presently practiced, never stops the system clock. In the 286 embodiment, the clock is slowed to 250 kHz, and in the SX embodiment the clock is slowed to 2 MHz. A fully static chip set, which would permit the system clock to be stopped would be even more advantageous; but, in the presently preferred embodiment, the HT21 chip and the SX chip are not compatible with fully static operation. Nevertheless, this is an obviously desirable modification, as the appropriate chip sets become available.

For another example, the principle disclosed embodiment, as presently practiced, uses Ni-Cd rechargeable batteries, and a small lithium cell as a nonrechargeable backup battery; but at least some of the disclosed innovative teachings can be practiced with other rechargeable battery technologies (such as NiH cells), if such technologies become commercially practicable, and/or can be practiced with nonrechargeable batteries in place of the NiCds of the preferred embodiment, and/or can be practiced with nonrechargeable batteries other than lithium cells.

As will be recognized by those skilled in the art, the innovative concepts described in the present application can be modified and varied over a tremendous range of applications, and accordingly the scope of patented subject matter is not limited by any of the specific exemplary teachings given.

APPENDIX

A sample source code implementation is set forth, in the following appendix, to ensure the fullest possible compliance with the best mode requirements of US patent law. Although the following code does represent the state of this code as of the effective filing date of the present application, it must be noted that this specific example is still under development. It is expected that this code will later be modified to add functionality, improve performance, and possibly also to remove bugs. Thus, users are warned that the following example should be regarded as an engineering prototype rather than a finished product, and should be used only with great caution. This assembly language code is written for the COP888CF microcontroller.

Appendix to Patent Application of Dell Computer Corp.    Page A-ii

```
.title COP888, 'Power Management'
.list 07B        ;05B   ;05F lists all macro expansion details for debug +020 for incld
.incld cop888.inc
.incld except.mac
.incld pwrmgmt.inc

;       NAME    PWRMGMT.MAC

;************************************************************************
;* Copyright (c) 1990 Dell Computer Corporation, Inc. This program      *
;* contains proprietary and confidential information. All rights reserved *
;* except as may be permitted by prior written consent.                  *
;************************************************************************

;************************************************************************
;       Revision Information    $Revision:   1.36  $
;                               $Date:   01 Feb 1991 9:07:00  $
;************************************************************************
```

;
; This program uses the Idle timer of the COP888CF for its time reference.
; At an 8MHz clock this coresponds to a resolution interval of 5.12 msec.
; (4096 counts at .8MHz per timer tick)
;

; This program begins by setting up the ports for direction and
; enabling the watch dog timer.

```
            jp      start
            .byte   'N09'
Start:
            ld      pencing, #00         ;no delayed operations to start
            ld      mode, #0
            ld      crgnde, #0
            ld      flashb, #080
            ld      almct, #0
            ld      tdelay, #200         ;1 sec turn on delay
            ld      batcnt, #min1        ;first battery change in 1 minute
            ld      portcc, #0
            ld      portcd, #0
            ld      portlc, #0
            ld      portld, #0
            ld      portgc, #0
            ld      portgd, #0
            ld      enad, #0             ;Put A/D in low power mode ld      second, #seccnt      ;initialize timeout
            ld      minute, #min1 jsrl    xsump                ;test the validity of the current params
            ifeq    a, xsumpd
            jp      sysok ld      systim, #min4        ;set default values
            ld      hdtim, #min4
            ld      lcdtim, #min4
            ld      sysbyt, #02F
sysok:
            jsr     stmout               ;set the initial timeouts ld      portcd, #01C         ;initial C port data
            ld      portcc, #01F         ;make C0 and C1 - C4 outputs
            ld      b, #oplow
            ld      [b], #0
            jsr     putlow
            ld      b, #ophigh
            ld      [b], #ampson+fetoff  ;Start at high speed, video off, opamps on
            jsr     puthi                ;This is to get around powerup
                                         ; problem with MILES
            jsr     dely50               ;Wait 50 msec for power to go away
            rbit    5, icntrl            ;clear the T0 overflow bit
```

```
        setbit  hdcs0, wkedg        ;Look for low going edges
        jsr     cksram              ;check sram parameters
        jsr     ckrbat              ;test reserve
        bitif   syson, portgp       ;Is the power switch on?
        jp      nstart              ; Yes, then normal start sequence
        clrbit  syson, flashb       ;**

bitif   acav, portcp        ;Next test for AC power
        jmp     spmoff              ; Shouldn't be here if no AC ld      portcd, #01C        ;initial C port data
        ld      portcc, #017        ;make C0 - C2 outputs
        jsrl    c20off              ;turn off video
        jsrl    stchrg              ;start the charger
        sbit    4, icntrl           ;enable T0 interrupt
        jmp     cmain               ;main loop for charge
nstart:
        clrbit  pwrled, portcd      ;turn on power LED
        setbit  syson, flashb       ;**
        jsrl    c20on               ;turn on video
        jsr     vinit               ;initialize voltage readings
        jsr     dlypmd              ;reset power monitoring mode
        ld      wkpnd, #0           ;clear any pending interrupts
        setbit  bdt, wken           ;enable battery detect interrupt
;**     setbit  kbdint, wken
        sbit    4, icntrl           ;enable T0 interrupt
        sbit    6, icntrl           ;enable L port wakeup interrupt
        sbit    1, psw              ; enable external interrupt
main:
        sbit    0, psw              ;global interrupt enable
        nop                         ;service all interrupts now
        nop
        nop
        rbit    0, psw              ; now turn them back off
        bitif   syson, portgp       ;Monitor system switch
        jp      main00
        bitif   bdt, mode           ;are we waiting for a new battery?
        jmp     reslop              ;wait for new battery
        jmp     reset
main00:
        bitif   acav, portcp        ;test for ac available
        jp      main10              ; if operating from batteries
        jsr     clrlob
        bitif   chrgrb, crgmde      ;if reserve battery being charged
        jp      main01              ; don't turn on trickle charger
        bitif   trklec, crgmde      ;Allow trickle charge when AC available
        jp      main01              ; if already set
        bitif   charge, crgmde      ;** remove for production
        jp      main01              ;**
        jsr     trklon              ;start trickle charge
main01:
        jp      main
```

```
main10:
        bitif   trklec, crgmde  ;only true if AC adapter just unpluged
        jsr     trklof          ;  turn off trickle charge
        bitif   bdt, mode       ;are we waiting for a new battery?
        jmp     reslop          ;wait for new battery before testing voltage
        bitif   lobat3, mode    ;are we about to shut down system?
        jmp     lo3lop          ;then wait for AC or new battery
        jmp     main            ;wait before measuring batteries cksm00:
        laid
        ret ;
; The cop888cf has a vectored interrupt scheme. On an interrupt
; the program branches to the instruction at OFFh. The program can
; then save the appropriate registers and issue a VIS instruction
; to branch to the interrupt handler.
;
        .=0ff ; This routine saves the contents of A, B, and X on entry to an interrupt
; and restores them on exit.

push    a               ;this is the only register we can save on stack
        x       a,b             ;move contents of b to a
        ld      b,#saveb        ;point to location to save B and X
        x       a,[b+]          ;save contents of original B register
        x       a,x             ;get contents of X register
        x       a,[b]           ;and save in data ram
        vis
restor:
        ld      b,#savex        ;point to location of saved X register
        x       a,[b-]          ;get old X contents
        x       a,x             ;and put back in X
        x       a,[b]           ;now get the saved contents of B
        x       a,b             ;and put it back in B
        pop     a               ;now we're back where we started
        reti
;
; Timer T0 underflow interrupt vector
;
timer0:
        ld      wdcnt, #009     ;service watch dog 2-65K window, clock monitor on
        jsr     tstac
        bitif   syson, flashb   ;is the cpu operating
        jp      tim00
        jp      tim01           ; if not skip standby and refresh
tim00:
        bitif   hldreq, mode    ;test for cpu in hold
        jsr     refrsh          ; and do refresh if so
        jsr     tststb          ; then check for activation
```

```
        bitif   hldreq, mode    ;are we in standby mode
        jsr     flashp          ; then flash the power led
        bitif   lobat2, mode    ;is the battery low
        jsr     flshlb          ; then flash the low bat led
        ifeq    pendng, #0      ;test for hd routine pending
        jp      tim01
        jsrl    iow1f7          ;test hd busy status
tim01:
        drsz    second          ;decrement seconds timer
        jp      t0exit          ;exit if not zero
        jsr     deccnt          ;executed once every second
t0exit:
        bitif   bdt, mode
        jp      tim02           ;skip if waiting for battery
        ifeq    tdelay, #0      ;test new battery delay
        jp      tim02
        drsz    tdelay
        jp      tim02           ;wait to initialize
        jsr     resoff          ; then reset voltage readings
tim02:
        bitif   bdt, mode       ;test for operation on reserve
        jsr     tstnew          ; look for a new battery
        bitif   cngoff, crgmde  ;Have we switched batteries
        jsr     resoff          ; then turn off the reserve battery
        bitif   cngben, crgmde  ;Is battery change enabled?
        jsr     docngb          ; then actually switch the battery banks
        rbit    5,icntrl
        jmp     restor
;
; Software interrupt vector
;
reserv:                         ;***** TEMPORARY *****
swivec:
        jsr     tog             ;Light all the LED's
        jp      .               ;**
        rpnd
        jmp     reset ;
; Decrement the various timeout counters
;
deccnt:
        ld      second, #seccnt ;reset the seconds counter
        bitif   bdt, mode       ;are we operating on reserve?
        jsr     incrti          ; then increment reserve operation time
        drsz    minute          ;decrement the minute counter
        jp      dec01           ; until the minute is up
        bitif   bdt, mode       ;one minute on reserve battery?
        jmp     spmoff          ; then turn off system
        bitif   lobat3, mode    ;10 seconds at cutoff level?
        jmp     spmoff          ; then turn off system
        jsr     decmin          ; then do our once a minute stuff
```

```
dec01:
        bitif   stdeb2, flashb      ;We don't need to look unless switch is down
        jsr     tstpoa              ;check for case closed
        jsr     readad              ;make new readings once per second
        bitif   charge, crgmde      ;are we charging the batteries?
        jmp     adjcrg              ; if so then check for end, etc.
        ld      a, sysbyt           ;to speed up checks bitif   acav, portcp        ;test for ac available
        jp      dec02               ;jmp if no AC
        bitif   acovrd, a           ;test for AC override
        jmp     stmout              ; and reset timeout counters if active
dec02:
        bitif   hdsec, a            ;is the hd timeout in seconds?
        jsr     rldhdc              ;reset the hard disk timeout
        ld      a, sysbyt           ;to speed up checks
        bitif   lcdsec, a           ;is lcd T.O. in seconds
        jsr     rldlcd
        ld      a, sysbyt           ;to speed up checks
        bitif   syssec, a           ;is system T.O. in seconds
        jsr     rldsys bitif   acav, portcp        ;test for ac available
        jp      dec03               ;jmp if no AC
        ld      batcnt, #min4       ;reset battery timer and don't switch
        ret                         ; if plugged in to AC adapter
dec03:
        ifeq    tdelay, #0          ;don't test batteries until after delay
        jsr     chklow
        drsz    batcnt              ;# of seconds to change batteries
        ret
        jsr     cngbat
        ret                         ; to allow for a skip return if no error
        ret decmin:
        ld      minute, #min1       ;reset the minute counter
        bitif   charge, crgmde      ;are we charging the batteries?
        jmp     tstend              ; if so then check for end, etc.
        bitif   chrgrb, crgmde      ;are we charging the reserve battery?
        jsr     tstres              ; if so then test for -dV ld      a, sysbyt           ;to speed up checks bitif   acav, portcp        ;test for ac available
        jp      min00               ;jmp if no AC
        bitif   acovrd, a           ;test for AC override
        jmp     stmout              ; and reset timeout counters if active
min00:
        bitif   hdsec, a            ;is the hd timeout in seconds?
        jp      min01
        jsr     rldhdc              ;reset the hard disk timeout
```

```
min01:
        ld      a, sysbyt       ;to speed up checks
        bitif   lcdsec, a       ;is lcd T.O. in seconds
        jp      min02
        jsr     rldlcd
min02:
        ld      a, sysbyt       ;to speed up checks
        bitif   syssec, a       ;is system T.O. in seconds
        ret
        jmp     rldsys ;
; The interrupt vector table starts from the lowest priority vector
; which is the VIS default address and goes down to the highest
; priority vector, the software interrupt.
;
        .=01e0
        .addrw  visvec          ;Default VIS routine must not do a RETI
        .addrw  wakeup          ;Port L Wakeup interrupt
        .addrw  reserv          ;Timer 3 this should never occur
        .addrw  reserv          ;Timer 3 this should never occur
        .addrw  time2b
        .addrw  time2a
        .addrw  reserv          ;UART this should never occur
        .addrw  reserv          ;UART this should never occur
        .addrw  reserv          ;TBD this should never occur
        .addrw  microw          ;Microwire BUSY Low
        .addrw  time1b
        .addrw  time1a
        .addrw  timer0          ;Idle timer
        .addrw  extirq          ;Host CPU IRQ (CDONE)
        .addrw  reserv          ;NMI interrupt is reserved
        .addrw  swivec          ;Software interrupt (illegal instruction)
;
; Multi input wake-up/port L interrupt vector
;
wakeup:
        ld      b, #wkpnd
        bitif   bdt, [b]        ;test for battery interrupt
        jsr     resvon          ; switch on the reserve bat
        bitif   bdt, mode       ;if reserve battery active
        jmp     restor          ; then dont check anything else
        bitif   hldreq, mode    ;are we in hold
        jp      wake00          ; then skip some tests
        bitif   vramcs, wkpnd   ;test for activity
        jsr     tstvid
wake00:
;       bitif   slpmde, mode    ;is the processor asleep?
;       jp      wake01
;       jmp     restor          ; if not then cancel tests
wake01:
        bitif   kbdint, wkpnd   ;exit on keyboard interrupt
```

```
        jsr     hldoff              ;***
        bitif   cpuint, wkpnd       ;is cpu interrupt active
        jsr     shrton              ; turn on for 50 usec
        jmp     restor ;
; Default VIS vector
;
visvec:
;       jmp     tog
        jsr     tog1
        jmp     start
;
; Microwire/plus busy low interrupt vector
;
microw:
        rbit    3,Icntrl
        jmp     restor
;
; Timer T2 T2B interrupt vector
;
time2b:
        ld      b, #ophigh
        clrbit  speakr, [b]         ;turn off the speaker
        jsr     puthi
        rbit    1,t2cntrl
        jmp     restor
;
; Timer T2 T2A/underflow interrupt vector
;
time2a:
        ld      b, #ophigh
        setbit  speakr, [b]         ;turn the speaker on
        jsr     puthi
        rbit    3,t2cntrl
        jmp     restor
;
; Timer T1 T1B interrupt vector
;
time1b:
        jsr     t1off
        jsr     t2off
        rbit    0, icntrl           ;disable interrupts until the next beep
        rbit    1, icntrl
        jmp     restor
;
; Timer T1 T1A/underflow interrupt vector
;
time1a:
        rbit    5,psw
        jmp     restor
```

```
tstac:
        bitif   syson, portgp   ;is power good true
        jp      tstflg          ; then make sure we know it
        bitif   syson, flashb   ;power is off, but
        jmp     reset           ; if we're here the cop doesnt know it's off
        ret
tstflg:
        bitif   syson, flashb   ;does the cop know we're on
        ret                     ; yes so just return
        jmp     reset           ; restart if cop thinks we're off cmain:
        bitif   syson, portgp   ;Monitor system switch
        jmp     reset
        bitif   acav, portcp    ;Next test for AC power
        jmp     copoff          ; Stop system if no AC bitif   bdt, portlp     ;test for new battery
        jsr     waitb           ; and start over
        sbit    0, psw          ;global interrupt enable
        nop                     ;service all interrupts now
        nop
        nop
        rbit    0, psw          ; now turn them back off
        jp      cmain waitb:
        jsr     acrgof          ;turn off A bat charger
        jsr     bcrgof          ;turn off B bat charger
        jmpl    stcrg1          ;test for new battery and restart if available chklow:
        jsr     avrage          ;use running average for voltages
        bitif   bankb, oplow    ;test for current bank
        jmp     tbmin           ; if bank B
        ld      a, batav        ;get the A bank voltage
        ifgt    a, #vterm       ; and test for cutoff value
        jp      chk00
toolow:
        jsr     cngbat          ;try to change batteries
        nop                     ;**
;       jmp     spmoff          ;kill power if other battery is bad
        jsrl    stndby          ;put system in lowest power mode
        clrbit  kbdint, wken    ; and don't allow keypress to exit
        setbit  lobat3, mode    ;wait 10 sec for new battery or AC
        ld      minute, #min1/6 ;reset the minute counter for termination
        jmp     stbeep          ;beep and prepare to turn off chk00:
        ld      b, #bavmin
        x       a, [b]          ;store the new "minimum"
        ifgt    a, [b]          ;is it really less
```

```
            jp      tbmax           ; if so continue
            x       a, [b]          ; else restore the old value
tbmax:
            ld      a, batbv        ;now read bank B's voltage
            ld      b, #bbvmax      ; and look for a maximum
            x       a, [b]          ;store the new maximum
            ifgt    a, [b]          ;is old value greater than new
            x       a, [b]          ; then put it back
tstdlt:
            ld      b, #bavmax      ;point to highest bat A voltage
            ld      a, [b+]
            sc                      ;for subtraction
            subc    a, [b]          ;calculate the delta
            bitif   lobat1, mode    ;are we already in low bat mode
            jp      tstdl2          ; then test for second delta
            ifgt    a, #lb1dlt      ;is it greater than cutoff?
            jp      lowbt1          ;then warn user
            ld      a, [b+]         ; otherwise increment b
            ld      a, [b+]         ;to test bank B
            sc
            subc    a, [b]
            ifgt    a, #lb1dlt
            jp      lowbt1
            ret tstdl2:
            ifgt    a, #lb2dlt      ;is it greater than cutoff?
            jp      lowbt2          ;then warn user
            ld      a, [b+]         ; otherwise increment b
            ld      a, [b+]         ;to test bank B
            sc
            subc    a, [b]
            ifgt    a, #lb2dlt
            jp      lowbt2
            ret lowbt1:
            setbit  lobat1, mode
            ld      b, #oplow
            setbit  lowbat, [b]     ;turn on the low bat LED
            jmp     putlow lowbt2:
            bitif   lobat2, mode    ;are we already in lobat2 mode
            ret                     ;then just return
            setbit  lobat2, mode
            jsrl    stndby
            ld      avcnst, #1      ;to start flashing
            ret tbmin:
            ld      a, batbv        ;get the B bank voltage
            ifgt    a, #vterm       ; and test for cutoff value
```

```
            jp      chk01
            jmp     toolow chk01:
            ld      b, #bbvmin
            x       a, [b]          ;store the new "minimum"
            ifgt    a, [b]          ;is it really less
            jp      tamax           ; if so continue
            x       a, [b]          ; else restore the old value
tamax:
            ld      a, batav        ;now read bank A's voltage
            ld      b, #bavmax      ; and look for a maximum
            x       a, [b]          ;store the new maximum
            ifgt    a, [b]          ;is old value greater than new
            x       a, [b]          ; then put it back
            jmp     tstdlt          ;test for delta V readan:
            ld      enad, #04       ;setup to read battery A's voltage
            nop                     ;Time delay to complete conversion
            nop
            nop
getrdg:
            nop
            nop
            nop
            nop
            nop
            ld      a, adrslt       ;read A/D
            ld      enad, #0        ;Put A/D in low power mode
            ret readbn:
            ld      enad, #044      ;setup to read battery B's voltage
            jp      getrdg          ;takes 3 clock cycles ; CHKBAT determines which battery is currently selected and then reads
; the battery voltage. The voltage is returned in A. No other registers
; are disturbed.

chkbat:
            ld      a, #04          ;set single & divide by 6
            bitif   bankb, oplow    ;if on bank B
            or      a, #040         ; setup to read battery B's voltage
            x       a, enad         ;and enable A/D converter
            nop                     ;Time delay to complete conversion
            nop
            nop
            nop
            nop
            nop
            nop
```

```
        nop
        ld      a, adrslt       ;read A/D
        ld      enad, #0        ;Put A/D in low power mode
        ret reslop:
        sbit    0, psw          ;global interrupt enable
        nop                     ;service all interrupts now
        nop
        nop
        rbit    0, psw          ; now turn them back off
        bitif   acav, portcp    ;test for AC adapter
        jp      res00           ; if operating from batteries
        jsr     tstn03          ;reenable normal operation
        jmp     main
res00:
        bitif   bdt, mode       ;wait for bdt to clear
        jp      reslop          ; until battery inserted
        ifeq    tdelay, #0
        jp      res01
        jmp     reslop          ;wait before measuring batteries
res01:
        jsr     tbgood          ;next test for good battery
        jp      nogood
        jmp     main            ;start over with good battery nogood:
        setbit  lobat3, mode    ;wait 10 sec for new battery or AC
        ld      minute, #min1/6 ;reset the minute counter for termination
        jsr     stbeep          ;beep and prepare to turn off
        jmp     main lo3lop:
        bitif   acav, portcp    ;test for AC adapter
        jp      lo300           ; until AC plugged in
        jsr     tstn03          ;reenable normal operation
        jmp     main
lo300:
        bitif   bdt, mode       ;check for battery presence &
        jmp     main
        jp      lo3lop          ; wait until battery removed or AC plugged in clrlob:
        jsr     lblof0
        ld      b, #mode        ;This is the same number of bytes and one
        bitif   lobat3, [b]     ; less clock than testing mode directly
        jsr     hldoff
        ld      b, #mode
        bitif   lobat2, [b]
        jsr     hldoff
```

```
        ld      b, #mode
        clrbit  lobat3, [b]
        clrbit  lobat2, [b]
        clrbit  lobat1, [b]
        ret ; TSTPOA tests to see if the case is closed and flashes led's or beeps
; accordingly.

tstpoa:
        ld      a, alrmct           ;get number of seconds switch is down
        ifgt    a, #poasec          ;more than 5 seconds
        jp      closed              ; then case must be closed
        inc     a
        x       a, alrmct           ;increment count
        ret closed:
        setbit  poa, flashb         ;set case closed flag
        bitif   &cav, portcp        ;test for ac available
        jp      clos00              ; continue if no AC
        jsr     dspof0              ;turn off LCD if case closed,
        clrbit  poabep, flashb      ; but no alarm if AC present
        ret
clos00:
        bitif   crton, flashb       ;is the crt in use
        ret                         ; then don't beep
        bitif   poabep, flashb
        ret                         ;if already in standby, don't do it again
        jsrl    stndby              ;put system in standby mode and
        setbit  poabep, flashb      ; if on batteries then beep
        jsr     stbeep
        ret clrbdt:
        clrbit  bdt, wkpnd          ;make sure interrupt is clear clrbsy:
        ld      b, #oplow           ; clear io latch
        setbit  csclr, [b]          ; first write bit high
        jsr     putlow
        ld      b, #oplow
        clrbit  csclr, [b]          ; and then low again
        jmp     putlow stmout:
        ld      b, #syscnt
        ld      x, #systim
        ld      cnt, #3
initl:
        ld      a, [x+]             ;set the initial timeouts
        x       a, [b+]
```

```
            drsz    cnt
            jp      initl
            ret dlypmd:
            ld      tdelay, #200        ;delay 1 second for battery to stabalize
rstpmd:
            jsr     vinit
            ld      a, batav
            ld      b, #bavmax          ;point to start of table
            x       a, [b]              ; and set max and min to current
            ld      a, [b+]             ; readings
            x       a, [b+]
            ld      a, batbv
            x       a, [b]
            ld      a, [b+]
            x       a, [b]
            ret vinit:
            jsr     readad              ;setup the running average array
            jsr     readad              ; this is slower than doing only
            jsr     readad              ; the readings we need, but we only
            jsr     readad              ; do it once in a while
            jsr     readad
            jsr     readad
            jsr     readad
            jsr     readad
            jmp     avrage reset:
            ld      psw, #0             ;turn off all potential interrupts
            ld      icntrl, #0
            ld      cntrl, #0
            ld      t2cntrl, #0
;           jsr     dspsp               ;** debug
            ld      sp, #06F
            jmp     start ; REFRSH will output a stream of refresh pulses every 5.12 msec when
; the COP has the cpu in hold
;

refrsh:
            ld      b, #portcd
            setbit  rfresh, [b]
            setbit  rfresh, portcc      ;enable output only during refresh
            ld      cnt, #41            ;to average 1 refresh every 125 usec.
            bitif   s386, sysbyt        ; different refresh for 286 than 386
            jp      reflop              ; do 386 refresh
ref286:
            clrbit  rfresh, [b]         ; otherwise do 286
```

```
        jsr     delay1              ;to make 13.75 usec pulse
        nop                         ; stretch it out to 20 usec.
        nop
        nop
        nop
        nop
        setbit  rfresh, [b]
        jsr     delay1              ;to make 22.5 usec delay before next pulse
        drsz    cnt
        jp      ref286
        jp      refext              ;to turn off portc reflop:
        clrbit  rfresh, [b]
        nop                         ;to make 2.5 usec pulse
        nop                         ;one more for good measure
        setbit  rfresh, [b]
        drsz    cnt
        jp      reflop
refext:
        clrbit  rfresh, portcc      ;disable as soon as refresh is done
        clrbit  rfresh, [b]
        ret dsplon:
        clrbit  crton, flashb       ;indicate lcd active
dspon0:
        clrbit  vramcs, wken        ;disable wakeup on video activity
        clrbit  vramcs, wkpnd
        ld      b, #oplow           ;now the low byte
        setbit  vddon, [b]          ; to turn on the +5v to the LCD
        setbit  lcdon, [b]          ; to turn on the backlight inverter
        jp      putlow              ;do it and return to caller ; HSPEED and LSPEED are used to switch the processor speed by
; toggling the HIGHSPEED* line (OP 13) on MILES hspeed:
        ld      b, #ophigh          ; point to contents of OP high byte
        clrbit  hispd, [b]          ; low for max clock speed
        jp      puthi               ; output to OP register lspeed:
        ld      b, #ophigh          ; point to contents of OP high byte
        setbit  hispd, [b]          ; set bit high for 1/2 clock speed
        jp      puthi               ; output to OP register dsplof:
        setbit  crton, flashb       ;indicate crt active
dspof0:
        ld      b, #oplow           ;set the OP low byte
        clrbit  lcdon, [b]          ; to turn off the backlight inverter
```

```
        clrbit  vddon, [b]              ; to turn off the +5v to the LCD
;       jp      putlow                  ; before the LCD controller ;
;       PUTLOW / PUTHI
;
; These routines write a byte pointed to by the B register to the MILES
; OP Low byte or OP High byte registers respectively
;
putlow:
        clrbit  milsad, portcd   ;C0 = 0
        jp      put
puthi:
        setbit  milsad, portcd   ;C0 = 1
put:
        ld      a,[b]
        x       a,portd          ;put the value in port D
        ld      b, #portcd       ;point to port C for faster access
        setbit  milstb, [b]      ;toggle c1 to a 1
        clrbit  milstb, [b]      ;reset to 0 to latch data
;       pop     a                ;recover the flags
;       x       a, psw           ; and restore them
        ret ;
; HLDOFF restores the processor to full speed operation
;
hldoff:
        bitif   hldreq, mode             ;Are we in hold mode?
        jp      hld00                    ; yes then turn cpu back on
        jp      hld01                    ; no then just exit sleep
; first set IO_M to IO in OPH
hld00:
        ld      b, #ophigh               ;point to the op register data storage
        setbit  iom, [b]                 ; D port data = 10000000 for IO
        jsr     puthi ld      b, #oplow                ;restore normal value
        clrbit  drq5, [b]
        clrbit  master, [b]
        jsr     putlow
        clrbit  hldreq, mode             ;clear the flag
hld01:
        jsrl    c20on                    ;turn on the crt controller
        bitif   poa, flashb              ;don't turn on if case closed
        jp      hld00
        bitif   crton, flashb            ; or the crt is active
        jp      hld02
        jsr     dspon0                   ;turn on the display
hld02:
        jsrl    endslp                   ;exit sleep mode
        bitif   charge, crgmde   ;**     ;are we charging
```

```
            jp      hld03
            jsr     stmout              ;reload the timeout counters
    hld03:
            clrbit  pwrled, portcd      ;turn the power/standby led on
            clrbit  kbdint, wkpnd       ;clear keyboard interrupt
            clrbit  kbdint, wken        ;turn off wakeup enable **********
            clrbit  cpuint, wken
            clrbit  cpuint, wkpnd
    ; now set IO_M- to M in OPH
            ld      b, #ophigh          ;point to the op register data storage
            clrbit  iom, [b]            ;point to memory
            jmp     puthi               ; and return ;
    ; RESVON turns on the reserve battery if the main battery is removed
    ;       On Entry  B points to WKPND
    ;
    resvon:
            bitif   acav, portcp        ;test for ac available
            jp      resv01              ;only turn on if no AC
            clrbit  bdt, [b]            ;clear the interrupt
            setbit  rbin, portcd        ; make sure the reserve is off ;**
            ret
    resv01:
            ld      minute, #min4/2     ;reset the minute counter for termination
            setbit  bdt, mode           ;set flag for new bat test
            clrbit  rbin, portcd        ;turn on reserve battery
            ld      [b], #0             ;clear all the pending interrupts
            jsrl    stndby              ;enter standby mode and
            clrbit  kbdint, wken        ; only exit on new battery or acav
    ;**     setbit  cpuint, wken
    ;       jsr     rstpmd
            ld      b, #ophigh
            clrbit  iom, [b]            ;make sure we're set to memory cycle
            jsr     puthi
            ld      a, #L(sresdi)       ;get # of times reserve has been activated
            jsrl    mle00
            inc     a
            x       a, portd
            except  sramw, sresdi       ;save the count
            ifeq    portd, #0           ;did we wrap
            jsr     incrdi              ;then increment upper byte
            ld      tdelay, #20         ;debounce delay
            ret ; TSTNEW monitors the bdt line watching for a new battery to be installed tstnew:
            jsr     clrbsy              ;try to reset bat detect bit
            bitif   acav, portcp        ;did user plug in AC adapter?
            jp      tstn00              ; no then continue
            jp      tstn01              ; yes then cancel standby after delay
```

```
tstn00:
        bitif   bdt, portlp             ;check for battery presence
        jp      setdly                  ; none yet
tstn01:
        drsz    tdelay                  ;debounce time
        ret
tstn03:
        setbit  rbin, portcd            ;turn off reserve battery
        jsr     clrlob
        clrbit  bdt, [b]                ;CLRLOB sets B to point to MODE
;**     setbit  kbdint, wken            ; reenable keyboard interrupt
        jsr     dlypad                  ;initialize min and max for new bat
        jmp     hldoff                  ;exit standby mode
setdly:
        ld      tdelay, #20             ; 100 msec debounce
        ret ; TBGOOD tests the new battery to see if it is above minimum voltage
; and skips the next instruction on return if the battery is good tbgood:
        bitif   acav, portcp            ;If AC plugged in then
        jp      tbg00
        retsk                           ;always return good
tbg00:
        jsr     chkbat                  ;Then test new battery
        bitif   lobat2, mode            ;** possibly eliminate           **
        jp      tbgd2                   ;** and require all new to be v+10 **
        ifgt    a, #vterm+1             ; must be above minimums
        retsk jsr     cngbat                  ; if not try the other battery
        ret                             ;we can only get here if both
                                        ;banks are bad and no AC is available jsr     chkbat                  ;read voltage on second bank
        ifgt    a, #vterm+1             ; above minimum?
        retsk                           ;start over with good battery
        ret tbgd2:
        ifgt    a, #vterm+10            ; allow at least 10 minutes operation
        retsk jsr     cngbat                  ; if not try the other battery
        ret                             ;we can only get here if both
                                        ;banks are bad and no AC is available
        jsr     chkbat                  ;read voltage on second bank
        ifgt    a, #vterm+10            ; allow at least 10 minutes operation
        retsk                           ;start over with good battery
        ret
```

```
incrdi:
        ld      a, #L(sresdi+1)         ;get # of times reserve has been charged
        jsrl    m1e00
        inc     a
        x       a, portd
        except  sramw, sresdi+1         ;save the count
        ret tstvid:
        bitif   vramcs, wken            ;is test for activity enabled?
        jp      vid00
        clrbit  vramcs, wkpnd
        ret                             ; if not active
vid00:
        bitif   hldreq, mode            ;are we in standby mode
        ret                             ; if so then return
        bitif   crton, flashb
        jp      rstlcd
        jsr     dspon0                  ;else make sure display is on
        jp      rstlcd rldlcd:
        bitif   vramcs, wkpnd           ;test for activity
        jp      rstlcd                  ;if active
        ifeq    lcdcnt, #0              ;no timeouts if zero count
        ret
        bitif   crton, flashb           ;is the LCD or CRT active
        ret                             ; if CRT
        drsz    lcdcnt                  ; else decrement counter
        ret                             ; and return
        setbit  vramcs, wken            ;enable wakeup on video activity
        clrbit  kbdint, wkpnd
        setbit  kbdint, wken            ; or a keypress
        jmp     dspof0                  ;turn off display backlight & LCD
rstlcd:
        ld      a, lcdtim
        x       a, lcdcnt               ;reset the lcd counter
        clrbit  vramcs, wkpnd
        jp      sysrst rlchdc:
        bitif   hdcs0, wkpnd            ;test for activity on hard disk
        jp      rsthd                   ;if there is activity
        ifeq    hdcnt, #0               ;no timeouts if zero count
        ret
        drsz    hdcnt                   ; else dcrement counter
        ret                             ; and return
        jmpl    drvof1                  ;when we decrement to zero
rsthd:
        ld      a, hdtim                ;reset the timeout from system setting
        x       a, hdcnt
        clrbit  hdcs0, wkpnd
```

```
sysrst:
        ld      a, systim       ;reset system timeout if anything active
        x       a, syscnt
        clrbit  kbdint, wkpnd
        jmp     clrbsy          ;to clear out I/O activity flag rldsys:
        bitif   kbdint, wkpnd   ;test keyboard
        jp      sysrst
        bitif   ioact, portgp   ;test for any active I/O devices
        jp      sysrst
        ifeq    syscnt, #0      ;no timeouts if zero count
        ret
        drsz    syscnt
        ret                     ;if nothing active
        jsrl    drvof1                  ;turn off the drive
        jsr     dspof0                  ;turn off the display
        setbit  vramcs, wken    ;enable wakeup on video activity
;       setbit  hdcs0, wken     ; or hard disk activity
        jmpl    sleep ; READAD reads the A/D channels and maintains the last 8 values of each
; voltage and charge current in an array starting at location AVSAVE
readad:
        rc
        ld      enad, #04       ;Single conversion, divide by 6
        ld      b, #enad
        ld      x, #debug       ;use the debug location to pass readings
adloop:
        ld      a, [b]          ;get the enable command
        adc     a, #020         ;bump to the next channel
        x       a, [b+]         ; and start the next conversion
        ld      a, [b-]         ;read the previous result
        x       a, [x+]         ; and store it
        ifnc                    ;test for overflow
        jp      adloop          ; and continue till done
        ld      enad, #0        ;Put A/D in low power mode bitif   charge, crgmde  ;Are we charging the batteries?
        jsr     readv           ; then turn off charge and reread voltage
;       jsr     forcer ; Update arrays with latest readings ld      x, #debug       ;address of A/D value array
        ld      b, #avsave      ;pointer to 1st element for A Batt
        ld      cnt, #5
update:
        ld      a, [x+]         ;get a reading
        jsr     rotate          ; and add it to the array
        drsz    cnt
        jp      update
```

```
                ld      cnt, #3                 ;now do the discharge currents
                ld      b, #batrc
uploop:
                ld      a, [x+]                 ;get the A current
                x       a, [b+]                 ; and save it
                drsz    cnt
                jp      uploop
                ret forcer:
                ld      b, #debug
                clr     a
                ld      cnt, #8
forlop:
                x       a, [b]
                ld      a, [b+]
                inc     a
                drsz    cnt
                jp      forlop
                ret ; AVRAGE averages the last 8 readings for each battery voltage and
; charge current and stores the 8 bit values in a table
;
avrage:
                ld      x, #avsave              ;point to the first set of 8 readings
                ld      b, #avwork              ;16 bit workspace
                jsr     avr
                x       a, batav                ;average battery A voltage
                jsr     avr
                x       a, bacrg                ;average batt A charge current
                jsr     avr
                x       a, batbv                ;average battery B voltage
                jsr     avr
                x       a, bbcrg                ;average batt B charge current
                jsr     avr
                x       a, batrv                ;average reserve battery voltage
                ret avr:
                clr     a
                x       a, [b+]                 ;clear the work area
                clr     a
                x       a, [b-]
                rc
                ld      cnt, #8
avloop:
                ld      a, [x+]                 ;get the next reading
                adc     a, [b]                  ; and add in the accumulated value
                x       a, [b+]                 ; save
                clr     a                       ;get a zero
                adc     a, [b]                  ; and add in the carry and clear it
```

```
        x       a, [b-]                 ; and save
        drsz    cnt
        jp      avloop ld      cnt, #3                 ;setup for the shift operation
        ld      a, [b+]                 ;increment b to point to avwork+1
sftlop:
        ld      a, [b]                  ;it's more efficient to do it always
        rrc     a                       ; rather than a test and skip
        x       a, [b-]                 ;restore the shifted value
        ld      a, [b]                  ;now get the LSB
        rrc     a                       ; and shift it as well
        x       a, [b+]
        drsz    cnt
        jp      sftlop                  ;three times for divide by 8 ld      a, [b-]                 ;point back to avwork
        ld      a, [b]                  ;get the average value for return
        ret ; WRITAD returns the A/D values starting at 1F81h
;
;       1F81 - Bank A voltage
;       1F82 - Bank A charge current
;       1F83 - Bank B voltage
;       1F84 - Bank B charge current
;       1F85 - Reserve battery voltage
;       1F86 - Reserve battery discharge current
;       1F87 - Bank A discharge current
;       1F88 - Bank B discharge current writad:
;       ld      b, #batbc               ;point to the data
        ld      b, #debug+7             ;point to the data
        ld      x, #portd writ8p:                                 ;write the parameters to SRAM
        ld      a, [b-]                 ;get the last parameter
        x       a, [x]
        except  sramw 01F88             ; and write in reverse order
        ld      a, [b-]
        x       a, [x]
        except  sramw 01F87
        ld      a, [b-]
        x       a, [x]
        except  sramw 01F86
        ld      a, [b-]
        x       a, [x]
        except  sramw 01F85
writ4p:
        ld      a, [b-]
        x       a, [x]
```

```
        except  sramw 01F84
        ld      a, [b-]
        x       a, [x]
        except  sramw 01F83
        ld      a, [b-]
        x       a, [x]
        except  sramw 01F82
        ld      a, [b]
        x       a, [x]
        except  sramw 01F81
        ret ; READV momentairly turns off the charger and rereads the battery voltages readv:
        bitif   chrgb, crgmde           ;is timer 1 on?
        jsr     t1off
        bitif   chrga, crgmde           ;test timer 2 also
        jsr     t2off
        bitif   chrgrb, crgmde          ;Is reserve battery being charged?
        jsr     rbcoff
        ld      enad, #04               ;start voltage reading for A batt
        ld      b, #enad
        ld      x, #debug               ;use the debug location to pass readings
        ld      a, [b]                  ;get the enable command
        add     a, #040                 ;bump to the next channel
        x       a, [b+]                 ; and start the next conversion
        ld      a, [b-]                 ;read the previous result
        x       a, [x+]                 ; and store it
        ld      a, [b]                  ;get the enable command
        add     a, #040                 ;bump to the next channel
        x       a, [b+]                 ; and start the next conversion
        ld      a, [x+]                 ;bump x to point to b channel
        ld      a, [b]                  ;get the B reading
        x       a, [x+]                 ;and replace the old value
        ld      a, [x+]                 ;bump the pointer
        ld      a, [b]                  ;read the reserve result
        x       a, [x]                  ; and save it
        ld      enad, #0                ;Put A/D in low power mode ld      b, #crgmde
        bitif   chrgb, [b]              ;was bank B charging?
        setbit  txc0, cntrl             ; if so then reenable
        bitif   chrga, [b]              ;How about bank A
        setbit  txc0, t2cntrl
        bitif   chrgrb, [b]             ;Finally test the reserve battery
        jsr     rbcon
        ret t1off:
        ld      b, #portgd
        clrbit  txc0, cntrl             ;turn off timer
```

```
        setbit  chrgb, [b]         ; then make sure output is high
        ld      b, #tmr1lo         ;clear out the timer to avoid
        ld      [b+], #0           ; phase shifts
        ld      [b], #0
        ret t2off:
        ld      b, #portld
        clrbit  txc0, t2cntrl      ;turn off timer
        setbit  chrga, [b]         ; then make sure output is high
        ld      b, #tmr2lo         ;clear out the timer to avoid
        ld      [b+], #0           ; phase shifts
        ld      [b], #0
        ld      b, #ophigh         ;make sure the speaker is also off
        clrbit  speakr, [b]
        jmp     puthi rbcend:
        clrbit  chrgrb, crgnde
rbcoff:
        ld      b, #oplow          ;point to OP low save byte
        clrbit  chrgrb, [b]        ;turn off the Res batt charger
        jmp     putlow rbstrt:
        ld      b, #ophigh
        clrbit  iom, [b]           ;make sure we're set to memory cycle
        jsr     puthi
        ld      a, #L(srescr)      ;get # of times reserve has been charged
        jsrl    m1e00
        inc     a
        x       a, portd
        except  sramw, srescr      ;save the count
        ifeq    portd, #0          ;did we wrap
        jsr     incrcr             ;then increment upper byte
        setbit  chrgrb, crgnde
        jsrl    clrold
        ld      brvmax, #0         ;clear peak reading
rbcon:
        ld      b, #oplow
        setbit  chrgrb, [b]        ;turn on the reserve batt charger
        jmp     putlow incrcr:
        ld      a, #L(srescr+1)    ;get # of times reserve has been charged
        jsrl    m1e00
        inc     a
        x       a, portd
        except  sramw, srescr+1    ;save the count
        ret incrti:
```

```
        ld      a, #L(sresti)           ;reserve operation time
        jsrl    m1e00
        ifgt    a, #min4                ;max time
        ret
        inc     a
        x       a, portd
        except  sramw, sresti           ;save the new time
        ret
; ROTATE stores the last 8 values in an array pointed to by the B register
;  these values are used to calculate average voltage and current for the
;  battery charge function
;
;       On Entry:
;               A - contains the most recient value read by the A/D
;               B - points to the beginning of the 8 byte array
;       On Exit:
;               A - contains value being discarded
;               B - points to start of the next array rotate:
        x       a, [b+]                 ;Store and increment
        x       a, [b+]
        x       a, [b+]
        x       a, [b+]
        x       a, [b+]
        x       a, [b+]
        x       a, [b+]
        x       a, [b+]
        ret adjcrg:
        bitif   trklec, crgmde          ;are we trickle charging?
        ret                             ; if so just return
        drsz    syscnt                  ;only adjust every 8 seconds
        ret
        ld      syscnt, #8
        jsr     avrage                  ;compute the new averages
        bitif   chrga, crgmde
        jsr     testa
        bitif   chrgb, crgmde
        jsr     testb
;       jsr     dspdc           ;**     ;display duty cycle on smartview
        ret testa:
        ld      a, bacrg ifgt    a, #ihchrg              ;compare with desired charge rate
        jp      shortt                  ; if greater test for short
        ifgt    -a, #ilchrg             ;is charge rate correct?
        ret                             ; yes, then done
```

```
        ld      b, #t2ralo      ;point to timer 2 a reg
        ld      a, [b]          ; and get current setting
        ifeq    a, #maxcrg      ;are we already at maximum
        ret                     ; then stay put
        inc     a               ;bump the charge rate
        x       a, [b+]
        ld      a, [b+]         ;increment to the b register
        ld      a, [b]          ; and get the current setting
        dec     a               ;decrement by one
        x       a, [b]          ; and store it back
        ld      hdcnt, #2       ;force new minimum current
        ret shortt:                         ;test for shorted battery
        ld      a, #vterm       ;check voltage
        ifgt    a, batav        ;is voltage nominal
        jmp     acrgof          ;battery is shorted if less than 7.5v
        ld      b, #t2ralo      ;if not then reduce charge
        ld      a, [b]
        ifgt    a, #mincrg      ;are we above the minimum
        jp      short1
        jmp     acrgof          ;if not then turn off short1:
        dec     a
        x       a, [b+]         ;decrease the on time
        ld      a, [b+]
        ld      a, [b]
        inc     a               ; and increase the off time
        x       a, [b]
        ld      hdcnt, #2       ;wait before next check for -dV
        ret testb:
        ld      a, bbcrg
        ifgt    a, #ihchrg      ;compare with desired charge rate
        jp      shortb          ; if greater test for short
        ifgt    -a, #ilchrg     ;is charge rate correct?
        ret                     ; yes, then leave it alone ld      b, #t1ralo      ;point to timer 2 a reg
        ld      a, [b]          ; and get current setting
        ifeq    a, #maxcrg      ;are we already at maximum
        ret                     ; then keep constant rate
        inc     a               ;bump the charge rate
        x       a, [b]          ; and store it back
        ld      b, #t1rblo      ;point to the b register
        ld      a, [b]          ; and get the current setting
        dec     a               ;decrement by one
        x       a, [b]          ; and store it back
        ld      lcdcnt, #2
        ret
```

```
shortb:                         ;test for shorted battery
        ld      a, #vterm       ;check voltage
        ifgt    a, batbv        ;is voltage nominal
        jmp     bcrgof          ;battery is shorted if less than 7.5v
        ld      b, #t1ralo      ;if not then reduce charge
        ld      a, [b]
        ifgt    a, #mincrg      ;are we above the minimum
        jp      short2
        jmp     bcrgof          ;if not then turn off short2:
        dec     a
        x       a, [b]          ;decrease the on time
        ld      b, #t1rblo
        ld      a, [b]
        inc     a               ; and increase the off time
        x       a, [b]
        ld      lcdcnt, #2
        ret tstend:
        drsz    batcnt          ;Maximum charge time
        jp      tst00
        jmp     trickl          ;trickle charge
tst00:
        bitif   chrga, crgmde
        jsr     testav
        bitif   chrgb, crgmde
        jsr     testbv
        bitif   chrgrb, crgmde
tstr00:
        jsr     testrv
        ld      cnt, #8         ;move last readings to a temp area
        ld      x, #batav
        ld      b, #crgrdg
savlop:
        ld      a, [x+]
        x       a, [b+]
        drsz    cnt
        jp      savlop
        ret tstres:
        jsr     avrage          ;compute average voltage
        jp      tstr00 testav:
        ld      a, crgrdg       ;get old average
        ld      b, #batav
        ifeq    a, [b]          ;are we at a plateu
        jp      vacnst          ; test for timeout
        drsz    hdcnt           ;no -dV after -dPulse width
```

```
        jp      tstav0
        ld      hdcnt, #1
        ifgt    a, [b]              ;look for -dV
        jp      acrgof              ; then turn off
tstav0:
        ld      avcnst, #cvtimr     ;voltage changed so reset timer
        ret vacnst:
        ifeq    t2ralo, #maxcrg     ;are we at maximum duty cycle?
        jp      testac              ; then look for +dI
        drsz    avcnst              ;decrement counter
        ret
acrgof:
        clrbit  chrga, crgmde       ;tell system we are done
        jsr     t2off               ;turn off the timer
        clrbit  chrga, portlc       ; and timer output bit
        ld      lcdcnt, #2          ;force new minimum current for bank B
        bitif   chrgb, crgmde       ;is bank B still charging
        ret                         ; then leave it alone
        jmp     trickl
;       clrbit  charge, crgmde      ; otherwise reset mode
;       ret testac:
        ld      a, bacrg            ;check the current reading
        ld      b, #baimin          ; and compare with old average
        ifgt    a, crgrdg+1         ;is I increasing
        jp      tstac1              ; then test limits
tstac0:
        x       a, [b]              ;save new minimum if I not increasing
        ret tstac1:
        drsz    hdcnt               ;don't allow test for 1 min after max
        jp      tstac0              ; force new minimum
        ld      hdcnt, #1           ;once here, always here
        sc                          ;clear borrow for subtraction
        subc    a, [b]              ;find the delta I
        ifgt    a, #deltai          ; cutoff it +dI > 12ma.
        jmp     acrgof
        ret testbv:
        ld      a, crgrdg+2         ;get old average
        ld      b, #batbv
        ifeq    a, [b]              ;are we at a plateu
        jp      vbcnst              ; test for timeout
        drsz    lcdcnt
        jp      tstbv0
        ld      lcdcnt, #1
        ifgt    a, [b]              ;look for -dV
```

```
        jp      bcrgof                  ; then turn off
tstbv0:
        ld      bvcnst, #cvtimr         ;voltage changed so reset timer
        ret vbcnst:
        ifeq    t1ralo, #maxcrg
        jp      testbc                  ;look for +dI
        drsz    bvcnst                  ;decrement counter
        ret bcrgof:
        clrbit  chrgb, crgmde           ;tell system we are done
        jsr     t1off                   ;turn off the timer
        clrbit  chrgb, portgc           ; and the output bit
        ld      hdcnt, #2               ;force new minimum current for bank A
        bitif   chrga, crgmde           ;is bank A still charging
        ret                             ; then leave it alone
        jmp     trickl
;       clrbit  charge, crgmde          ; otherwise reset mode
;       ret testbc:
        ld      a, bbcrg                ;check the current reading
        ld      b, #bbimin              ; and compare with old average
        ifgt    a, crgrdg+3             ;is I increasing
        jp      tstbc1
tstbc0:
        x       a, [b]
        ret tstbc1:
        drsz    lcdcnt                  ;delay test until current is stable
        jp      tstbc0
        ld      lcdcnt, #1
        sc
        subc    a, [b]
        ifgt    a,#deltai
        jmp     bcrgof                  ; then turn off charge
        ret testrv:
;       jsr     dsprv           ;**     Display V on smartview
        ld      a, batrv                ;get most recent reading
        ld      b, #brvmax              ;point to stored maximum
        x       a, [b]                  ; save new maximum?
        ifgt    a, [b]                  ;has V decreased
        jp      rbcext                  ; then turn off charge
        ret                             ; otherwise just return rbcext:
        ld      b, #ophigh
```

```
        clrbit   iom, [b]              ;make sure we're set to memory cycle
        jsr      puthi
        ld       portd, #0
        except   sramw, sresti         ;reset reserve usage time
        jmp      rbcend dspcg:
        ld       a, portcd             ;port c data
        jsr      makhex
        jsr      smrtlo                ;output to lower 2 bytes
        ld       a, portgp             ; and port g data
        jsr      makhex
        jmp      smrthi                ;upper 2 bytes dspsp:
        ld       a, sp                 ;stack pointer
        jsr      makhex
        jsr      smrtlo                ;output to lower 2 bytes
        ld       b, #avwork
        ld       [b+], #070            ;'p'
        ld       [b], #073             ;'s'
        jmp      smrthi                ;upper 2 bytes dsprv:
        ld       a, batrv
        jsr      makhex
        jsr      smrtlo                ;output to lower 2 bytes
        ld       a, brvmax
        jsr      makhex
        jmp      smrthi                ;upper 2 bytes dspdc:
        ld       a, t1ralo             ;on time for bank b
        jsr      makhex
        jsr      smrtlo                ;output to lower 2 bytes
        ld       a, t2ralo             ;on time for bank a
        jsr      makhex
        jmp      smrthi                ;upper 2 bytes makhex:
        ld       b, #avwork            ;point to temp area
        push     a
        jsr      hexnbl                ;convert to hex
        pop      a                     ;recover original value
        swap     a                     ; and reverse nibbles hexnbl:
        and      a, #0F                ;mask off upper nibble
        add      a, #030
        ifgt     a, #039
        add      a, #07
```

```
        x       a, [b+]
        ret

;This is a debug routine to write values to smart view on the host processor bus ; The X register is used to point to the Data to be output
; The B register points to Port D during the data transfer smrtlo:
; first set IO_M* to IO in OPH
        ld      b, #ophigh              ;point to the op register data storage
        setbit  iom, [b]                ; D port data = 10000000 for IO
        jsr     puthi ld      x, #avwork              ;pointer for data to be output ; next, set up DRQ5 in OPL
        ld      a, oplow                ;get the op register data
        x       a, portd                ; so we can retreive this later
        ld      a, portd                ; emulate a store instruction
        or      a, #drq5                ;set the drq5 bit in the register save data
        x       a, portd                ; D port data = 00000001 for DRQ5
        ld      b, #portcd
        clrbit  milsad, [b]             ; C0 = 0
        setbit  milstb, [b]             ; C1 = 1 (this starts the DREQ cycle)

; now look for DACK ckdack

; next, pull master high in OPL
        ld      b, #portd               ; point to the D port
        setbit  master, [b]             ; D port data = 00000011 for master*
        clrbit  milstb, portcd          ; close the OP Low register ; write desired data to D port
        x       a, [x+]                 ;recover the data to output
        x       a, [b]                  ; and store it in port D ; execute the io write exception cycle to port 94h
        except  iow, 094 x       a, [x]                  ;get the next byte to output
        x       a, [b]                  ; and put it in port D ; execute the io write exception cycle to port 95h
        except  iow, 095

; clear DRQ and master*
        ld      a, oplow
        x       a, [b]                  ; A contains the original OP Low value
        ld      b, #portcd              ; point back to port C
```

```
        setbit   milstb, [b]           ; turn off master mode
        clrbit   milstb, [b]

; now set IO_M⁻ to M in OPH
        ld       b, #ophigh            ;point to the op register data storage
        clrbit   iom, [b]              ;point to memory
        jmp      puthi                 ; and return ;This is a debug routine to write values to smart view on the host processor bus
; The X register is used to point to the Data to be output
; The B register points to Port D during the data transfer smrthi:
; first set IO_M⁻ to IO in OPH
        ld       b, #ophigh            ;point to the op register data storage
        setbit   iom, [b]              ; D port data = 10000000 for IO
        jsr      puthi ld       x, #avwork            ;pointer for data to be output ; next, set up DRQ5 in OPL
        ld       a, oplow              ;get the op register data
        x        a, portd              ; so we can retreive this later
        ld       a, portd              ; emulate a store instruction
        or       a, #drq5              ;set the drq5 bit in the register save data
        x        a, portd              ; D port data = 00000001 for DRQ5
        ld       b, #portcd
        clrbit   milsad, [b]           ; C0 = 0
        setbit   milstb, [b]           ; C1 = 1 (this starts the DREQ cycle)

; now look for DACK ckdack

; next, pull master high in OPL
        ld       b, #portd             ; point to the D port
        setbit   master, [b]           ; D port data = 00000011 for master*
        clrbit   milstb, portcd        ; close the OP Low register ; write desired data to D port
        x        a, [x+]               ;recover the data to output
        x        a, [b]                ; and store it in port D ; execute the io write exception cycle to port 96h
        except   iow, 096 x        a, [x]                ;get the next byte to output
        x        a, [b]                ; and put it in port D ; execute the io write exception cycle to port 97h
        except   iow, 097

; clear DRQ and master*
```

```
        ld      a, oplow
        x       a, [b]              ; A contains the original OP Low value
        ld      b, #portcd          ; point back to port C
        setbit  milstb, [b]         ; turn off master mode
        clrbit  milstb, [b]

; now set IO_M- to M in OPH
        ld      b, #ophigh          ;point to the op register data storage
        clrbit  iom, [b]            ;point to memory
        jmp     puthi               ; and return ; TRICKL puts the system in trickle charge mode trickl:
;       ld      batcnt, #1          ;so we'll come back next time
trklon:
        clrbit  charge, crgmde      ; reset mode
        setbit  crgled, portcd      ;turn off the charge led
        bitif   acav, portcp        ;don't try to charge from batteries
        ret
        jsr     clrbsy              ;clear battery detect
        bitif   bdt, portlp         ;is there a battery present
        ret                         ; nop if no battery present
        setbit  trklec, crgmde
        jmpl    sttrkl              ;minimum charge rate trklof:
        clrbit  charge, crgmde      ;make sure no charge active
        clrbit  trklec, crgmde      ;no longer in trickle charge mode
        setbit  crgled, portcd      ;turn off the charge led
        jsr     t1off               ; so turn off the charge timers
        jsr     t2off
        jmp     dlypmd         ;**  ;initialize min and max ; SHRTON will drop master for a short period of time to allow the cpu to
; service the timer interrupt in order to maintain the DOS/UNIX clock
shrton:
        bitif   hldreq, mode        ;are we in hold currently
        jp      shrt00              ; if so then turn on for a short time
        ret                         ; otherwise just return
shrt00:

; set IO_M- to IO in OPH ld      b, #ophigh          ;point to the op register data storage
        setbit  iom, [b]            ; D port data = 10000000 for IO
        setbit  pd9020, [b]         ;turn on 90C20
        jsr     puthi clrbit  cpuint, wkpnd       ;clear the interrupt bit
```

```
          ld      b, #oplow
          clrbit  drq5, [b]           ;drop DRQ5
          clrbit  master, [b]         ; and master
          jsr     putlow              ;for a short time
          ld      b, #portlp          ;point to the L port
onloop:
          bitif   cpuint, [b]         ;wait for the interrupt to be serviced
          jp      onloop              ; by the host cpu jsr     delay               ; give cpu time to complete interrupt
          ld      b, #oplow
          setbit  drq5, [b]           ;now lets reassert drq, etc
          ld      a, [b]              ;get the op register data
          x       a, portd            ;and write to port d
          setbit  master, [b]         ; set flag while we still point there
          ld      b, #portcd
          clrbit  milsad, [b]         ; C0 = 0
          setbit  milstb, [b]         ; C1 = 1 (this starts the DREQ cycle)

; now look for DACK ckdack

; next, pull master high in OPL
          ld      b, #portd           ; point to the D port
          setbit  master, [b]         ; D port data = 00000011 for master*
          clrbit  milstb, portcd      ; close the OP Low register
; now set IO_M to M in OPH
          ld      b, #ophigh          ;point to the op register data storage
          clrbit  iom, [b]            ;point to memory
          bitif   crton, flashb       ;are we using the crt
          jp      shrt01              ; then don't turn video off
          clrbit  pd9020, [b]         ;turn off 90C20
shrt01:
          jmp     puthi               ; and return ; SPMOFF outputs a active high pulse to kill the system power module.
; This routine does not return, it just loops waiting for power to go away spmoff:
;         jp      copoff
;         jsr     dspsp               ;display stack
;         jp      .                   ;** debug only
          ld      b, #ophigh
          clrbit  dcoff, [b]          ;Start low
          jsr     puthi
          ld      b, #ophigh
          setbit  dcoff, [b]          ;bring it high
          jsr     puthi               ; and leave it there ; COPOFF turns off the COP by forcing a watchdog error
```

```
copoff:
        ld      b, #ophigh
        ld      [b], #fetoff            ;high speed, video off
        jsr     puthi                   ;This is to get around powerup
                                        ; problem with MILES
        ld      b, #oplow
        ld      [b], #0
        jsr     putlow
        setbit  rbin, portcd           ;turn off the reserve battery
        ld      wdcnt, #0               ;invalid data for watchdog to force reset
        jp      .                       ;wait for power to go away
;tstflh:                                ;** DEBUG **
;       ld      b, #oplow
;       jsr     fllbat
;       jsr     dely50
;       jp      -tstflh
;fllbat:
;       bitif   lowbat, [b]
;       jmp     lbloff
;       jmp     lblon ;
; Routine to switch batteries every 4 minutes and
; then reset idle count down timer. Skips next instruction
; after returning if operation is successful
;
cngbat:
        ld      batcnt, #min4
        jsr     tstbat                  ;make sure other bank is good
        ret
cngalt:
        setbit  cngben, crgmde         ;enable change on next timer tick
        clrbit  rbin, portcd           ;turn on reserve battery
        clrbit  bdt, wken              ;disable battery detect interrupt
        ld      tdelay, #200            ;1 sec delay before battery test
        retsk                           ;pretend we're done docngb:
        setbit  cngoff, crgmde         ;enable reserve off on next timer tick
        clrbit  cngben, crgmde         ; and don't switch again for a while
        ld      b, #oplow               ;point to the op register data storage
        ld      a, #bankb               ;set bit to invert
        xor     a, [b]                  ;invert it
        x       a, [b]                  ;and store the new value
        jmp     putlow                  ;set the byte in the MILES OP register reseta:
        ld      a, batav
        x       a, bavmax               ;reset maximum on A
        ret resoff:
```

```
        clrbit  cngoff, crgmde   ;so we won't come here again
        jsr     clrbdt           ;reset the battery detect latch
        bitif   bdt, portlp      ;then check to see if battery really present
        jp      nobat            ;if battery just removed
        setbit  rbin, ported     ;if good then turn off the reserve
        setbit  bdt, wken        ; and reenable the bdt interrupt
        bitif   bankb, oplow     ;check for current bank
        jp      reseta
        ld      a, batbv
        x       a, bbvmax        ;reset maximum on B
        ret nobat:
        setbit  bdt, wkpnd       ;make sure interrupt is active
        setbit  bdt, wken        ; and reenable the bdt interrupt
        ret                      ; then continue tstbat:
        ld      a, #04           ;set single & divide by 6
        bitif   bankb, oplow     ;if on bank B
        or      a, #040          ; setup to read battery B's voltage
        x       a, enad          ;and enable A/D converter
        ld      a, enad          ; retreive the enable command
        xor     a, #040          ; setup to read the other channel
        nop                      ;Time delay to complete conversion
        nop
        nop
        x       a, enad          ;start the next cycle
        ld      a, adrslt        ; get the previous value
        ld      b, #adrslt       ;delay and setup for compare
        nop
        nop
        nop
        ld      enad, #0         ;Put A/D in low power mode
        ifgt    a, [b]           ;no load V must be greater then loaded V
        ret                      ; or we won't switch
        ifeq    a, [b]           ;equal isn't good enough
        ret
        retsk delay:
        ld      cnt, #45         ;approx 900 usec delay
dellop:
        jsr     delay1           ; 20usec/loop at 8MHz
        drsz    -cnt
        jp      dellop
        ret delay1:
        ret
```

```
dely50:
        ld      cnt, #20        ;**10   ;minimum of 51msec delay
        rbit    5, icntrl               ;clear the T0 overflow bit
dely5a:
        ifbit   5, icntrl               ;require 1 full idle period to start
        jp      dely51                  ; before servicing watchdog
        jp      dely5a                  ;loop
dely51:
        rbit    5, icntrl               ;clear the T0 overflow bit
dely52:
        ifbit   5, icntrl               ;wait for it to be set again
        jp      dely53
        jp      dely52                  ;loop
dely53:
        ld      wdcnt, #009     ;service watch dog 2-65K window, clock monitor on
        drsz    cnt                     ;10 timer overflows
        jp      dely51                  ;wait another 5.12msec
        ret ; TSTSTB tests the standby button to see if the user is requesting
;   standby mode tststb:
        ld      b, #flashb
        bitif   swx, portgp             ;is the standby switch depressed?
        jp      tsts01                  ; low true so, if not pressed, check for release
        bitif   stdeb1, [b]             ;check debounce bit
        jp      tsts00
        setbit  stdeb1, [b]
        ret
tsts00:
        setbit  stdeb2, [b]
        ret
tsts01:
        bitif   stdeb2, [b]
        jp      tsts02
        clrbit  stdeb1, [b]
        ret
tsts02:
        bitif   hldreq, mode            ;are we already in standby?
        jp      exstby                  ; then exit
        bitif   poa, [b]                ;was the case closed?
        jp      exstby                  ; then don't enter standby when opened
        clrbit  stdeb1, [b]
        clrbit  stdeb2, [b]
        ld      alrmct, #0              ;switch is up, so clear count
        clrbit  poa, [b]
        bitif   stbyen, sysbyt          ;is the standby switch enabled?
        jmpl    stndby
        ret                             ;otherwise do nothing
```

```
exstby:
        clrbit  stdeb2, [b]
        clrbit  stdeb1, [b]
        ld      alrmct, #0              ;switch is up, so clear count
        clrbit  poa, [b]
        clrbit  poabep, [b]
        jsr     hldoff                  ;bring cpu out of hold
        ret ; FLASHP uses the counter ERC to flash the power LED .5 seconds
; on every 2 seconds flashp:
        drsz    erc                     ;test the counter
        ret                             ;until underflow
        bitif   pwrled, portcp          ;test if light is off/on
        jp      pledon                  ;if off then turn on
        bitif   poabep, flashb          ;should we beep
        jsr     stbeep
        setbit  pwrled, portcd          ;turn led off
        ld      erc, #0                 ;off for approx 1.3 seconds
        bitif   lobat2, mode
        ret                             ;don't affect low bat led
        bitif   bdt, mode
        jp      lblon                   ;turn on lowbat led
        ret
pledon:
        bitif   poabep, flashb          ;should we beep
        jsr     stbeep
        clrbit  pwrled, portcd          ;turn the led on
        ld      erc, #(seccnt/2)+1      ; for .5 seconds
        bitif   lobat2, mode
        ret                             ;don't affect low bat led
        bitif   bdt, mode
        jp      lbloff                  ;turn off lowbat led
        ret lblon:
        bitif   lobat2, mode
        jsr     stbeep                  ;beep if low bat 2 mode
        ld      b, #oplow
        setbit  lowbat, [b]
        jmp     putlow lbloff:
        jsr     stbeep
lblof0:
        ld      b, #oplow
        clrbit  lowbat, [b]
        jmp     putlow ; FLSHLB uses the counter AVCNST to flash the low bat LED .5sec on every
```

; second. This register is safe to use because we can't have a low
; battery condition while charging.

```
flshlb:
        drsz    avcnst                  ;test the counter
        ret
        ld      avcnst, #(seccnt/2)+1   ;.for .5 seconds
        bitif   lowbat, oplow           ;is the LED already on?
        jp      lbloff                  ; then turn it off
        jp      lblon                   ; else turn it on stbeep:
        jsr     t2off                   ;make sure charger is off completly
        clrbit  chrga, portlc           ; so we can use this timer
        jsr     t1off                   ;this timer is duration
        clrbit  chrgb, portgc
        ld      b, #t2ralo              ;point to timer reload registers
        ld      [b+], #L(beepct-1)
        ld      [b+], #H(beepct-1)
        ld      [b+], #L(beepct-1)
        ld      [b], #H(beepct-1)
        ld      b, #t1ralo
        ld      [b+], #L(btime)
        ld      [b], #H(btime)
        ld      t2cntrl, #095           ;start the timer
        ld      cntrl, #090
        rbit    1, icntrl               ;clear the pending flag
        sbit    0, icntrl               ; and enable the interrupt
        ret ckrbat:
        ld      a, #084                 ;read rbat voltage
        x       a, enad                 ;start the conversion
        ld      a, #L(sresti)           ;get rbat operation time
        jsrl    m1e00
        ifgt    a, #min4/4              ;charge if used for more than 1 minute
        jp      ckac                    ;charge reserve battery if ac available
ckr00:
        ld      a, adrslt               ;get the reserve voltage
        ld      enad, #0                ;Put A/D in low power mode
        ifgt    a, #vrmin               ;test for minimum allowed voltage
        ret
crgrbt:
        jmp     rbstrt ckac:
        ld      enad, #0                ;Put A/D in low power mode
        bitif   acav, portcp            ;Next test for AC power
        jp      ck2min                  ;2 minutes operation before charg from bat
        jp      crgrbt
ck2min:
        ifgt    a, #min4/2              ;if more than 2 minutes
        jp      crgrbt                  ; charge even if no AC
```

```
        jp      ckr00                   ; otherwise check voltage
```

; CKSRAM will look for a A5h at address 1E02 to indicate that the SRAM
; data has been initialized. If it does not find the A5h it will clear
; the area between 1E02 and 1EFF, and then store an A5 at 1E02.

```
cksram:
        ld      a, #L(sinitf)           ;get lower byte of address
        jsrl    m1e00
        ifeq    a, #0A5
        ret
        ld      b, #ophigh
        clrbit  iom, [b]                ;make sure we're set to memory cycle
        jsr     puthi
        ld      portd, #0
        except  sramw, sresti
        except  sramw, srescr
        except  sramw, srescr+1
        except  sramw, sresdi
        except  sramw, sresdi+1
        except  sramw, dmy008
        except  sramw, dmy009
        except  sramw, dmy00A
        except  sramw, dmy00B
        except  sramw, dmy00C
        except  sramw, dmy00D
        except  sramw, dmy00E
        except  sramw, dmy00F
        except  sramw, dmy010
        except  sramw, dmy011
        except  sramw, dmy012
        except  sramw, dmy013
        except  sramw, dmy014
        except  sramw, dmy015
        except  sramw, dmy016
        except  sramw, dmy017
        except  sramw, dmy018
        except  sramw, dmy019
        except  sramw, dmy01A
        except  sramw, dmy01B
        except  sramw, dmy01C
        except  sramw, dmy01D
        except  sramw, dmy01E
        except  sramw, dmy01F
        except  sramw, dmy020
        except  sramw, dmy021
        except  sramw, dmy022
        except  sramw, dmy023
        except  sramw, dmy024
        except  sramw, dmy025
        except  sramw, dmy026
```

```
        except  sramw, dmy027
        except  sramw, dmy028
        ld      portd, #0FF         ;force initial charge of rbat
        except  sramw, sresti
        ld      portd, #0A5         ;area now initialized
        except  sramw, sinitf
        ret
```

```
;
; CHK1ST does a checksum of the first 100h locations in the program.
; This can be extended to check all of program memory by adding a
;       LAID
;       RET
; to every 100h block of memory, and then looping through each call
; 100h times as below.
;
chk1st:
        ld      cnt, #0             ;loop counter (must be a register)
        ld      ckadr, #0           ;address in the block
        ld      ckdata, #0AA        ;seed for checksum
ckloop:
        ld      a, ckadr            ;get the current addresss to check
        inc     a                   ;increment for next time
        x       a, ckadr            ;save the incremented value
        jsr     cksm00              ;get the contents from the address in block 0
        add     a, ckdata           ;and add in the running total
        x       a, ckdata           ;store it back
        drsz    cnt                 ;do this 256 times
        jp      ckloop
        ld      a, ckdata           ;get the checksum
        x       a, portd            ;to report to host
        except  sramw, 01f81        ;return checksum as 1st parameter
        ret
```

;This is a routine to test I/O writes to the host processor bus

; The X register is used to point to the Data to be output
; The B register points to Port 0 during the data transfer

```
iow080:
; first set IO_M to IO in OPH
        ld      b, #ophigh          ;point to the op register data storage
        setbit  iom, [b]            ; 0 port data = 10000000 for IO
        jsr     puthi ld      x, #temp            ;pointer for data to be output ; next, set up DRQ5 in OPL
        ld      a, oplow            ;get the op register data
        x       a, portd            ; so we can retreive this later
```

```
        ld      a, portd            ; emulate a store instruction
        or      a, #drq5            ;set the drq5 bit in the register save data
        x       a, portd            ; D port data = 00000001 for DRQ5
        ld      b, #portcd
        clrbit  milsad, [b]         ; C0 = 0
        setbit  milstb, [b]         ; C1 = 1 (this starts the DREQ cycle)

; now look for DACK ckdack

; next, pull master high in OPL
        ld      b, #portd           ; point to the D port
        setbit  master, [b]         ; D port data = 00000011 for master*
        clrbit  milstb, portcd      ;.close the OP Low register ; write desired data to D port
        x       a, [x]              ;recover the data to output
        x       a, [b]              ; and store it in port D
; execute the IO write exception cycle to port 80h
        except  iow, 080 x       a, [b]              ;recover data
        x       a, [x]              ;and return to temp while recovering A ; clear DRQ and master*
        x       a, [b]              ; A contains the original OP Low value
        ld      b, #portcd          ; point back to port C
        setbit  milstb, [b]         ; turn off master mode
        clrbit  milstb, [b]

; now set IO_M~ to M in OPH
        ld      b, #ophigh          ;point to the op register data storage
        clrbit  iom, [b]            ;point to memory
        jmp     puthi               ; and return ;
;****************************************************
;       Instruction set checkout
;****************************************************
instst: ld      erc,#0  ;initialize error reference counter
;
; Section 1 - load memory locations with addresses.
;       This section utilizes all variations of the
;       load and exchange instructions.
;       Memory locations 010-01f are loaded with
;       their respective addresses.
;
        ld      010,#010
        ld      011,#011
        ld      b,#012
        ld      a,b
```

```
        x       a,[b]
        ld      a,[b+]
        inca
        x       a,[b+]
        ld      [b+],#014
        ld      [b],#015
        ld      A,#00A
        add     a,b
        ld      b,#01f
        x       a,[b]
        ld      a,[b-]
        deca
        x       a,[b]
        ld      a,[b]
        deca
        x       a,b
        ld      a,b
        x       a,[b-]
        ld      [b-],#01c
        ld      [b-],#01b
        ld      x,#01a
        ld      a,x
        x       a,[x]
        ld      a,[x-]
        deca
        x       a,[x-]
        ld      a,#002
        x       a,x
        sc
        subc    a,x
        rc
        x       a,x
        ld      a,x
        x       a,[x]
        ld      a,[x+]
        inca
        x       a,[x+]
        ld      a,#018
        x       a,[x+]
        ld      a,[x]
        ifeq    a,#019   ;result=019?
        sc
        drsz    erc
        ifnc
;       jmp     er1
;
er1:    jsr     atoc
e1:     jp      e1
er4:    jsr     atoc
e4:     jp      e4
er5:    jsr     atoc
e5:     jp      e5
er8:    jsr     atoc
```

```
e8:     jp      e8
er9:    jsr     atoc
e9:     jp      e9
er10:   jsr     atoc
e10:    jp      e10
er11:   jsr     atoc
e11:    jp      e11
er12:   jsr     atoc
e12:    jp      e12
er13:   jsr     atoc
e13:    jp      e13
er14:   jsr     atoc
e14:    jp      e14
        nop
er15:   jsr     atoc
e15:    jp      e15
er16:   jsr     atoc
e16:    jp      e16
er17:   jsr     atoc
e17:    jp      e17
er18:   jsr     atoc
e18:    jp      e18
er19:   jsr     atoc
e19:    jp      e19
er20:   jsr     atoc
e20:    jp      e20
er21:   jsr     atoc
e21:    jp      e21
er22:   jsr     atoc
e22:    jp      e22
er23:   jsr     atoc
e23:    jp      e23
er24:   jsr     atoc
e24:    jp      e24
er25:   jsr     atoc
e25:    jp      e25
er26:   jsr     atoc
e26:    jp      e26
er27:   jsr     atoc
e27:    jp      e27
er28:   jsr     atoc
e28:    jp      e28
er29:   jsr     atoc
e29:    jp      e29
er30:   jsr     atoc
e30:    jp      e30
er31:   jsr     atoc
e31:    jp      e31
er32:   jsr     atoc
e32:    jp      e32
;
; Error subroutine - Error number output to port 80h
```

```
;                 Error data stored in SRAM at 1FC0h
;
Atoc:
        x       a, portd        ;setup error data
        except  sramw, 01FC0    ; and store in SRAM
        ld      a,erc           ;output error #
        x       a,temp          ; to port 80h
        jmp     iow080
;
;
; Section 13 - Multiply (16 x 16)
;
msetup: drsz    erc
        drsz    erc
        drsz    erc
        drsz    erc
        ld      a,#0cb
        ld      b,#0
        x       a,[b]
        ld      a,[b]
        ld      b,#3
        x       a,[b]
        ld      a,[b-]
        swap    a
        x       a,[b]
        ld      a,[b-]
        x       a,[b]
        jsr     mult
        drsz    erc
        ld      a,[b-]
        ifeq    a,#096
        jp      byp26
er49:   jsr     atoc
e49:    jp      e49
byp26:  drsz    erc
        ld      a,[b-]
        ifeq    a,#03f
        jp      byp27
er50:   jsr     atoc
e50:    jp      e50
byp27:  drsz    erc
        ld      a,[b-]
        ifeq    a,#09e
        jp      byp28
er51:   jsr     atoc
e51:    jp      e51
byp28:  drsz    erc
        ld      a,[b]
        ifeq    a,#014
        jp      nuinst
er52:   jsr     atoc
e52:    jp      e52
```

```
;
; Section 14 - Check new instructions
;
er53:   jsr     atoc
e53:    jp      e53
er54:   jsr     atoc
e54:    jp      e54
er55:   jsr     atoc
e55:    jp      e55
er56:   jsr     atoc
e56:    jp      e56 nuinst: ld      b,#0b
        ld      a,#0a
;
; COP_800 (16 x 16) multiply routine
;       Multiplicand in (1,0) multiplier in (3,2)
;       product in (5,4,3,2)
;
        cntr = 0f0
mult:   ld      cntr,#17
        ld      b,#4
        ld      [b+],#0
        ld      [b],#0
        ld      x,#0
        rc
mloop:  ld      a,[b]
        rrc     a
        x       a,[b-]
        ld      a,[b]
        rrc     a
        x       a,[b-]
        ld      a,[b]
        rrc     a
        x       a,[b-]
        ld      a,[b]
        rrc     a
        x       a,[b]
        ld      b,#5
        ifnc
        jp      test
        rc
        ld      b,#4
        ld      a,[x+]
        adc     a,[b]
        x       a,[b+]
        ld      a,[x-]
        adc     a,[b]
        x       a,[b]
test:   drsz    cntr
        jp      mloop
        ret
```

```
tog:
        ld      b, #oplow
        setbit  lowbat, [b]             ;turn on the low batt LED
        jsr     putlow
        ld      b, #portcd
        clrbit  crgled, [b]             ; also the charge LED
        clrbit  pwrled, [b]             ; and the power LED
        ret tog1:
        ld      b, #oplow
        clrbit  lowbat, [b]             ;turn off the low batt LED
        jsr     putlow
        ld      b, #portcd
        clrbit  crgled, [b]             ; turn the charge LED on
        clrbit  pwrled, [b]             ; and the power LED on
        ret ;
; Enter halt mode with A/D conversion started
;
atod4:  ld      enad,#0c
        nop
        nop
        nop
;       sbit    7,portgd
;
; Halt test to measure halt current
;
halt:   nop
;       sbit    7,portgd
        nop
        ret .=0C00                          ; SRAM address for ports 02 - FFh ; This routine will allow the COP to read I/O ports between it's ending
; address and 0FFh. The routine is called with A = L(port address)

ior000:
        laid                            ;read data out of SRAM
        ret
        .=0D00                          ; SRAM address for ports 102 - 1FFh ; This routine will allow the COP to read I/O ports between it's ending
; address and 01FFh. The routine is called with A = L(port address)

ior100:
        laid                            ;read data out of SRAM
        ret .=0E00                          ; SRAM address for ports 202 - 2FFh
```

```
; This routine will allow the COP to read I/O ports between it's ending
; address and 02FFh.  The routine is called with A = L(port address)

ior200:
        laid                    ;read data out of SRAM
        ret

.=0F00                  ; SRAM address for ports 302 - 3FFh

; This routine will allow the COP to read I/O ports between it's ending
; address and 03FFh.  The routine is called with A = L(port address)

ior300:
        laid                    ;read data out of SRAM
        ret

.=01000

;
; External interrupt G0 interrupt vector
;
extirq:
        jsr     getcmd          ;read the command from SRAM
        jsr     dispch          ;decode and execute
        ld      b, #ophigh
        clrbit  iom, [b]        ;make sure we're set to memory for CDONE
        jsrl    puthi
        rbit    3,psw
        except  scdone, 0       ; set CDONE for the host
        jmpl    restor
dispch:
        add     a, #L(tblbeg)
        ifgt    a, #L(tblend)
        jp      cmderr          ;invalid command
        jid cmderr:
        ld      portd, #0ff     ;indicate command error
        except  sramw, 01f80    ;replace original command
        ret tblbeg:
        .addr   cksum           ; 0 - Checksum SRAM
        .addr   slftst          ; 1 - Initiate self test
        .addr   togbat          ; 2 - Switch batteries
        .addr   sbatA           ; 3 - Select battery A
        .addr   sbatB           ; 4 - Select battery B
        .addr   sbatR           ; 5 - Select reserve battery
        .addr   dsbatR          ; 6 - Deselect reserve battery
        .addr   dspon           ; 7 - Turn on backlight and display
        .addr   dspoff          ; 8 - Turn off backlight and display
        .addr   batst           ; 9 - Return battery status
```

```
        .addr   sleep           ; A - Enter sleep mode
        .addr   endslp          ; B - Exit sleep mode
        .addr   slwclk          ; C - Enter slow clock mode
        .addr   fstclk          ; D - Enter fast clock mode
        .addr   stndby          ; E - Enter standby mode
        .addr   pwrdwn          ; F - Turn off System Power Module
        .addr   acpchk          ;10 - Current AC power & switches check
        .addr   strtpm          ;11 - Start power management
        .addr   drvoff          ;12 - Put hard disk to sleep
        .addr   endpm           ;13 - Stop power management functions
        .addr   c20on           ;14 - Turn on the WD 90C20
        .addr   c20off          ;15 - Turn off the WD 90C20
        .addr   cmderr          ;16 - Dummy entry to reserve space
        .addr   stchrg          ;17 - Start a charge cycle for test
        .addr   outlow          ;18 - Set state of OP Low bits
        .addr   outhi           ;19 - Set state of OP High bits
        .addr   spwmt1          ;1A - Set high/low timer 1
        .addr   spwmt2          ;1B - Set high/low timer 2
tblend:
        .addr   crgres          ;1C - Charge reserve 0 = off/1 = on ; The following is the actual table of jumps to the various routines.
; This is a rather convoluted way of doing things, but this is the
; simplest indirect jump/dispatch method supported by the COP.
; This entire table starting from the JID instruction above must
; fit in the same 100H page of memory.

cksum:
        jmp     chksum slftst:
        ret
;       jmp     cmderr          ;invalid command sbatA:
        setbit  bankb, oplow    ;make system think it's on bank B
togbat:
        jsrl    cngalt          ;force the change always
        jmp     cmderr
        ld      batcnt, #min4   ; and reset the timeout
        ret sbatB:
        clrbit  bankb, oplow    ;make system think it's on bank A
        jp      togbat sbatR:
        clrbit  rbin, portcd    ;turn on reserve battery
        ret dsbatR:
        setbit  rbin, portcd    ;turn off reserve battery
```

```
        ret dspon:
        jmpl    dsplon              ;turn on display and backlight dspoff:
        jmpl    dsplof              ;turn off the display & backlight batst:
        jsrl    readad              ;read the A/D channels
;       jsrl    avrage              ;compute the average
        jmpl    writad              ;and return the instantaneous results sleep:
        setbit  slpmde, mode
        ld      a, #0C4             ;250KHz for 286
        bitif   s386, sysbyt        ;is it really a 386
        xor     a, #050             ; if so switch to 2 MHz
        x       a, temp             ;set sleep mode register
        jsr     htctlw              ;write HT21 control and return
        clrbit  kbdint, wkpnd       ;Clear keyboard to start
        setbit  kbdint, wken        ;enable wakeup interrupt
        ret endslp:
        clrbit  slpmde, mode
        ld      temp, #014          ;turn off sleep mode
        jmp     htctlw              ;write HT21 control and return slwclk:
        jmpl    lspeed              ;set the processor speed to low fstclk:
        jmpl    hspeed              ;set the processor speed to high pwrdwn:
        jmpl    spmoff              ;turn off System Power Module acpchk:
        jmp     chkac strtpm:
        ld      cnt, #4             ;4 parameters currently
        jsr     gsparm              ; get the parameters
        jsr     xsump               ;checksum the parameters
        x       a, [x]              ; and store the checksum
        jmpl    stmout              ; then set the timeout values endpm:
        jmp     cmderr              ;invalid command
```

```
chksum:
        jmpl    chk1st                  ;checksum 1st block of program stndby:
        jsr     chkact                  ;see if system currently busy
        jsr     drvoff                  ;turn off the drive
        jsrl    dspof0                  ;turn off the display
;       bitif   crton, flashb           ;are we using the crt
;       jp      stnd00
        jsr     c20off                  ;turn off the 90C20
stnd00:
        jsr     sleep                   ;slow the clock
        jsr     cpuhld                  ;lowest power mode
        ld      erc, #1                 ;setup to flash every two seconds
        ret stchrg:
        jmp     stcrg1 crgres:
        jsr     get1p
        ifeq    debug, #0
        jmpl    rbcend
        jmpl    rbstrt cutlow:
        jsr     get1p                   ; get 1 parameter from data area
        ld      a, debug                ; and store it in debug
        ld      b, #oplow
        x       a, [b]
        jmpl    putlow                  ; then output to OP Low and return outhi:
        jsr     get1p
        ld      a, debug
        ld      b, #ophigh
        x       a, [b]
        jmpl    puthi                   ; same as above to OP High
spwmt1:
        jmp     spwm1x spwmt2:
        jsr     get4p                   ;transfer indirect to allow alt entry
spwm2a:
        clrbit  txc0, t2cntrl           ;Make sure we're off to start
        setbit  chrga, portld           ; including the FET control line
        setbit  chrga, portlc           ; make L4 an output
        ld      x, #debug
        ld      b, #t2ralo
        ld      cnt, #4                 ;transfer 4 parameters
t2loop:
        ld      a, [x+]
```

```
            x       a, [b+]
            drsz    cnt
            jp      t2loop ld      t2cntrl, #080           ;enable pwm mode
            setbit  chrga, crgmde
            ret drvoff:
            jmp     drvof1 chkact:
            ret c20off:
            ld      b, #ophigh              ;point to op high byte
            clrbit  pd9020, [b]             ;turn off the 90C20
            jmpl    puthi                   ; after the backlight and return c20on:
            ld      b, #ophigh              ;point to op high byte
            setbit  pd9020, [b]             ;turn on 90C20
            jmpl    puthi                   ; before the backlight spwm1x:
            jsr     get4p
spwm1a:
            clrbit  txc0, cntrl             ;turn off the timer
            setbit  chrgb, portgd           ; and force the charger off
            setbit  chrgb, portgc           ; G3 is an output
            ld      x, #debug
            ld      b, #t1ralo
            ld      a, [x+]                 ;transfer the first 2 parameters
            x       a, [b+]
            ld      a, [x+]
            x       a, [b]
            ld      b, #t1rblo              ;then do the next two
            ld      a, [x+]
            x       a, [b+]
            ld      a, [x]
            x       a, [b]
            ld      cntrl, #080             ; turn on timer
            setbit  chrgb, crgmde
            ret stcrg1:
            bitif   acav, portcp            ;don't try to charge from batteries
            ret
            jsrl    clrbsy                  ;clear battery detect
            bitif   bdt, portlp             ;is there a battery present
            ret                             ; nop if no battery present
            ld      batcnt, #mxctim         ;max charge time = 3 hours
```

```
        clrbit    crgled, portcd
        ld        syscnt, #8
        ld        lcdcnt, #1
        ld        hdcnt, #1
        jsr       clrold              ;clear the peak readings
        clrbit    trklec, crgmde      ;not trickle charge
        setbit    charge, crgmde      ;indicate we're really charging sttrkl:
        ld        b, #debug
        ld        [b+], #mincrg       ;set small duty cycle to start
        ld        [b+], #00
        ld        [b+], #(maxcrg-mincrg)
        ld        [b], #00
        jsr       spwm2a              ;start Bat A charging
        ld        b, #debug
        ld        [b+], #mincrg       ;set small duty cycle to start
        ld        [b+], #00
        ld        [b+], #(maxcrg-mincrg)
        ld        [b], #00
        jmp       spwm1a              ;start Bat B charging chkac:
        ld        b, #ophigh
        clrbit    iom, [b]
        jsrl      puthi
        jsrl      clrbsy              ;reset the latch
        ld        a, mode             ;get the contents of the mode byte
        and       a, #lobat2+lobat3
        swap      a                   ;swap nibbles
        bitif     lobat1, mode
        or        a, #020
        bitif     acav, portcp        ;test for ac available
        jp        chkac1              ; if AC not avail
        or        a, #acav
chkac1:
        bitif     swx, portgp         ;also check standby switch
        jp        chkac2
        or        a, #swx             ;if switch is down
chkac2:
        bitif     bdt, portlp
        jp        chkac3
        or        a, #bdt
chkac3:
        x         a, portd            ;put the flags in the D port
        except    sramw, 01F81        ;and write them to SRAM
        ret
```

; This routine will become master and write the data in TEMP to HT21 ctl reg 5
;
htctlw:

```
; first set IO_M to IO in OPH
        ld      b, #ophigh              ;point to the op register data storage
        setbit  iom, [b]                ; D port data = 10000000 for IO
        jsrl    puthi
        ld      x, #temp                ;pointer for data to be output ; next, set up DRQ5 in OPL
        ld      a, oplow                ;get the op register data
        x       a, portd                ; so we can retreive this later
        ld      a, portd                ; emulate a store instruction
        or      a, #drq5                ;set the drq5 bit in the register save data
        x       a, portd                ; D port data = 00000001 for DRQ5
        ld      b, #portcd
        clrbit  milsad, [b]             ; C0 = 0
        setbit  milstb, [b]             ; C1 = 1 (this starts the DREQ cycle)

; now look for DACK
        ckdack

; next, pull master high in OPL
        ld      b, #portd               ; point to the D port
        setbit  master, [b]             ; D port data = 00000011 for master*
        clrbit  milstb, portcd          ; close the OP Low register ; Set the HT21 index register
        ld      [b], #05                ;point to the sleep control register
        except  iow, 01ED ; write desired data to D port
        x       a, [x]                  ;recover the data to output
        x       a, [b]                  ; and store it in port D ; execute the io write exception cycle to port 01EFh (HT21 Control)
        except  iow, 01EF x       a, [x]                  ;and recover original OP low ; clear DRQ and master*
        x       a, [b]                  ; A contains the original OP Low value
        ld      b, #portcd              ; point back to port C
        setbit  milstb, [b]             ; turn off master mode
        clrbit  milstb, [b]

; now set IO_M to M in OPH
        ld      b, #ophigh              ;point to the op register data storage
        clrbit  iom, [b]                ;point to memory
        jmpl    puthi cpuhld:
        ld      b, #portlp              ;point to the L port
        clrbit  cpuint, wkpnd           ;clear the interrupt pending flag
        bitif   cpuint, [b]             ;wait for the interrupt to be acknowledged
```

```
        jsrl    delay                   ; by the host cpu
        ld      a, oplow                ;get the op register data
        x       a, portd                ; so we can retreive this later
        ld      a, portd                ; emulate a store instruction
        or      a, #drq5                ;set the drq5 bit in the register save data
        x       a, portd                ; D port data = 00000001 for DRQ5
        ld      b, #portcd
        clrbit  milsad, [b]             ; C0 = 0
        setbit  milstb, [b]             ; C1 = 1 (this starts the DREQ cycle)

ckdack

; next, pull master high in OPL
        ld      b, #portd               ; point to the D port
        setbit  master, [b]             ; D port data = 00000011 for master*
        clrbit  milstb, portcd          ; close the OP Low register
        x       a, [b]                  ; recover current OP Low settings
        x       a, oplow                ; and save setbit  hldreq, mode            ;Tell interested parties about hold
        ld      b, #wkpnd
        clrbit  kbdint, [b]             ;Clear keyboard but not timer to start
        setbit  kbdint, wken
        setbit  cpuint, wken
        ret clrold:
        ld      cnt, #8                 ;start with save area cleared
        ld      b, #crgrdg
clrcrg:
        clr     a
        x       a, [b+]
        drsz    cnt
        jp      clrcrg
        ret drvof1:
        ld      hdcmd, #0E0             ;Enter standby command ; This routine will become master and write the data in hdcmd to the Hard disk ctl reg
;
iow1f7:

; first set IO_M to IO in OPH
        ld      b, #ophigh              ;point to the op register data storage
        setbit  iom, [b]                ; D port data = 10000000 for IO
        jsrl    puthi ld      x, #hdcmd               ;pointer for data to be output ; next, set up DRQ5 in OPL
        ld      a, oplow                ;get the op register data
```

```
        x       a, portd              ; so we can retreive this later
        ld      a, portd              ; emulate a store instruction
        or      a, #drq5              ;set the drq5 bit in the register save data
        x       a, portd              ; D port data = 00000001 for DRQ5
        ld      b, #portcd
        clrbit  milsad, [b]           ; C0 = 0
        setbit  milstb, [b]           ; C1 = 1 (this starts the DREQ cycle)

; now look for DACK
        ckdack

; next, pull master high in OPL
        ld      b, #portd             ; point to the D port
        setbit  master, [b]           ; D port data = 00000011 for master*
        clrbit  milstb, portcd        ; close the OP Low register except  ior, 03F6             ;read alternate status port
        x       a, [b]                ;save OP Low                    **
        ld      a, #L(03F6)           ;to retreive io data
        jsrl    ior300
        ifbit   7, a                  ;test disk busy status
        jp      hdbusy                ;try again later
        ifeq    pendng, #0            ;no delay
        jp      hdwrit
        drsz    pendng                ;else lets wait a while
        jp      hdexit
hdwrit:
        x       a, [b]                ;recover registers for now **

; write desired data to D port
        x       a, [x]                ;recover the data to output
        x       a, [b]                ; and store it in port D ; execute the io write exception cycle to port 01F7h (HD Control)
        except  iow, 01F7 x       a, [x]                ;and recover original OP low

; clear DRQ and master*
        x       a, [b]                ; A contains the original OP Low value
hdexit:
        ld      b, #portcd            ; point back to port C
        setbit  milstb, [b]           ; turn off master mode
        clrbit  milstb, [b]

; now set IO_M- to M in OPH
        ld      b, #ophigh            ;point to the op register data storage
        clrbit  iom, [b]              ;point to memory
        jsrl    puthi
        clrbit  hdcs0, wkpnd          ;so we don't interrupt again
        ret
```

```
hdbusy:
        ld      pendng, #12             ;set the flag for 60 msec delay
        jp      hdexit ; The XSUMP routine checksums the system parameter data area to validate
; the initial settings in case of a total system power failure that
; causes the COP setings to be invalid xsump:
        clr     a
        ld      x, #systim
        ld      b, #temp
        x       a, [b]                  ;Clear the accumulator
        ld      cnt, #4
xslop:
        ld      a, [x+]                 ;Get the parameter
        add     a, [b]                  ; and add it to the accumulator
        x       a, [b]                  ;save it back
        drsz    cnt
        jp      xslop
        ld      a, [b]                  ;return with calculated checksum in A
        ret                             ; X points to stored checksum ; GET1P gets 1 parameter to the data location DEBUG for test purposes get4p:
        ld      cnt, #4
        jp      getp
get1p:
        ld      cnt, #1
getp:
        ld      x, #debug
        jmp     gvparm .=01E00
m1e00:
        laid                            ;Allow COP to store parameters
        ret                             ; at 1E02-1EFF .=01F00                         ;place this at the top of SRAM ; The GETCMD routine will return the value of a command
; placed at address 1F80h by the host CPU. The COP can
; then call GSPARM or GVPARM to retreive the parameters
; to an area in the data ram of the COP processor
;
; On Entry:
;
;       CNT contains the number of parameters to retreive
;
;  for GVPARM
```

;
;       X contains the address to store the parameters in COP data space
;
; On Exit:
;
;       The PSAVE area contains the parameters

```
getcmd:
        ld      a, #080             ;Address of command on this page
        laid                        ; get contents of 1F80h
        ret gsparm:
        ld      x, #psave           ;point to the COP parameter area
gvparm:
        ld      b, #temp            ;temporary storage
        ld      [b], #081           ;address of parameters in SRAM
ploop:
        ld      a, [b]              ;address of current parameter
        laid                        ; get parameter
        x       a, [x+]             ; and store it in data space
        x       a, [b]              ;get address
        inc     a                   ; and bump it
        x       a, [b]              ; then put it back for next time
        drsz    cnt                 ;decrement the counter
        jp      ploop               ; and continue till done
        ret .end
```

; EXCEPTION MACROS

```
        IOR     =       04C00       ; I/O read exception cycle
        IOW     =       06000       ; I/O write exception cycle
        SRAMW   =       04000       ; SRAM write exception cycle
        SCDONE  =       06000       ; Set CDONE bit exception cycle
```

;       IOR forces the read data to be in the range C00h - FFF

;       the macro EXCEPT takes three parameters:  type (one of the above),
;       addr (four hex digits giving the exception address)

```
        .macro  except, type, addr
        .byte   0AD
        .addrw  type ! addr
        .endm
```

; The BIT macros (SETBIT, CLRBIT, BITIF) allow the user to specify the
; bit to be set/reset/tested using the same label name that is used as
; a mask value.

```
        .macro  bit, bitnum         ;yields the mask value corresponding
        .set    mask,1
```

```
.if     bitnum
.do     bitnum                  ; to the bit number
.set    mask,mask*2
.enddo
.if     H(mask)
.set    mask,H(mask)
.endif
.endif
.endm .macro  bitnum, mskval          ;gets the bit number coresponding
                                ; a mask value .set    dummy, mskval
.set    bitnum,0
.do     7
 .set   dummy,dummy/2
 .if    dummy
  .set  bitnum,bitnum+1
 .else
  .exit
 .endif
.enddo
.endm .macro  setbit, dummy, addr     ;getnerate the sbit instruction
                                ; from the mask label
.if     a<2
.error  No Paramerter for bit operation
.else
bitnum  dummy
sbit    bitnum, addr
.endif
.endm .macro  clrbit, dummy, addr     ;getnerate the rbit instruction
                                ; from the mask label
.if     a<2
.error  No Paramerter for bit operation
.else
bitnum  dummy
rbit    bitnum, addr
.endif
.endm.

.macro  bitif, dummy, addr      ;getnerate the ifbit instruction
                                ; from the mask label
.if     a<2
```

```
.error  No Paramerter for bit operation
.else
bitnum  dummy
ifbit   bitnum, addr
.endif
.endm
```

; The macro CKDACK generates the code to check for dma acknowledge
; using a local label so that the label names do not have to be changed
; everyplace this is used

```
        .macro  ckdack
        ld      b, #ackprt           ;point to the port that DACK is on
        .mloc   cdack
cdack:
        bitif   dack, [b]
        jp      cdack
        .endm
```

What is claimed is:

1. A computer system, comprising:
a system bus, including sufficient lines for carrying data and address information in a predetermined protocol;
at least one microprocessor CPU subsystem, connected to access said system bus as master;
a plurality of other subsystems, each connected to access said system bus as slaves;
one or more batteries, connected to provide power to said subsystems;
a power-management controller, comprising a microprocessor which is connected to directly access said system bus in a first mode, as slave, and in a second mode, as master;
said power-management controller being connected to directly monitor activity on said system bus, and to monitor a state of said batteries,
to operate in said second, master mode to directly cause ones of said subsystems to enter a standby mode of reduced power consumption,
and to operate in said second, master mode to directly cause ones of said subsystems to wake up from said standby mode when user input is detected, said power-management controller directly coupled to said system bus to gain immediate access to said subsystems as master of said system bus to change modes of said subsystems.

2. The system of claim 1, wherein said power-management controller comprises a microcontroller.

3. The system of claim 1, wherein said power-management controller comprises a microcontroller and an interface chip.

4. The system of claim 1, wherein said power-management controller comprises a microcontroller having on-chip multichannel analog-to-digital conversion capability.

5. The system of claim 1, wherein said other subsystems include a hard disk controller, a display controller, and a keyboard interface.

6. The system of claim 1, further comprising a system clock generator, which is configured to generate a system clock signal; and wherein said CPU and plural ones of said other subsystems are connected to receive said system clock signal; and wherein said power-management controller is connected to selectably slow said system clock signal.

7. The system of claim 1, wherein said batteries are rechargeable.

8. A computer system, comprising:
a system bus, including sufficient lines for carrying data and address information in a predetermined protocol;
at least one microprocessor CPU subsystem, connected to access said system bus as master;
a plurality of other subsystems, each connected to access said system bus as slaves;
one or more batteries, connected to provide power to said subsystems;
a power-management controller, comprising a microprocessor which is connected to directly access said system bus in a first mode, as slave, and, in a second mode, as master;
said power-management controller being connected to directly monitor activity on said system bus,
and to monitor a state of said batteries,
to operate in said second, master mode to directly cause ones of said subsystems to enter a standby mode of reduced power consumption,
and to operate in said second, master mode to directly cause ones of said subsystems to wake up from said standby mode when user input is detected;
program memory for storing instructions to be executed by said controller;
said controller being connected to said system bus, and to said program memory, through an interface chip which includes at least one state machine, said power-management controller directly coupled to said system bus to gain immediate access to said subsystems as master of said system bus to change modes of said subsystems.

9. The system of claim 8, wherein said power-management controller comprises a microcontroller having on-chip multichannel analog-to-digital conversion capability.

10. The system of claim 8, further comprising a system clock generator, which is configured to generate a system clock signal; and wherein said CPU and plural ones of said other subsystems are connected to receive said system clock signal; and wherein said power-management controller is connected to selectably slow said system clock signal.

11. The system of claim 8, wherein said batteries are rechargeable.

12. A method of operating a computer system, comprising the steps of:
   (A) repeatedly executing user-defined programmed operations in at least one microprocessor CPU subsystem,
   wherein a CPU within said at least one microprocessor CPU subsystem, in response to at least some ones of said user-programmed operations, accesses a system bus as master;
   (B) independently of and in parallel with said repeated execution of said user-defined program operations, executing a second program from nonvolatile storage in a power-management controller, comprising a microprocessor which is connected to directly access said system bus in a first mode, as slave, and, in a second mode, as master;
   wherein, in response to commands of said second program, said power-management controller monitors activity of said system bus,
   monitors at least one battery voltage,
   conditionally operates in said second, master mode to cause said CPU or other subsystems to enter a standby mode of reduced power consumption,
   and conditionally operates in said second, master mode to cause ones of said subsystems to wake up from said standby mode when user input is detected, said power-management controller directly coupled to said system bus to gain immediate access to said subsystems as master of said system bus to change modes of said subsystems.

13. The method of claim 12, wherein said power-management controller comprises a microcontroller.

14. The method of claim 12, wherein said power-management controller comprises a microcontroller and an interface chip.

15. The method of claim 12, wherein said power-management controller comprises a microcontroller having on-chip multichannel analog-to-digital conversion capability.

16. The method of claim 12, wherein said other subsytems include a hard disk controller, a display controller, and a keyboard interface.

17. The method of claim 12, wherein said batteries are rechargeable.

* * * * *